United States Patent [19]

Rawlings et al.

[11] 4,156,907
[45] May 29, 1979

[54] DATA COMMUNICATIONS SUBSYSTEM

[75] Inventors: Robert L. Rawlings, El Toro; Morris G. Watson, Mission Viejo, both of Calif.

[73] Assignee: Burroughs Corporation, Detroit, Mich.

[21] Appl. No.: 905,885

[22] Filed: May 15, 1978

Related U.S. Application Data

[63] Continuation-in-part of Ser. No. 773,692, Mar. 2, 1977, abandoned.

[51] Int. Cl.² ............................................... G06F 3/00
[52] U.S. Cl. .................................................... 364/200
[58] Field of Search ......................... 364/200 MS File

[56] References Cited

U.S. PATENT DOCUMENTS

| | | | |
|---|---|---|---|
| 3,247,488 | 4/1966 | Welsh et al. | 364/200 |
| 3,462,741 | 8/1969 | Bush et al. | 364/200 |
| 3,820,079 | 6/1974 | Bergh et al. | 364/200 |
| 3,955,180 | 5/1976 | Hirtle | 364/200 |
| 4,006,466 | 2/1977 | Patterson et al. | 364/200 |
| 4,017,839 | 4/1977 | Calle | 364/200 |
| 4,060,849 | 11/1977 | Bienvenu et al. | 364/200 |

Primary Examiner—Harvey E. Springborn
Attorney, Agent, or Firm—Alfred W. Kozak; Nathan Cass; Kevin R. Peterson

[57] ABSTRACT

A data communications subsystem operates with a main host computer having a central processor and main memory. The subsystem comprises: A data communications processor having its own internal memory for storing data transfer routines; and autonomous memory dedicated to storing data transfer instructions and control data; and a basic control module which includes a basic control interface unit connecting a plurality of front-end controllers. The basic control interface unit provides memory access paths for the front-end controllers to access data communications memory resources. The data communications processor provides address pointers to each of the front-end controllers whereby the selected front-end controller may access data transfer instructions from a data communications memory resource and then execute these instructions. The data transfer instructions are stored in "command blocks" in a memory resource and are made accessible to the front-end controllers for execution of data transfer operations. In a "non-autonomous configuration" the host system main memory is used for storage of command blocks and control data. This configuration is used with the type of front-end controllers known as broadband controllers using high speed transmission lines connected to peripherals and adapter cluster module controllers. In an "autonomous" configuration, the command blocks are stored in autonomous memory and the front-end controllers may include, in addition, an added mix of a data communications disk controller (DCDC) for data storage on disk, and a store-to-store controller (SSC) for transfer of data between autonomous memory and the main memory independently of the data communications processor.

15 Claims, 31 Drawing Figures

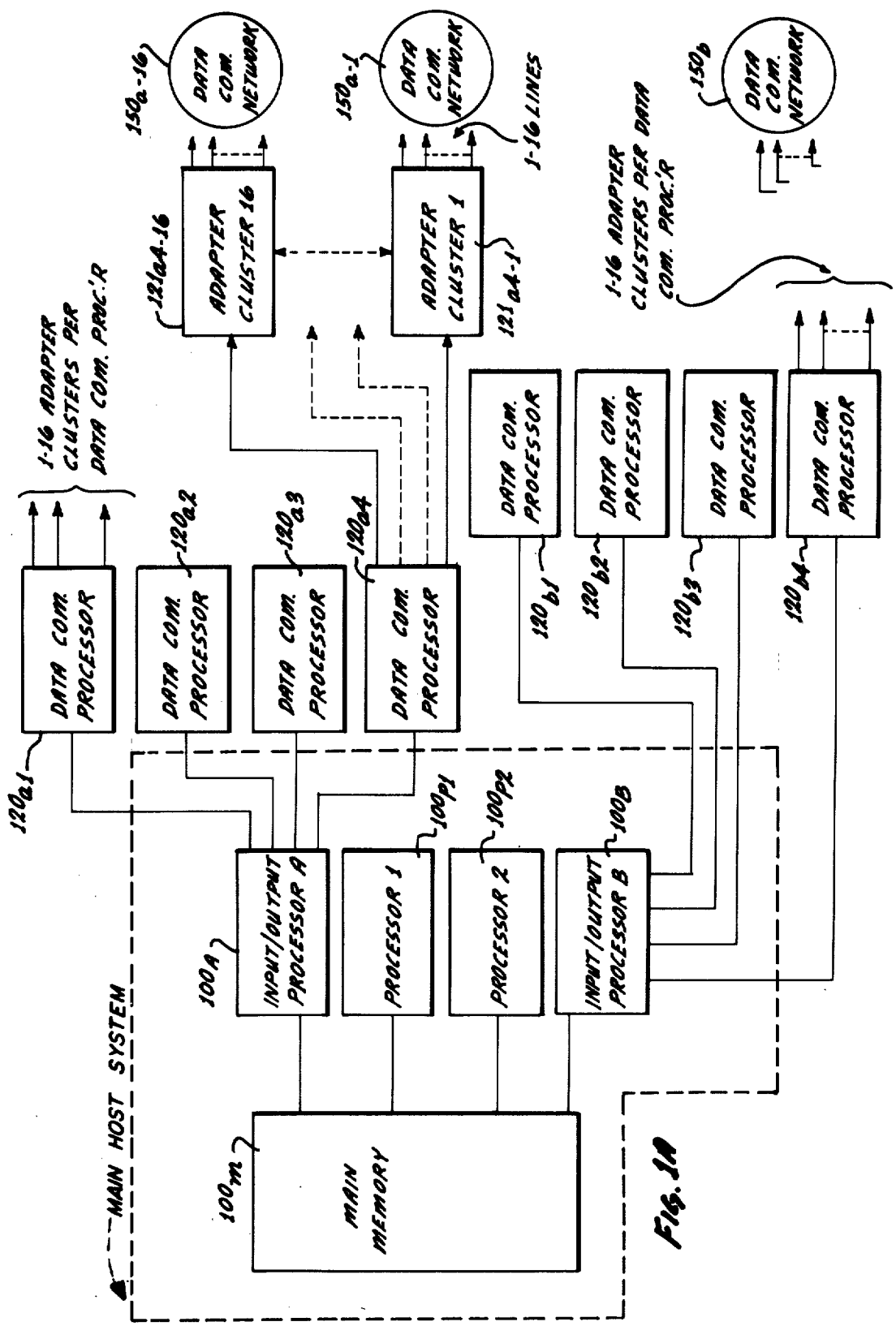

MAIN MEMORY

LOCAL MEMORY FOR DCP

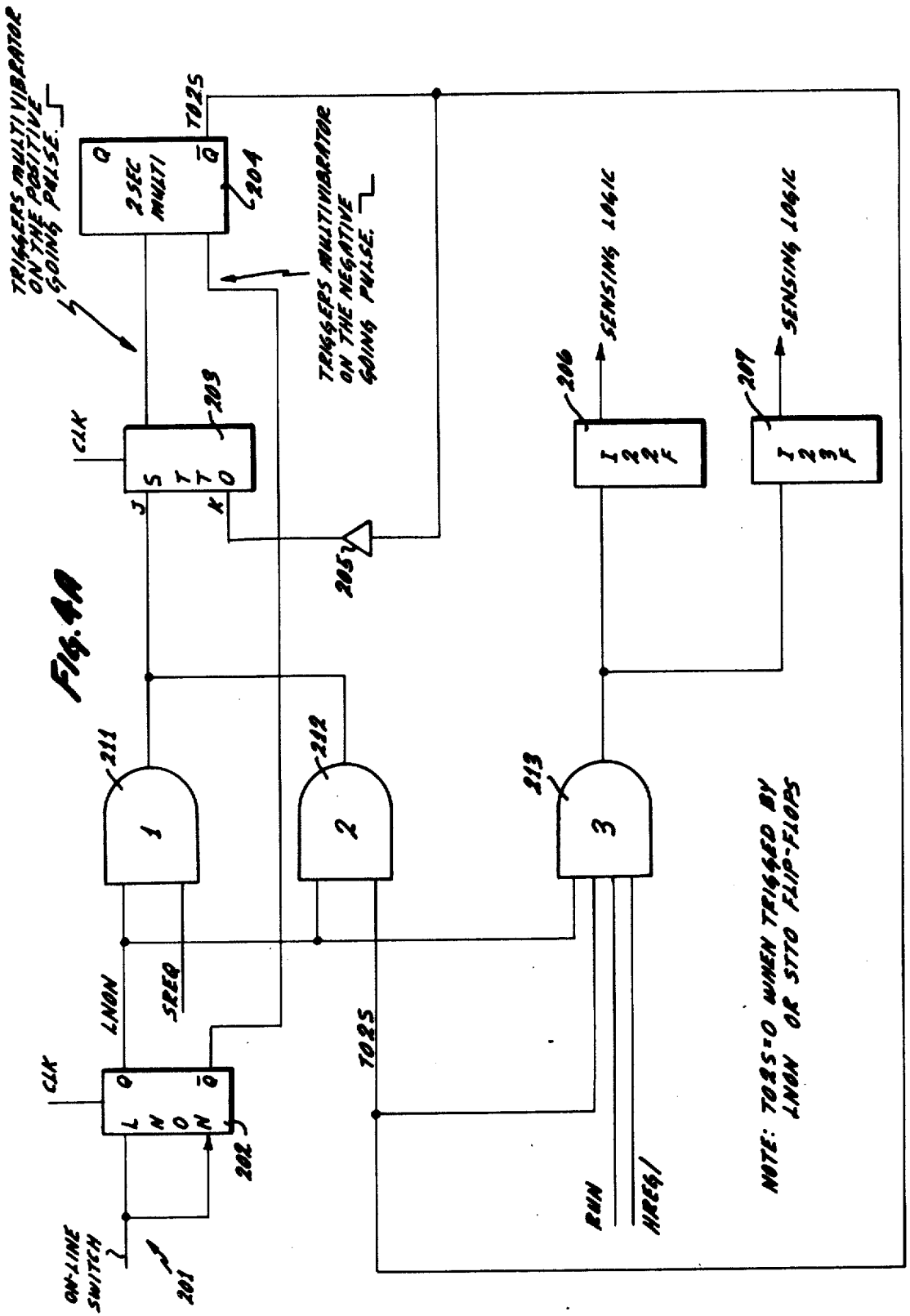

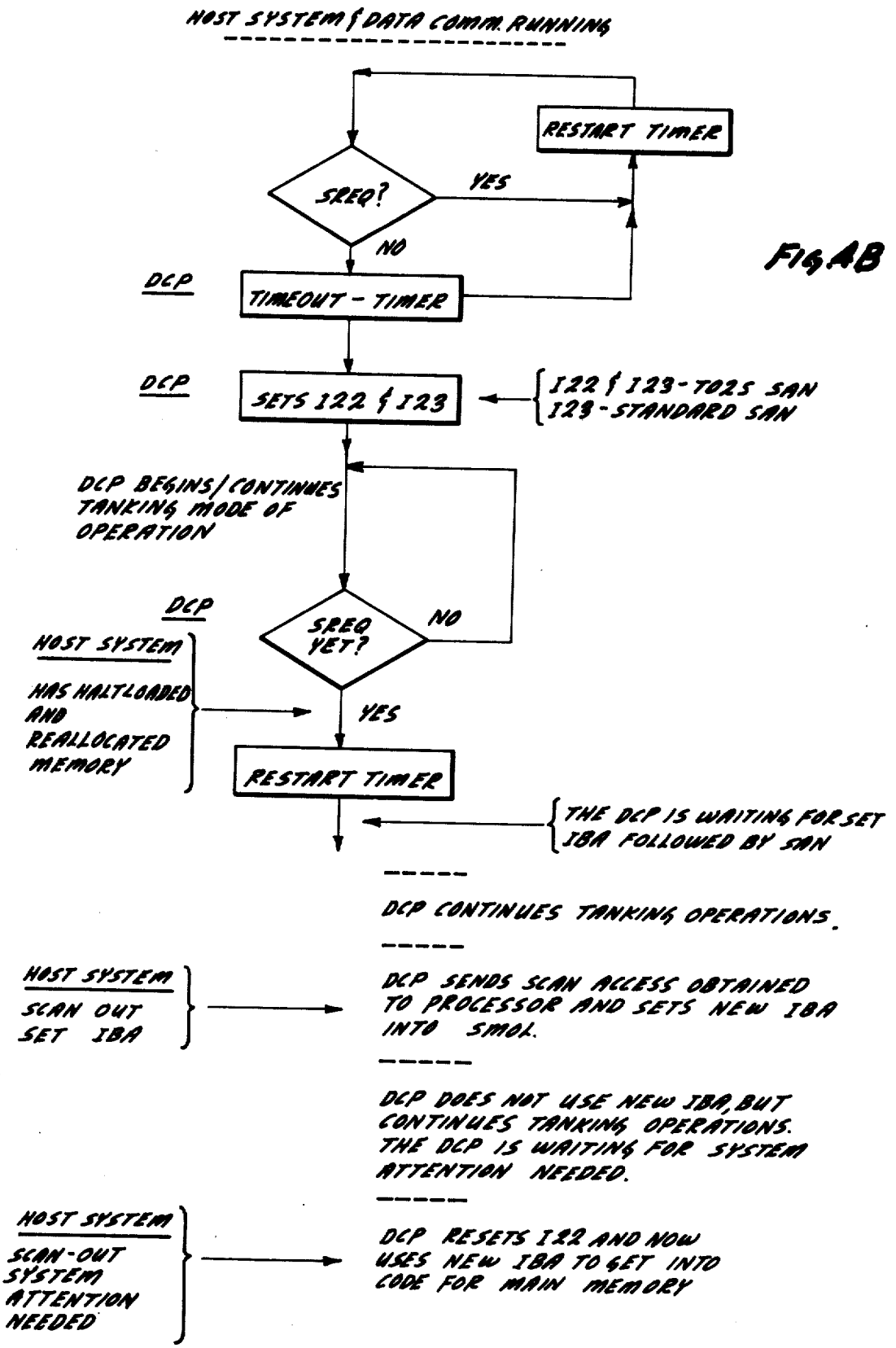

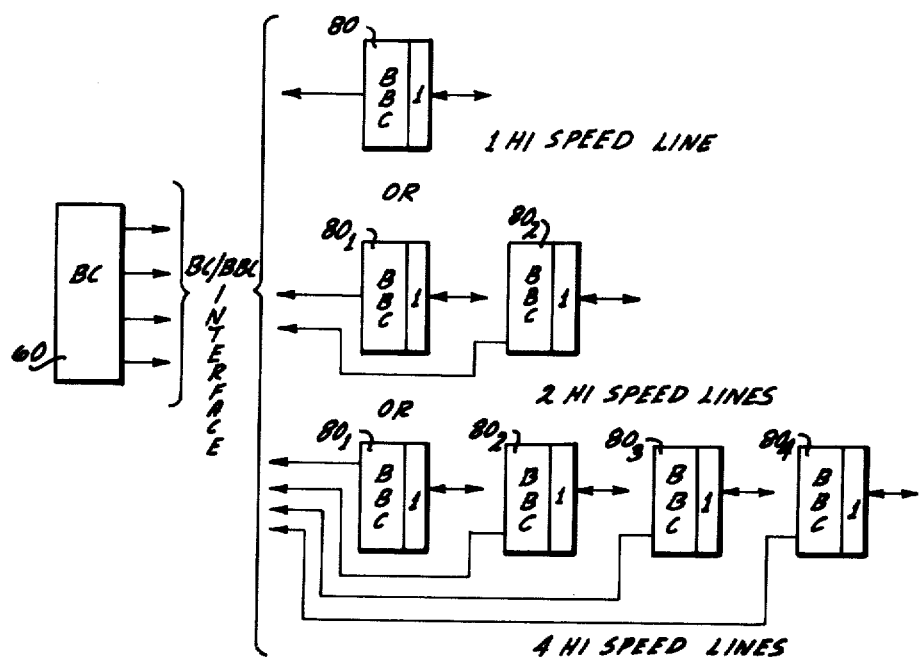
BROADBAND CONTROL CONFIGURATIONS  Fig. 9
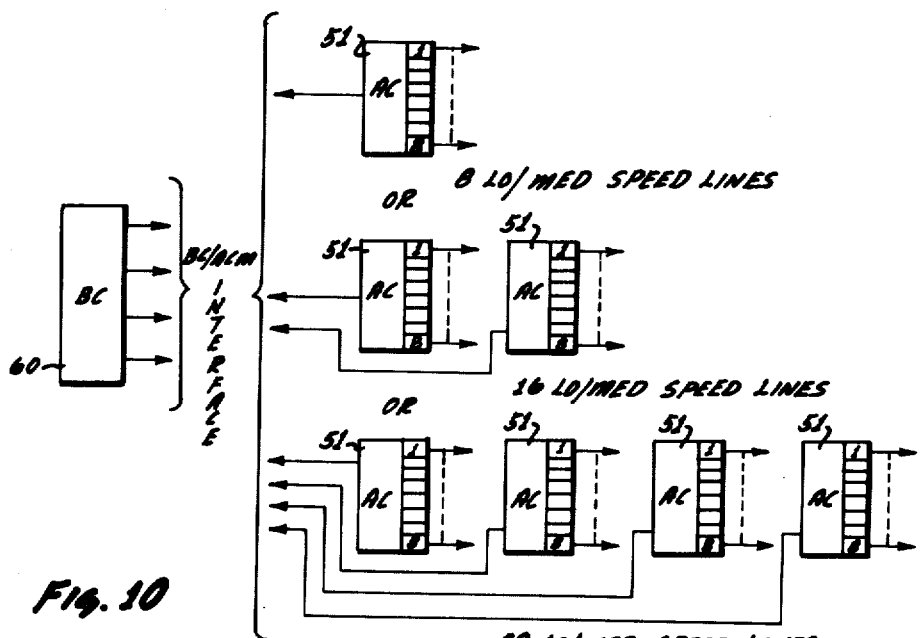
Fig. 10
ADAPTER/CLUSTER CONFIGURATION

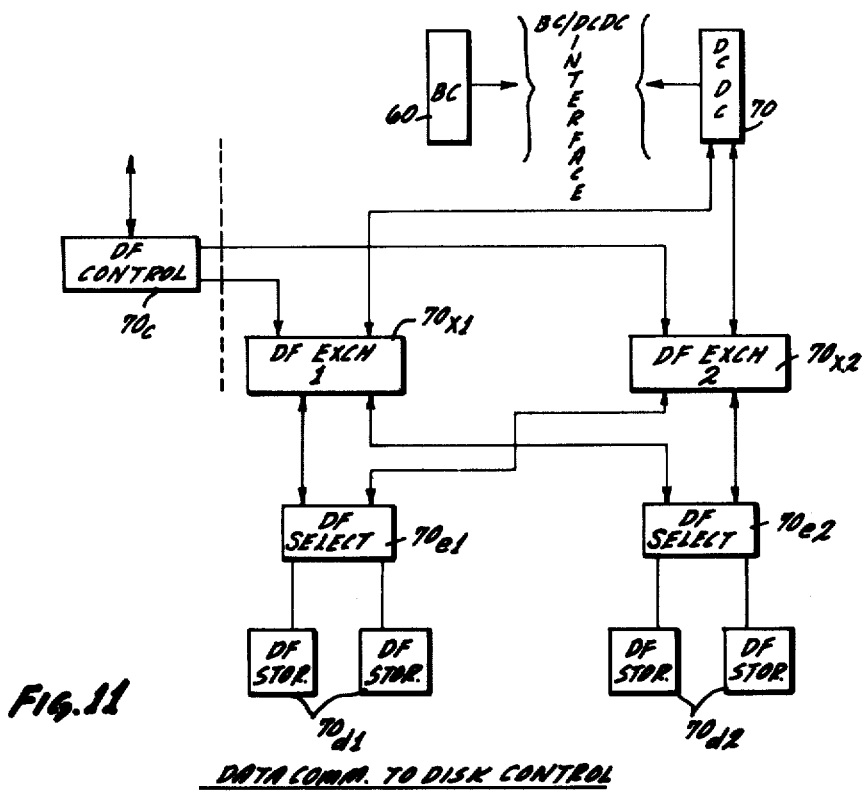
Fig. 11  DATA COMM. TO DISK CONTROL
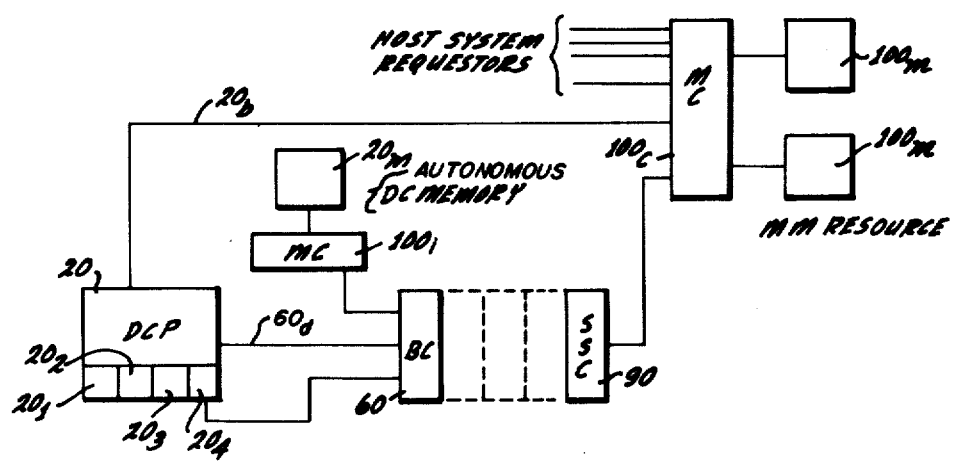
Fig. 12A  STORE TO STORE INTERFACE (SEPARATE BUS)

TYPICAL EDC MODULE CONFIGURATIONS

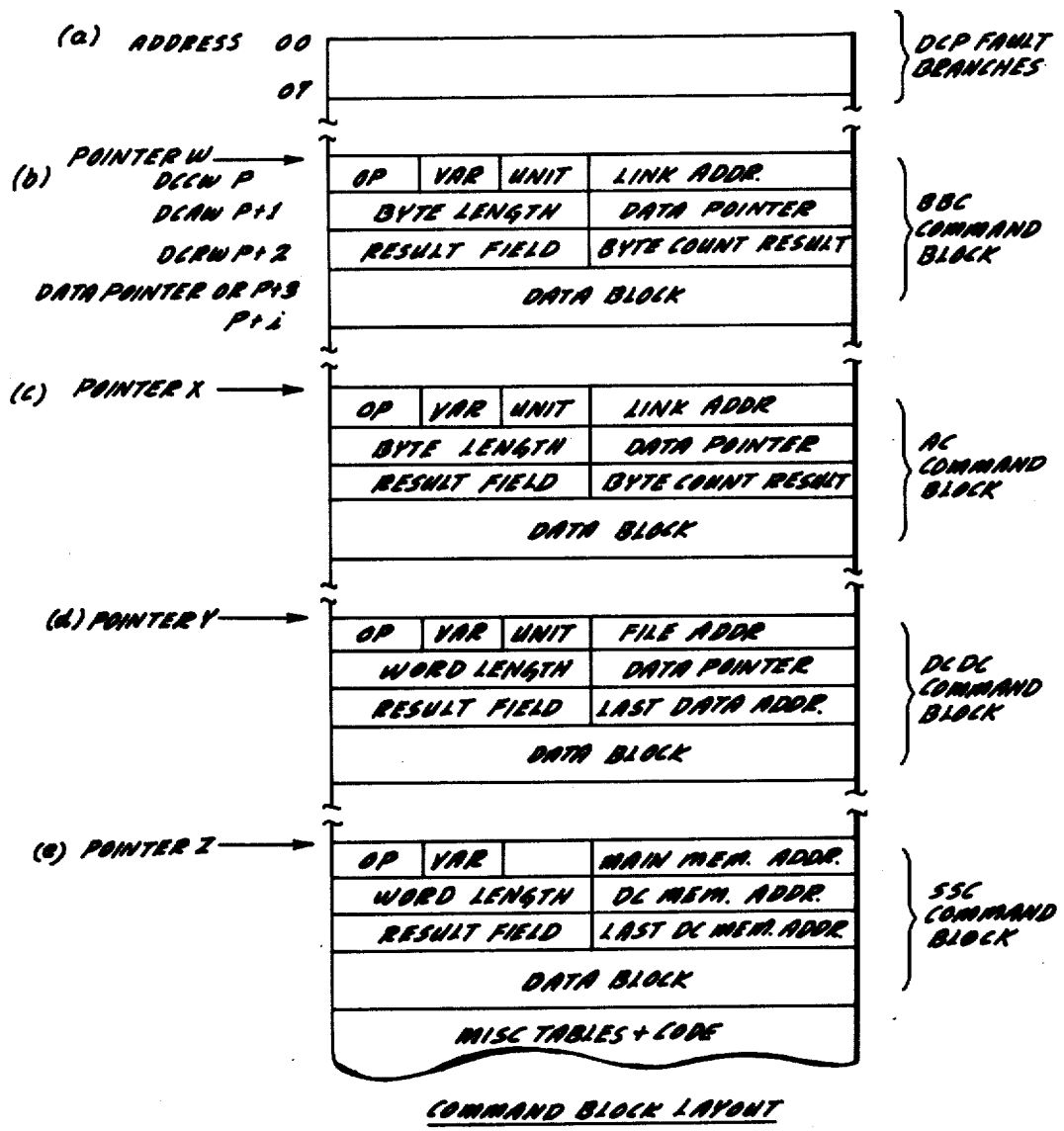

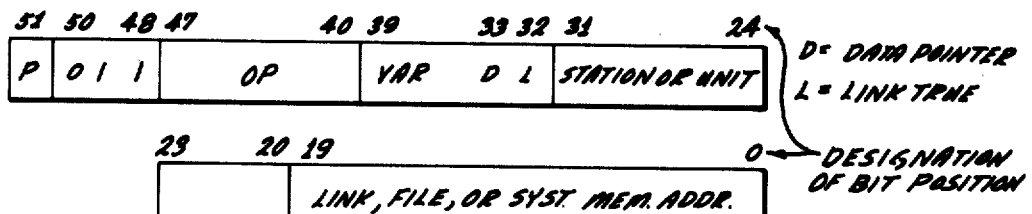
FIG. 15A — Data Comm. Command Word (DCCW)
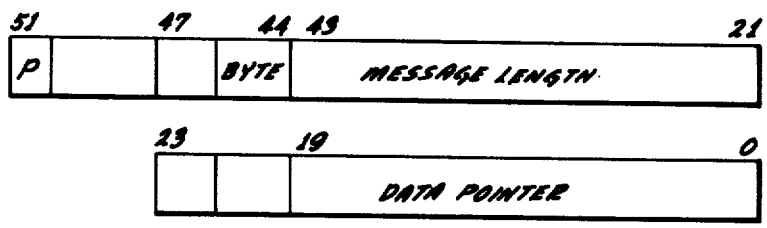
FIG. 15B — Data Comm. Address Word (DCAW)
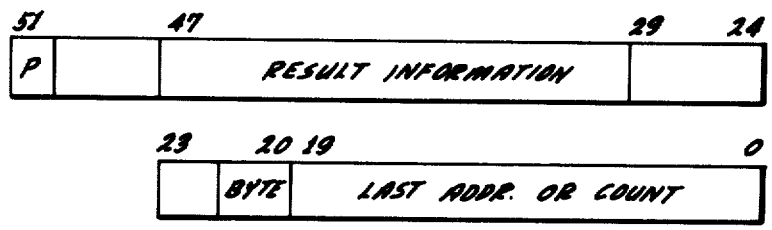
FIG. 15C — Data Comm. Result Word (DCRW)

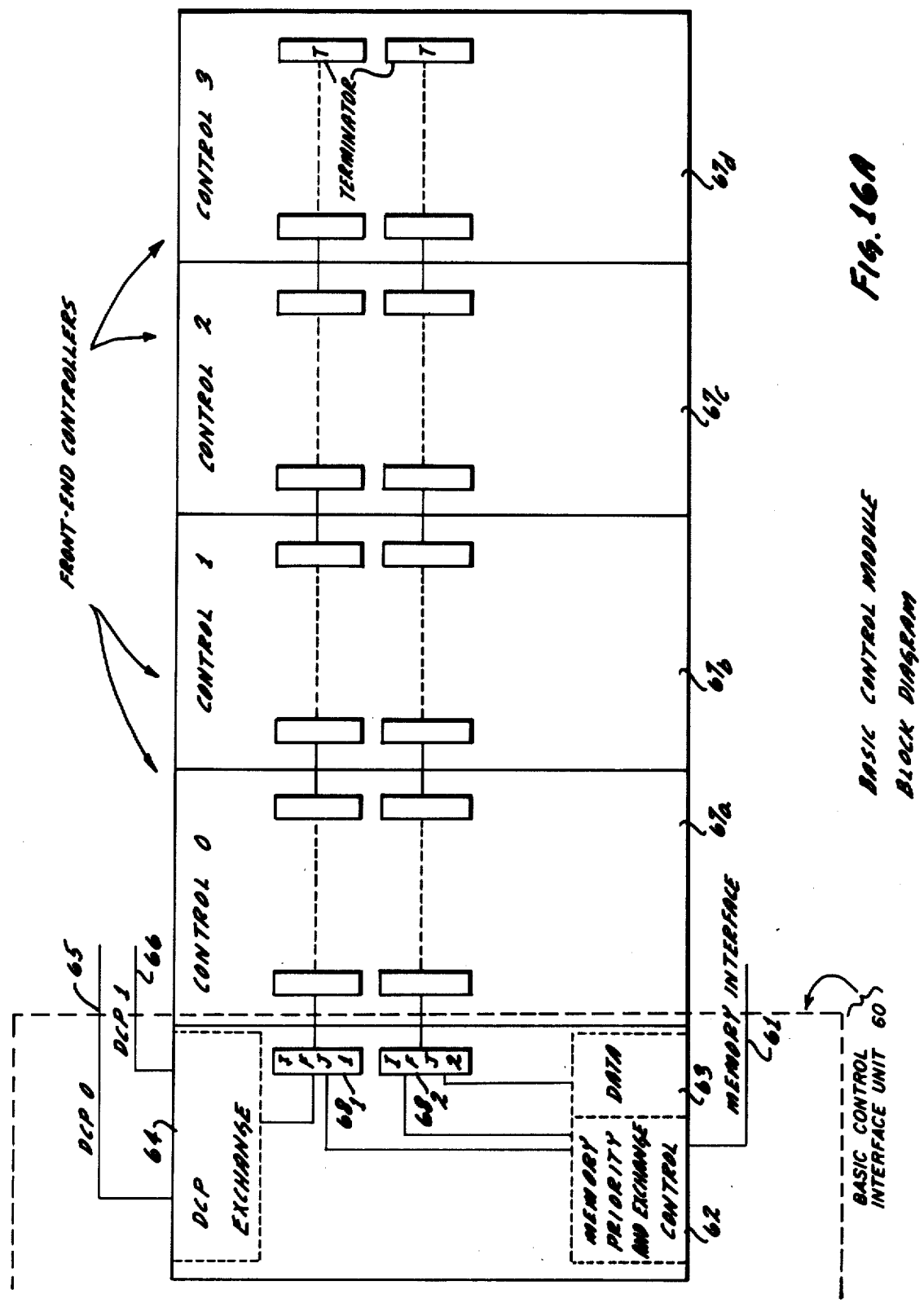

BASIC CONTROL MODULE BLOCK DIAGRAM

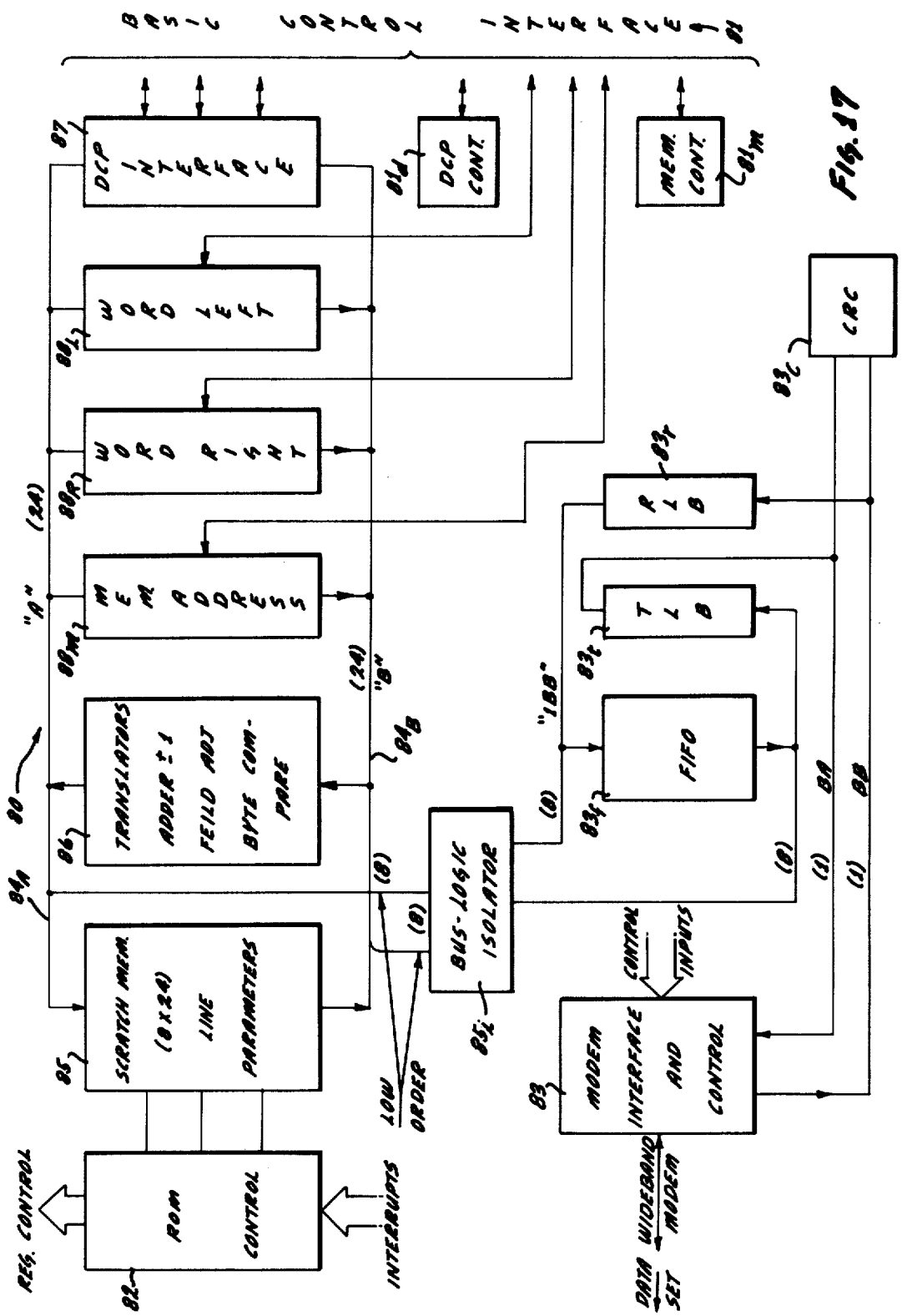

Clock generation within the cluster for asynchronous (start/stop) operation

Store to store controller

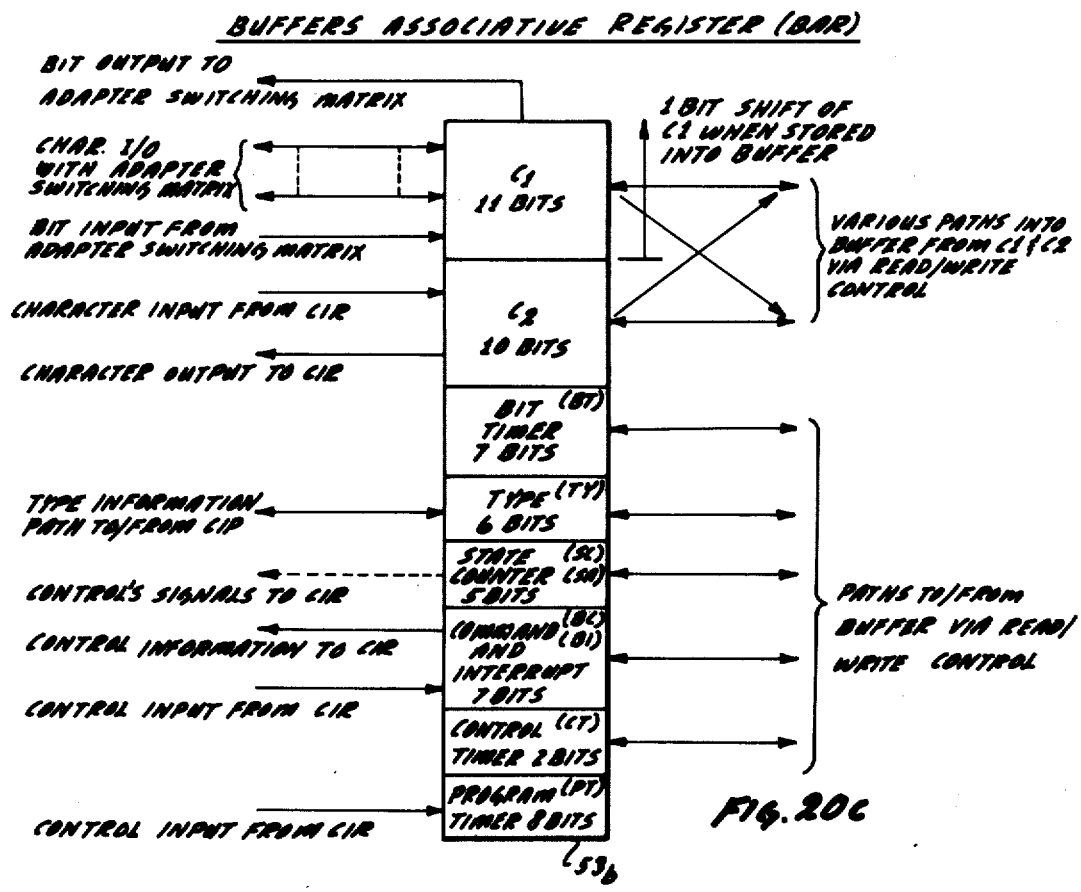

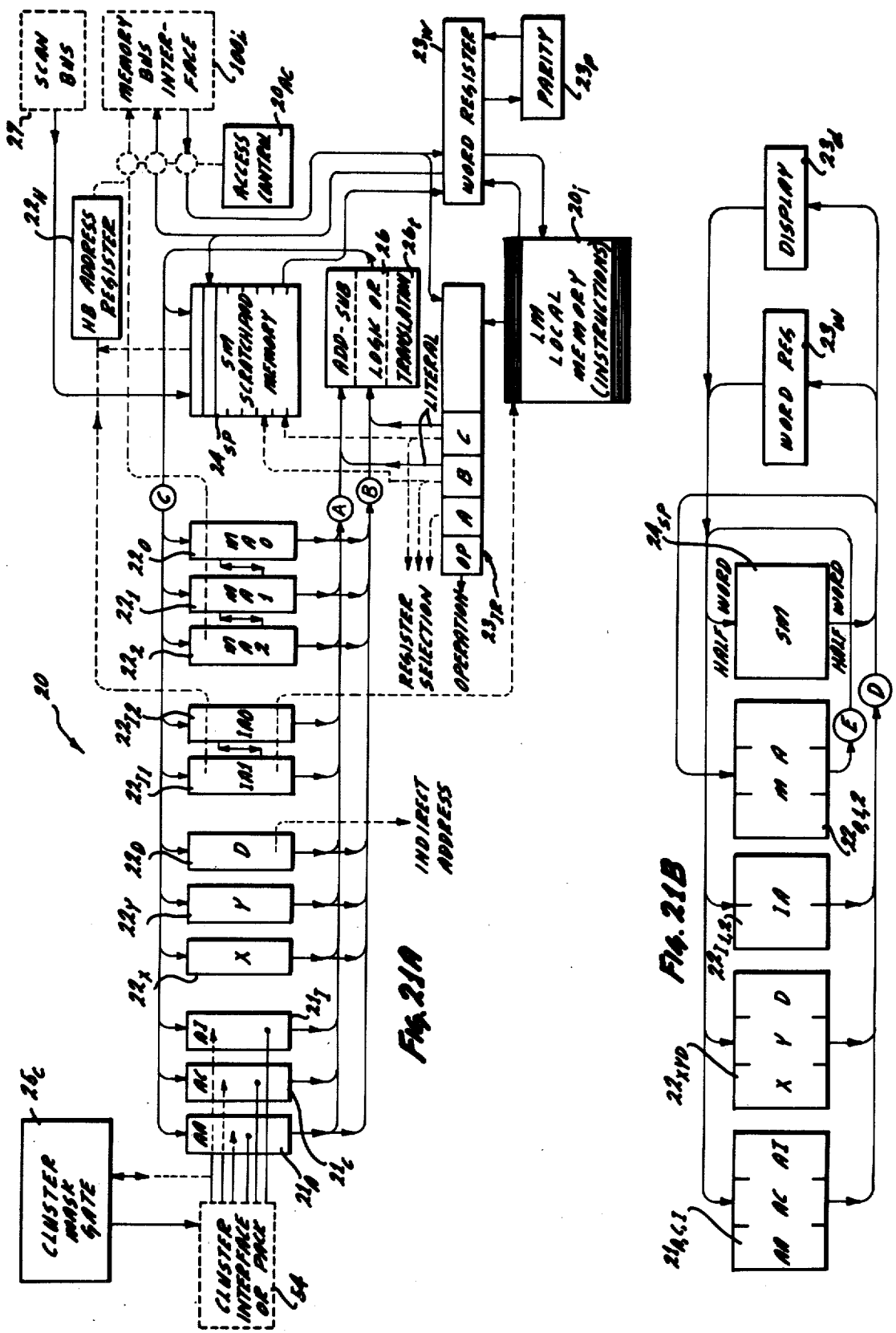

DATA COMMUNICATIONS SUBSYSTEM

This application is a continuation-in-part of Ser. No. 773,692, now abandoned, filed Mar. 2, 1977.

TABLE OF CONTENTS

Subject

Abstract of Disclosure
Background of the Invention
Summary of the Invention
Description of the Drawings
Description of Preferred Embodiment
Data Comm Command Word
Data Comm Address Word
Data Comm Result Word
Data Communications Processor
Autonomous Mode of Operation when Main System is Halted
System Operation
Front-End Controller
Basic Control Module and Interface Unit
Broad Band Controller
Data Comm Disk Controller
Store to Store Controller
Adapter Cluster Module Controller
Claims

CROSS REFERENCES TO RELATED APPLICATIONS

The following patent applications, each of which is assigned to the same common assignee, are related to the subject matter of the attached specification:

"Enhanced Data Communnications Subsystem," inventors J. E. Wollum and R. L. Rawlings, Ser. No. 882,213, filed Feb. 28, 1978.

"Improved Adapter Cluster Module for Data Communications Subsystem," inventors R. L. Rawlings and R. D. Mathews, Ser. No. 799,265, filed May 23, 1977, and now abandoned.

FIELD OF THE INVENTION

This invention relates to digital communication subsystems and is particularly involved with more efficient routing and control of data transfers between various types of remote peripherals on transmission lines and a central host computer.

BACKGROUND OF THE INVENTION

In recent years there has been a proliferation of communication facilities involving many remote stations and terminals working together with data processors in a network. Generally, such network systems involve a host processor working with a main memory to form a central processing unit, or even a plurality of such central processing units, whereby digitzed message data can be transmitted from one station or terminal to another station or terminal within the system, but which, of course, the transmission must be routed, controlled and organized to accomplish the message transfer in an orderly and accurate fashion.

In the field of data communications each data transmission line is connected to a "line adaptor" which interfaces the data communications line into the system network. These line adapters may be associated together in a group and called an Adapter Cluster or, that is to say a group or cluster of adapters physically located within one unit. Each line adapter is specifically designed to operate to suit the characteristics of a particular type of remote terminal or station. The line adapter has to take into account factors such as the type of characters transmitted, the coding type of characters, the type of parity that is used, whether transmission is synchronous or asynchronous, the data rate or speed of transmission permissible, and so on, in order to provide that the terminal station connected at the other end of the transmission line will receive the proper type of signals.

Efforts are continuously being made to increase throughput, i.e., the number of message bits that can accurately be transmitted per unit time while minimizing the cost of equipment and facilities for accomplishing this. However, there must also be flexibility, in that provision must be made for wide band high speed transmission lines for high speed transmission of data, in addition to low to medium speed transmission lines which are commonly used since they are cheaper in cost. Further, the accessibility of message data stored in memory must be speedily available in order to obviate delays and increase throughput, and the desirability of concurrent overhead control operations to reduce delays has been recognized.

The field of this invention pertains to data processing equipment which is intended for use with a wide variety of remotely located terminal devices. It has become very desirable to incorporate a data processing subsystem into a network for transmission of data over long distances. The terminal devices involved will generally convert the data from a humanly readable form into binary digital form and transmit this data over wires or microwave relay systems. The terminal devices operate under and generate a wide variety of message code sets, character lengths, bit rates, message formats, communication line disciplines and mode of transmission which present considerable problems to the designer of data communication equipment. The data communication equipment must be able to interface with a wide variety of different types of these terminal devices and should be flexible enough that additional devices can be added or that the terminal devices already used can be changed according to customer preference.

Many of the past and presently existing data communication systems are categorized by those systems which are designed with fixed hardware and are intended to interface only with a specific type of terminal device. This may be economical but is not particularly flexible; other systems have been designed in a modular form to provide options for each of the modules to provide compatibility with certain types of terminal equipment. Because of the differences required among different line disciplines and different types of terminal requirements, it is not usually possible to design a common logic system to perform control functions to cover each of the variety of types of terminals. Among the difficulties involved is that of providing a comprehensive software package to service different configurations and in which the configurations may be desired to be changed from time to time. Thus, in the economics of time and hardware it has often been found necessary to limit the software to one particular type of data communication lines and terminal stations in the system.

With the development of integrated circuits and mini and microcomputers, it is now possible to provide hardware and software of great flexibility in order to handle systems which may have many possible configurations and newly desired configurations in the future. Often it was necessary that a particular program or subroutine be provided for each type of terminal device connected to the system and when new terminals were added to the system, a new subroutine was provided. This activity, however, lead to considerable expense, in addition to eating up long periods of time within the processor.

The present invention overcomes many of the earlier limitations and provides faster throughput of data transfers while permitting reconfigurability and also adaptability to various types of transmission lines and terminal equipment characteristics.

The presently described data communications subsystem using the basic control interface unit described herein as a central nexus has the objective of optimizing the message transference and handling between sending and receiving terminals in a data communication system network and to optimize the data communication transfer as between a computer or computers and the terminals; to provide direct memory access at the message level by providing a larger data communication memory; to provide self-organizing configurations together with a continuous operation system even if the main host computer is halted; to provide a temporary storage facility such as disks which can permit the "tanking" of messages in order to provide backup storage for the system; and to provide highspeed, computer-to-computer interface capability.

SUMMARY OF THE INVENTION

A data communication subsystem is used with a host processor and main memory for the routing, monitoring and controlling of data messages between a plurality of remote terminals connected by data transmission lines. The central processing unit, consisting of a host processor and main memory or a plurality of such, works with a plurality of data communications processors which relieve the main burden of the host processor in terms of regulating, routing and controlling the interchange of digital data messages within the system. In turn, each data communications processor is relieved of detailed processing burdens by connection to a basic control module having a cluster-group of front-end controllers supported by a basic control interface unit. Some of the front-end controllers handle a specific protocol and line discipline to or from remote peripheral terminals.

Each data communications processor provides four cluster-interface hubs through each of which it manages a plurality of Adapter Cluster Modules which are essentially groups of line adapters which interface telephone transmission lines to remote terminals or stations. In addition, one or more of the interface hubs of the data communications processor may connect to a basic control module which holds up to four front-end controllers for specialized data transfer activities. The data communication processor, through the basic control interface unit may then interface a mix of front-end controllers used for: high speed wide band transmission (designated as Broad Band Controller) handling low to medium speed transmissions and called Adapter Cluster Module Controller; a Data Comm Disk Controller (DCDC) for temporary storage or tanking of messages in disk files, and a Store-to-Store Controller (SSC) for relocating data and instructions among the memory resources. A "command block" of control data and message data is provided in memory resources for each of the front-end controllers whereby, stored in memory space, there resides: a Data Comm Command Word (DCCW); a Data Comm Address Word (DCAW) and a Data Comm Result Word (DCRW) - this data is called a "command block" and is initiated by the data communications processor which provides an address pointer to each front-end controller which tells the front-end controller where to find the command-instruction data and control data which it will use; in addition, the Command Block provides memory space for message data. The data communications processor uses these command blocks to control the source, destination, receipt, timing and transmission of digital data messages being sent between source and destination points within the system, but leaves the execution of the data transfer operation to the specific front-end controller involved.

A singular feature involved is the relationship between the main host computer system and the data communication subsystem, wherein the data communications processor of a subsystem can sense a failure or a halt-load condition of the main host processor. In so doing it will permit the data communication subsystem to operate in the "autonomous" or continuous operation mode, independent of the main host processor. During this mode of operation, data which would normally be sent to the main host system would be "tanked" into a disk file memory until such time as the main host system is "on-line" again.

Upon resumption of normal activity on the part of the main host system, this condition will be sensed by the data communications processor which will then initiate normal inter-communication relationships between the data communication subsystem and the main host system.

Thus, the improved data communication subsystem may be seen to consist of the following elements:
(a) a data communications processor (DCP);
(b) a local "autonomous" memory (may also be called autonomous data communications memory) which is used in the autonomous configuration;
(c) non-autonomous memory which is normally the main host memory used in the non-autonomous configuration;
(d) local internal memory (this is a memory internal to the data communications processor which may be enhanced by add-on memory modules and which serves to provide the programs and routines necessary for operation of a data communications processor without the data communications processor having to go through the delays of accessing the main host memory);
(e) the basic control module. This consists of a basic control interface unit and up to four front-end controllers. The basic control interface unit also provides connections to data communications processors, to autonomous memory, to main memory or other memory resources which may be available.

Under normal conditions when the main host system is operating on-line, the data communication subsystem is said to operate in the "non-autonomous" mode.

In the autonomous configuration, when the main host system is halted or down, the data communication subsystem will operate in an "autonomous" self-operating mode whereby incoming messages from peripherals are "tanked" into disk files until the main system is "on-line" again; while outgoing messages stored in autonomous memory (or on disk files) continue to be sent to peripherals by the data communications subsystem. An individual local power supply is provided to power this system independently of the main host system. In the "autonomous" mode, the data communication subsystem has the capability of tanking and de-tanking data on the disk files provided.

In the present system, the concept of "data communications memory" refers to any memory resource having data transfer commands and control data which the data communication subsystem can access in any mode. These memory resources may be in the main host system, in the autonomous memory.

The basic control module provides the termination equipment for data transmission lines which connect to peripheral terminal units. The basic control module may be described as consisting of (a) a basic control interface unit, (b) front-end controllers and (c) connections to peripherals via transmission lines. The front-end controllers may include any mix of:
 (i) broad band controller (BBC);
 (ii) adapter cluster module controller (ACM);
 (iii) data comm to disk controller (DCDC);
 (iv) store-to-store controller (SSC). This may also be called a memory transfer controller.

The basic control interface unit serves as a nexus of the data communication subsystem. It provides direct memory access to a specially dedicated autonomous data communications memory. It may also be configured to provide direct memory access to the main host memory. Further, the basic control interface unit provides for priority selection for each of the front-end controllers attached to the basic control interface unit. It also provides for fail-soft configurations whereby two data communications processors may be interconnected through two or more basic control interace units so that if a data communications processor which controls a set of front-end controllers should fail, then its activities would be taken over by an adjoining data communications processor which maintains connections to the basic control interface unit which was normally handled by the failed data communications processor.

The various modules used in the Data Communications Subsystem and their relationship to the main host system may be configured in at least three basic formats;
 (A) Non-autonomous configuration
 (B) Autonomous configuration
 (C) Fail-soft configuration (This applies to both non-autonomous and autonomous configurations)

(A) NON-AUTONOMOUS CONFIGURATION

In the "non-autonomous" configuration, the system main memory is used for storage of command blocks and data areas. The front-end controllers access the main memory through the basic control interface unit, and the data communications processor accesses memory through its own memory bus. The data communications processor can, in addition, have internal (or both internal and external) local memory, which can be used only for the storage of data communications processor (DCP) code. In this configuration the local memory is for the use of the data communications processor and is not accessible by the front-end controller.

Only the front-end controllers known as broadband controller (BBC) and the adapter cluster module controllers can be used in the non-autonomous configuration.

The previously mentioned front-end controllers known as the data communications disk controller (DCDC) and the store-to-store controller (SSC) are only used for and are compatible with the "autonomous" configuration of the subsystem.

(B) AUTONOMOUS CONFIGURATION

Autonomous configurations are those which include an "autonomous memory" as a local modular unit for the storage of command blocks and data areas. In this configuration, both the data communications processor and the front-end controllers access autonomous memory through the basic control interface unit. The data communications processor has an interface path, called the local memory interface, which is connected to the basic control interface unit in order to provide a communications path to autonomous memory for the data communications processor.

In the autonomous configuration of a subsystem, all types of the front-end controllers previously mentioned can be used in these autonomous subsystems.

In the autonomous configuration of the subsystem, the data communications processor must have at least one store-to-store controller (SSC). In addition, each data communications processor may have one or more data comm disk controls (DCDC's).

(C) FAIL-SOFT CONFIGURATION

The fail-soft configuration can be used in conjunction with the non-autonomous subsystem configuration or the autonomous subsystem configuration. The fail-soft configuration is a condition of "exchange" where redundancy is used to provide a takeover by one data communication processor in case of failure of another data communications processor.

The major aspect of the fail-soft configuration is that all of the basic control interface units are visible to two DCP's. Thus, two data communications processors (DCP's) would share four basic control interface units and their associated front-end controllers. Each data communications processor has a hardware cluster mask which prevents both data communications processors from being enabled to the same front-end controller at the same time. If one DCP is taken off-line, the cluster mask of the other will be changed to enable it to handle all the front-end controllers. A particular basic control interface unit must be connected (FIG. 7) via the same cluster interface number to both the data communications processors, for example, via cluster interface $20_2$ on DCP $20_A$ and cluster interface number $20_2$ on DCP $20_B$.

The major configuration of importance in the enhanced data communications subsystem is the "autonomous" configuration. Here, we use the autonomous memory, the data communications processor, the basic control interface unit with the four front-end controllers including the data communication disk controller and the store-to-store controller.

The data communications disk controller (DCDC) provides the function of storing all the input messages (which have come in from remote peripherals) and which temporarily resided in the "autonomous" memory. Normally, the data communications processor will provide an address to the store-to-store controller to take these input messages from the autonomous memory to main memory without any further burden to the data communications processor.

However, should the main system be halted or go "down" this will be noted by the data communications processor and the data communications processor will initiate the autonomous mode whereby it knows that the main host system is halted but that the message data is being accumulated on disk file—and when the main host system is operative and on-line again, the data communications processor will notify the main system that it should retrieve the message data at certain addresses on the disk file and transfer this data to the main host memory.

In the autonomous configuration, both the data communications processor and each of the front-end controllers can access the autonomous memory through the basic control interface unit.

In this respect the data communications processor has a special interface path (called the local memory interface) which is connected to the basic control interface unit and which provides for a communications path to the autonomous memory for the data communications processor.

In the autonomous configuration, there will always be at least one store-to-store controller (SSC) for use of the data communications processor so that the data communications processor can provide (to the store-to-store controller) the pointer addresses of commands whereby the store-to-store controller can transfer accumulated messages taken from the autonomous memory and transfer them to the main host memory and vice versa without tying up the data communications processor.

In the "automonous configuration" and in the normal operating situation when the main system is on-line (non-autonomous mode) and operating, input messages will be transferred from remote periphersls to the front-end controllers and placed in the autonomous memory. This will occur because of initialization of the front-end controllers by the data communications processor.

The accumulated input messages in the autonomous memory will be continuously duplicated on disk files controlled by the data comm disk file controller which has been initialized by the data communications processor.

Input messages in the autonomous memory will, from time to time, be transferred from the autonomous memory over to the main host memory by means of the store-to-store controller which is initialized by the data communications processor, after which the store-to-store controller can do its data transfer operations without further interruption to the data communications processor, thus freeing the data communications processor for other operations.

The data communications processor is originally initialized by the main host system, however, the data communications processor code and operating routines may be derived from one of two sources: (a) the main host memory may serve as a storage repository for data communications processor routines; or (b) a local internal memory within the data communications processor may serve as a storage repository for data communications processor routines. Needless to say, the use of an internal local memory within the data communications processor saves added access time which would be required if the data communications processor had to acquire its instruction routines from main host memory.

The autonomous configuration can operate even when the main host system is halted or "down". In this case, the data communications processor senses the halt in the main host system. The data communications processor will then build a quantity of data which identifies those areas of message data which are accumulating on the disk files and which will have to be transferred later to the main memory. After the main system is on-line again, the data communications processor will notify the main host system of addresses of message data on the disk file which should be transferred to main memory, and the main memory and the main host system will then access the required data from the disk file and place it into the main memory.

An input message from a remote terminal into the data communications system may be also in the nature of an inquiry which will require an output message from the main system which is conveyed as an answer back to the remote peripheral.

The inquiry message when presented to the main system via the data communications subsystem will normally be transferred to the autonomous memory. This would be done by the data communications processor providing an address pointer relating to instructions to the store-to-store controller in which the store-to-store controller would take message data from main memory and transfer it to autonomous memory. Then on a later instruction cycle this data (in autonomous memory) would be transferred to the appropriate front-end controller which would execute transfer operation of the message data out to the appropriately addressed peripheral.

Once the message data of the output message resides in the autonomous memory, it would not matter whether the main host system was halted, since the data communications subsystem can continue its operation to complete data transfer operations to peripherals even though the main host system is temporarily down.

DESCRIPTION OF THE DRAWINGS

FIG. 1A is a schematic diagram of a complete system which may be used for a data communication network and which includes a Main Memory, two host processors, a plurality of data communications processors and adapter clusters for interfacing a data communication network involving a magnitude of remote terminals.

FIG. 4A shows a logic diagram of the means by which a data communications processor senses a halt in the main host system.

FIG. 4B is a flow chart showing the inter-relationship between the main host system and a data communication subsystem during normal activity and during halt of the main host system.

FIG. 9 shows the interface between the basic control interface unit and the broad band controller and various alternative configurations which are possible.

FIG. 10 shows the interface between the basic control interface unit and the adapter cluster controllers and alternatively a plurality of adapter cluster controllers which can be used to provide the various capabilities of low to medium speed communication lines.

FIG. 11 is a block diagram of one configuration using the front-end controller known as the data comm disk controller.

FIG. 12A is a configuration of the data communication subsystem wherein the store-to-store controller has access to the Main Memory resource and to a local memory resource.

FIG. 14 is a schematic drawing of the Command Block layout which provides, in memory-space, commands and controls for each of the front-end controllers.

FIGS. 15A, 15B and 15C are schematic drawings of command words, address words and result words used in the data communication subsystem.

FIG. 16A is a block diagram of the basic control module which includes the basic conrol interface and connections to four front-end controllers.

FIG. 17 is a block diagram of the basic elements of the broad band controller with specific reference to the embodiment called the Broad Band Synchronous Control.

FIG. 20C shows the specific registers and connections for the Buffers Associative Register of the adapter cluster controller of FIG. 20A.

FIG. 21A is a block diagram of the data communications processor which is used in the data communication subsystem; FIG. 21B is a simplified block diagram of FIG. 21A.

DESCRIPTION OF PREFERRED EMBODIMENT

Referring to FIG. 1A there is seen the environment of the enhanced data communication subsystem. A series of main processors $100_{p1}$ and $100_{p2}$ work in conjunction with a Main Memory $100_m$ to provide the central processing unit of the system. Input/output processors $100_A$ and $100_B$ interface the Main Memory with groups of data comm processors (DCP), such as data comm processors $120_{a1}-120_{a4}$, and also with the group of data comm processors $120_{b1}-120_{b4}$. Each individual one of these data comm processors can be connected to up to 16 adapter cluster controllers and each one of which (such as $120_{a4-1}$, $120_{a4-16}$) have 16 output lines which connect to the data comm network such as $150_{a-1}$.

The relation of a main host system, such as Burroughs B6700 system, to a data communication subsystem, is described and illustrated in a reference manual entitled "Burroughs B6700 Information Processing Systems," Reference Manual 1058633, copyright 1969, 1970, 1972 and published by Burroughs Corporation, Detroit, Mich. 48232.

Figure 1B:
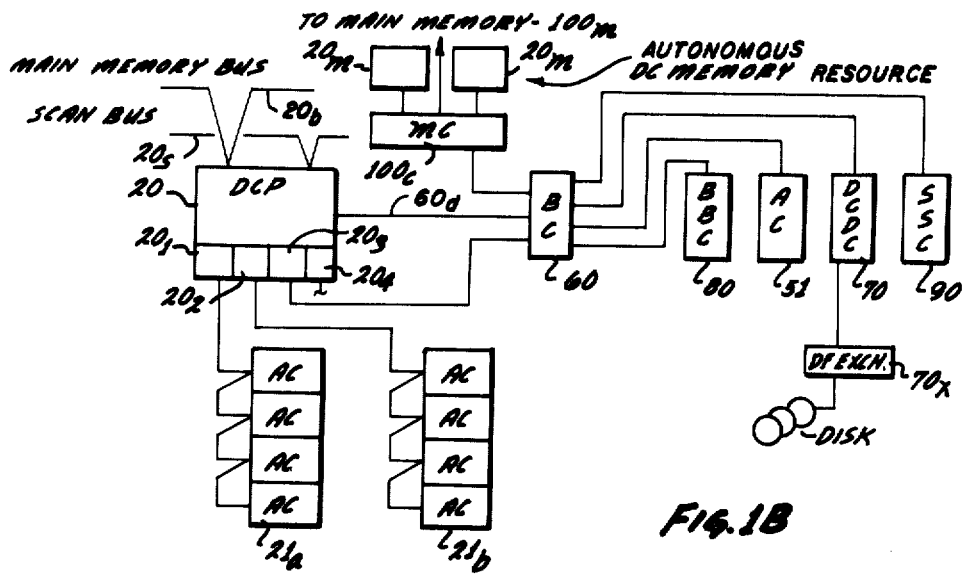
FIG. 1B is a block diagram of a data communication subsystem which may be used within the overall network.

An enhanced data comm subsystem is shown in FIG. 1B. Thus, one of the typical data comm processors which is shown in FIG. 1A can be built and enhanced into a data comm subsystem as shown in FIG. 1B. Here, a data comm processor 20 is shown having cluster-interface hubs $20_1 \ldots 20_4$. Each of the hubs, as for example $20_1$, $20_2$, are connected to a group of 4 adapter cluster controllers such as $21_a$ and $21_b$ of FIG. 1B. Each of the individual adapter clusters is capable of handling up to 16 lines of communication which connect to various parts of a data communications network, as shown in FIG. 1A.

The enhanced data communication subsystem is shown in FIG. 1B whereby one of the cluster interface hubs, such as $20_3$, is connected to an added specialized network of front-end controllers. The interface to the front-end controllers is a basic interface unit 60 which interfaces a set of 4 front-end controllers designated as the Broad Band Controller 80, the Store-to-Store Controller 90, the Data Comm Disk Control 70 and a specialized Adapter Cluster Controller 51. The Data Comm Processor 20 connects to the central processing unit via a Main Memory Bus $20_b$ and a Scan Bus $20_s$.

A Memory Control $100_c$ connects to the Main Memory $100_m$. In addition, there is provided a facility for a local memory $20_m$ designated as "autonomous" memory which is used for independent operation of data transfers during periods when the main system is halted. This local memory resource is generally called DCM or Data Comm Memory for certain configurations, even though in the broad sense data communications memory refers to any memory resource available to the data communications subsystem.

The Data Comm Processor 20 is a small special-purpose computer which contains registers and logic in order to perform all the basic command functions associated with sending and receiving data or controlling Front-End controllers which handle the actual data transfer operations. Up to 4 data comm processors can be connected to an Input/Output processor, FIG. 1A, with each Data Comm Processor capable of accommodating from one to two hundred and fifty-six communication lines. A processor system network holding up to 8 DCP's can provide a maximum system with the ability to serve 2,048 data communication lines to peripheral units.

Each communication channel requires an adapter which provides the logic to interface with a Data Set or to connect directly to a communication line.

A basic data communications processor and associated adapters have been described in U.S. Pat. No. 3,618,037 which issued Nov. 2, 1971, and which was also assigned to the assignee of the herein-described system.

The enhanced data communications subsystem provides innovative hardware and procedural combinations which are compatible with presently existing data comm subsystems and central processing units available in the art. The enhancements consist of a much larger and more readily available "data comm memory" which improves overall system performance by providing direct memory access (DMS) at the message level and which also provides self-arranging configurations with a continuous operation feature. Besides providing the expanded data comm memory feature, the enhanced data comm subsystem provides high-speed, computer-to-computer interface capability by means of Bi-sync and BDLC (Burroughs Data Link Control) procedures, plus data comm to disk tanking of messages and a back-up storage for this system, plus optimization of message handling for the terminal equipment connected to the system. Thus, in FIG. 1B there is provided a Data Comm Memory (autonomous memory) using core and designated $20_m$; combined with 4 front-end controllers and an interface unit (BC) which can be housed in a single cabinet having its own power supply. In FIG. 1B the basic control interface unit can provide memory access to Main Memory $100_m$ or to a local autonomous Data Comm Memory $20_m$.

As seen in FIG. 1B the basic control interface unit (BC) 60 provides the basic interface exchange function for the Broad Band Controller (BBC) 80, the Adapter/-Cluster Controller 51, the Data Comm Disk Controller (DCDC) 70, and the Store-to-Store Controller (SSC) 90. Thus, the basic control interface unit provides configurations for communication with the autonomous Data Comm Memory $20_m$, the Main Memory $100_m$ and the Data Comm Processor 20, or a plurality of data communications processors.

Control information is exchanged between the Data Comm Processor 20 and the Front-End Controllers by means of a DCP/cluster interface hub $20_3$ (FIG. 1B). Command and data blocks are read or written either from or to the Data Comm Memory $20_m$ via a standard memory interface. The Data Comm Processor 20 will also be seen in the configuration of FIG. 5 to have direct connection to the system Main Memory $100_m$ by means of the Main Memory bus $20_b$ and to the host system via the Scan Bus $20_s$.

Briefly, the front-end controllers serve functions as follows: The Basic Control Module of FIG. 16A is a unit designed to allow up to 4 front-end controllers of any mix to be controlled by at least two Data C Communications Processors (FIG. 7) such as DCP $20_A$, $20_B$. The basic control interface unit 60 allows these front-end controllers to share one memory interface. The basic control interface unit 60 also has the function of establishing the priority for access-requesting front-end controllers and to forward the request to the memory resource. This is done by positional locations $67_a$, $67_b$, $67_c$, $67_d$, FIG. 16A, or by jumpers which can be changed in the field.

The Broad Band Controller 80 provides a wide band or broad band interface to the data comm subsystems of different types of existing central processing unit. The purpose of the Broad Band Controller is to provide a means of high speed transmission without unduly overloading the data comm processor and other system components. Its general use is in network communication between host computers or for bulk message transfers at high transmission rates.

The Adapter Cluster Module Controller unit 51 provides the data comm subsystem with low and medium speed communications over the common carrier's voice-grade networks. Transfer of information between the Adapter Cluster Controller 51 and the "data comm memory" takes place at the message level rather than by mere transfer of a character or a word. Thus, by means of message optimization for each of the terminals in the network, there can be a more optimal handling of: the ready status, the data transmission and reception, the answer/call, and the disconnect functions by the minimization of turn around delays and the minimization of data comm processor overhead. The Adapter Cluster Controller 51 allows connection of up to 8 low/medium-speed, full duplex lines. Line adapters are used to provide connectivity from the A C Controller 51 to the interface units for various of the terminals in the data comm subsystem. The poll/select (POLL/SEL), the remote job entry (RJE) and the Burroughs Data Link Control (BDLC) line procedures are supported over lines of 1,200 to 9,600 bits per second (BPS) line speeds for a variety of terminal units in this system.

The Data Comm Disk Controller 70 provides the function of controlling the storing and retrieval of data communication information on disk. The data Comm Processor (DCP) initiates data transfer either to or from the disk by taking an area in the memory resource (which may be Main Memory $100_m$ or autonomous Data Comm Memory $20_m$, FIGS. 1B, 4, 5) consisting of a Data Comm Command Word (DCCW), an address word (DCAW) and also a result word (DCRW) in addition to a "data block," (FIG. 14). The Data Comm Processor 20 constructs a 20-bit address which points to the Data Comm Command Word in the memory. Then the Data Comm Processor 20 (via the basic control interface 60) sends a 20-bit memory address of the Data Comm Command Word. This is received by the Data Comm Disk Controller 70 which begins semi-autonomous operation. The Data Comm Disk Controller 70 will read the Data Comm Command Word from memory. The Data Comm Command Word contains an op-code (OP), a variant field, and a file address of the disk to be accessed. The next word in memory is the DCAW which contains the length of the operation, the number of words to be transferred and, optionally, a 20-bit address pointing to the beginning of the data area. After input-output operations are initiated, the Data Comm Disk Controller 70 begins to transfer information from memory to the disk or from disk to memory. After completion of this data transfer, a "result word" is formed by the Data Comm Disk Controller 70 and written into memory.

The Store-to-Store Controller (SSC) 90 is used by the DCP 20 to transfer blocks of data (one word at a time) to or from the Data Comm Memory $20_m$ and to or from the system Main Memory $100_m$. This frees the data comm processor to perform other operations. When the SSC 90 completes the operation, it stores a result word in the "data comm memory" and also notifies the DCP 20 that the operation is completed.

Figure 2:
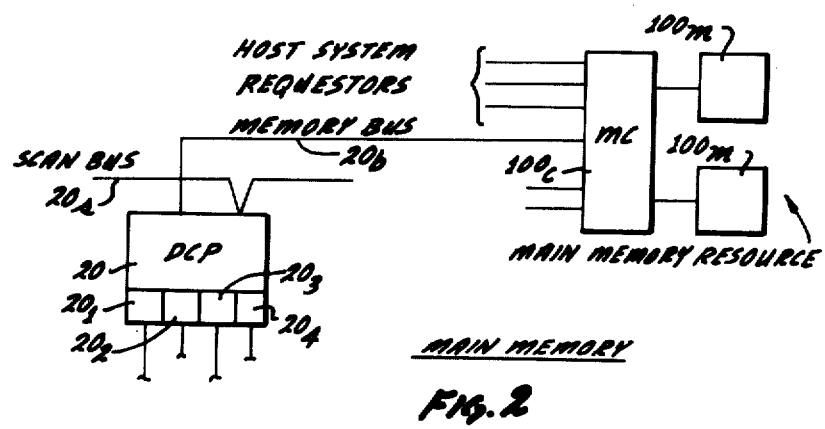
FIG. 2 is a block diagram showing a data communications processor connected to Main Memory.

The basic concept of "data communications memory" involved here broadly involves the concept that specialized instructions, data and information relating to data transfer operations are stored in a portion of memory resource space which will be readily available to the data communications subsystem to facilitate data transfer operations. This memory space, dedicated to data transfer operations, may be placed in the Main Memory $100_m$ (such as seen in FIGS. 1B and 2) or the memory space for data transfer operations may be placed in a local memory resource shown in FIG. 4 and which may be designated as "autonomous" or Data Comm Memory $20_m$ in that this local memory resource may be used as a data communications memory for continuous data transfer operations even though the main host system is halted. A local independent power supply P67 shown in FIG. 4 is an independent source of power for the data communications subsystem and provides local power to the Data Communications Processor 20, the basic control interface 60, to its appended Front-End Controllers, and also the "autonomous" memory $20_m$ which is also called "Data Communications Memory" since the configuration of FIG. 4 provides the autonomous memory $20_m$ dedicated for continuous data transfer operations when the main system is halted or down.

In FIG. 2 the Data Comm Processor 20 is bussed directly into the Main Memory $100_m$ through the Memory Controller $100_c$. The Scan Bus $20_s$ connects the main system to the Data Comm Processor 20.

Figure 3:
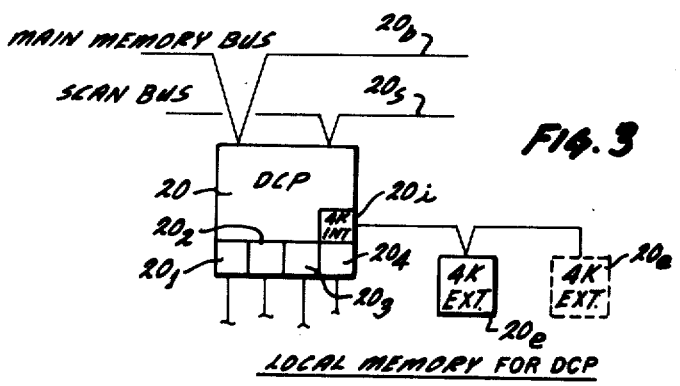
FIG. 3 is a block diagram showing expanded local internal memory for a data communications processor.

In FIG. 3, the Data Comm Processor 20 is seen to have 4K internal memory $20_i$, which internal memory is enhanced by added local memory having external memory units of 4K bytes and designated as $20_e$. This DCP local internal memory is used to store DCP codes needed for DCP operation.

Figure 4:
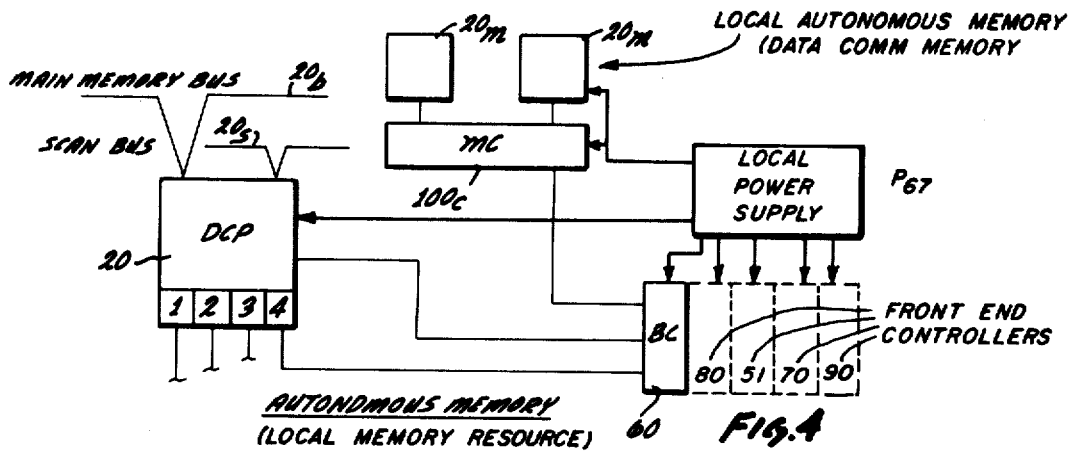
FIG. 4 shows a block diagram of the data communications processor using an autonomous memory and a group of front-end controllers.

In FIG. 4 there is shown the use of "autonomous" Data Comm Memory whereby the local memory resource, consisting of the memory controller $100_c$ and the local storage of core $20_m$, is connected to the basic control interface 60, and which connects to the Data Comm Processor 20. Thus, the autonomous Data Comm Memory resource is provided to the Data Comm Processor 20 by means of the basic control interface 60.

The work "autonomous" is applied to the Data Comm Memory $20_m$ to indicate that when the main host computer is halted, the data communication subsystem can continue data transfer operations by itself, i.e., autonomously and continuously by using Data Comm Memory $20_m$ and the disk file resource.

Figure 5:
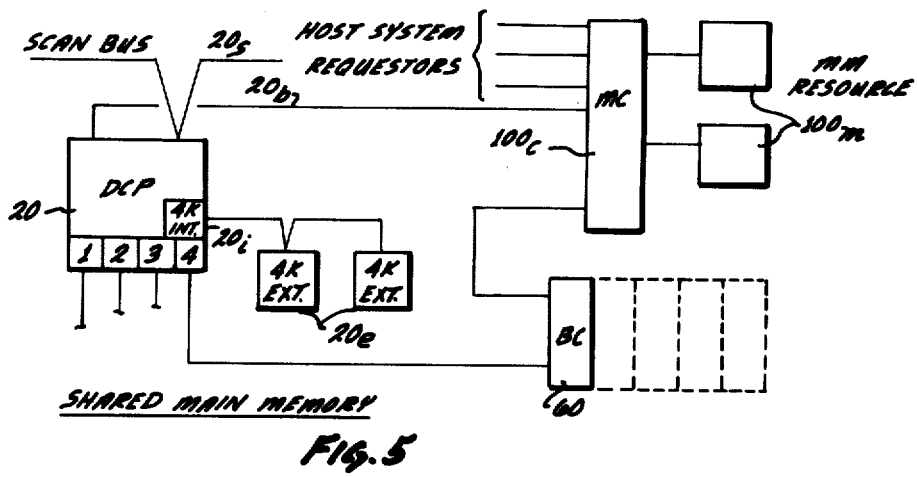
FIG. 5 shows a data-comm processor configuration wherein the data-comm processor and front-end controllers share the Main Memory resource.

FIG. 5 illustrates a configuration permitting the sharing of main memory $100_m$. Here the basic control interface 60 has its own private line to the main memory resource $100_m$ via the Memory Controller $100_c$. Likewise, the Data Comm Processor 20 has its own line $20_b$ to the main memory resource $100_m$. Thus the main memory is shared by the Data Communications Processor 20 and the basic control interface 60 which services the front-end controllers.

Figure 6:
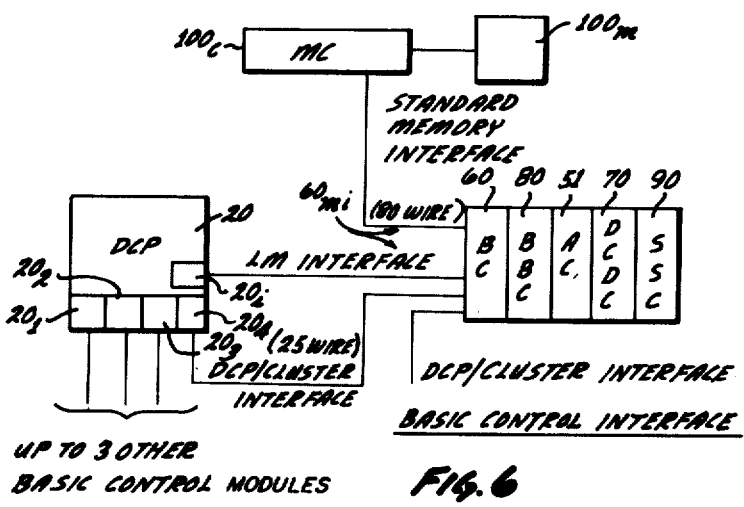
FIG. 6 shows a configuration wherein the data-comm processor uses one of its hubs to interface a basic control interface unit to a series of front-end controllers, which controllers have a channel, via the basic control interace unit, to the Main Memory of the system.

The basic control interface 60 is a key element in this system for handling the front-end controllers. The basic control interface 60 is the interface exchange element between the Data Comm Processor 20, the "data comm memory" (which may include Data Comm Memory $20_m$, Main Memory $100_m$, and the disk-file controller 70 with its disk storage and the four front-end control modules. The DCP/cluster interface hub such as $20_4$ (FIG. 6) allows the receipt of a signal designated as CAN (cluster attention needed-interrupt). The DCP/cluster interface hub also provides the means for front-end controller (FEC) initiation by one or two DCP's and allows the receipt of the CAN response upon command completion by the FEC. The standard memory interface $68_{mi}$, shown in FIG. 6, provides a standard "48 data bit, 3 tag bit, 1 parity bit, 20 address bit" memory interface capability for the basic control interface 60. Thus, this allows memory access to autonomous memory $20_m$ (FIG. 4, autonomous configuration) or to Main Memory $100_m$ (non-autonomous configuration). The standard interface is multiplexed-demultiplexed for up to four controls by the basic control interface 60. As seen in FIGS. 4 and 6, the basic control interface 60 can handle one SSC 90, one DCDC 70, one BBC 80 and one Adapter Cluster 51 (four controllers). Each hub $20_1$, $20_2$, and $20_3$ of the Data Comm Processor 20 could support a separate basic control interface 60 or each hub could handle up to four Adapter Cluster controllers individually.

Figure 7:
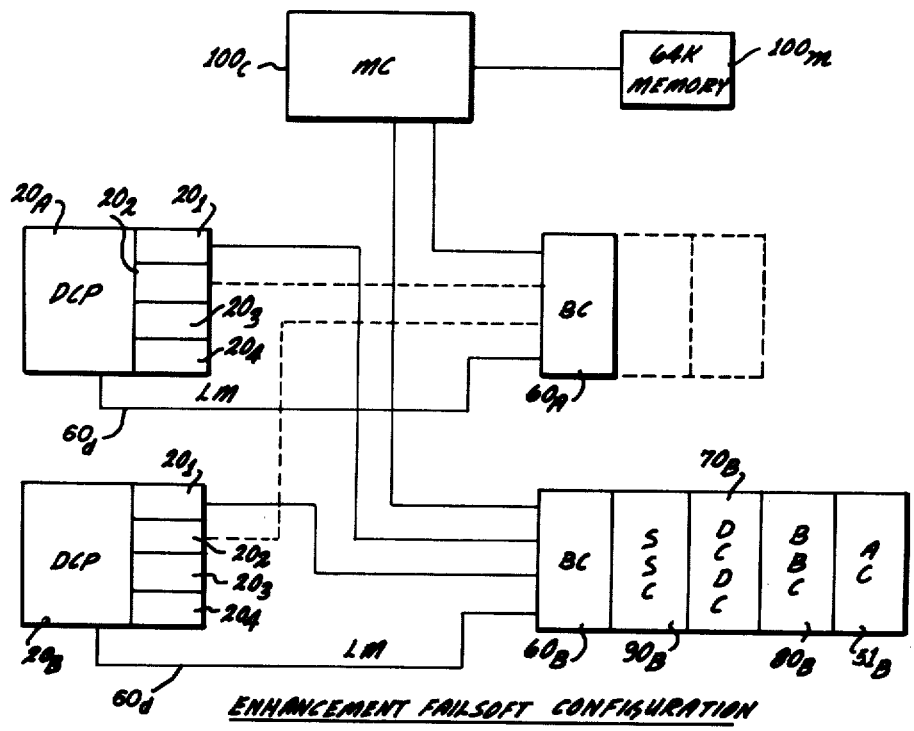
FIG. 7 is a block diagram of a fail-soft configuration wherein two data-comm processors are used with two sets of front-end controllers to provide a configuration permitting data transfer operations even though one of the data-comm processors should become inoperative.

In addition to allowing the data communications processor interrogation of the control register functions/states through the DCP/cluster interface, the basic control interface 60 also provides a fail-soft interface capability by allowing connection to two DCP's and a common memory resource $100_m$ as seen in FIG. 7. The code and the data areas of the memory (in this case $100_m$) are shared by both Data Comm Processors $20_A$ and $20_B$. In FIG. 7 the memory address of the command block (FIG. 14, described hereinafter) is transferred from the Data Comm Processor, such as $20_A$, to the specified front-end controller via the DCP/cluster interface hub such as $20_1$. Command words (within this command block previously built by the Data Comm Processor) are fetched by the front-end controller from the memory resource $100_m$ via the standard memory interface.

In contention for memory access by various front-end controllers, priority is handled by the basic control interface 60. With a plurality of front-end controllers, as in FIG. 16A, normally controller #0 ($67_a$) has the highest priority and controller #3 ($67_d$) would have the lowest priority. However, each of the four possible front-end controller locations might be assigned priority via jumper option.

Generally the setting of the various front-end controls requires establishing priorities such that the highest priority (in the basic control module) is given to the Broad Band Controller 80 and the Adapter Cluster Controller 80 and the Adapter Cluster Controller 51—while the lowest priority would go to the Data Comm Disk Controller 70 and to the Store-to-Store Controller 90.

Figure 8:
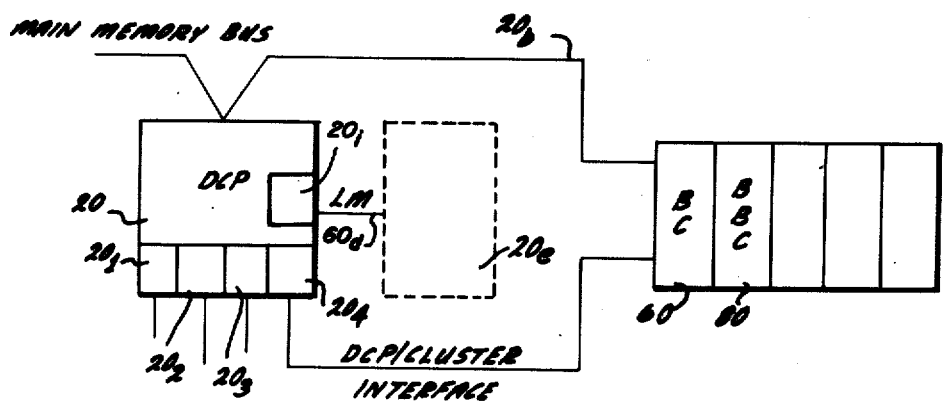
FIG. 8 shows a data-comm processor configuration where there is provided an expanded local memory for a data communications processor in combination with a series of front-end controllers connected to one hub of the data-communications processor.

When the basic control interface unit 60 is connected as shown in FIG. 8, then the basic control allows the Broad Band Controller 80 access to main memory via the main memory bus $20_b$. As seen in FIG. 8, the local DCP internal memory, as $20_i$ and $20_e$, is associated with the Data Comm Processor 20. All running code access to the Main Memory is handled by the Data Comm Processor 20. The local memory $20_i$ (FIG. 8) may be extended to a full 16K words with the connection of the extended local memory $20_e$. The data comm processor-local memory interface $60_d$(LM) is seen in FIGS. 7, 8, and discussed hereinafter in conjunction with the basic control interface 60.

The interfaces and configurations as between the basic control interface 60 and the Broad Band Controller 80 are shown in FIG. 9. The Broad Band Controller 80 provides the data comm subsystem with the capability to communicate with other systems or the common carriers wide band interface by using either binary synchronous Bi-Sync or by using Burroughs Data Link Control (BDLC) line procedures. Various standard sets having line speeds ranging from 19.2K up to 1.344M bits per second can be handled by the data comm subsystem.

In order to allow complete message transmission and reception without interrupting the Data Comm Processor 20, a linking mechanism in the command word retrieves the next command block from the DC (Data Comm) Memory resource and the subsequent data transfer operation begins. Completion status of an operation for each linked command is sent to the Data Comm Processor 20, dependent on variant conditions in the command block and exception conditions in the result status. Each bi-synchronous controller (BBC 80) or each BDLC (BBC 80) controller provides the data comm subsystem with one high-speed full duplex line as per FIG. 9.

Referring to FIG. 10 there is seen the interface between the basic control interface unit 60 and various configurations which use the Adapter Cluster 51. As seen in FIG. 10 an Adapter Cluster 51 can provide eight low to medium speed lines or can be configured to use two adapter clusters for 16 lines or configurated with four adapter clusters to provide 32 low-medium speed lines.

FIG. 11 shows the interface between the basic control interface unit 60 and the Data Comm Disk Control 70. The Data Comm Disk Control 70 provides the data comm subsystem with a "disk tanking" facility for augmenting the data comm memory resources and allowing the receipt and accumulation of requests and messages in the event of a main host system failure. Additionally, the Data Comm Disk Control 70 will alleviate the requirement to utilize only the Main Memory resource for any backed-up output messages. A fail-soft configuration is provided whereby the interface of the disk file system has two ports to provide fail-soft configuration in the event that a failure occurs in one of the disk file systems. Thus, the Data Comm Disk Control 70 interfaces with two disk file exchanges $70_{X1}$ and $70_{X2}$. These disk file exchanges are controlled by the disk file control $70_c$ which interfaces with the main processor system. The disk file exchanges interface with two storage selectors $70_{e1}$, $70_{e2}$, which connect to disk file storage facilities $70_{d1}$ and $70_{d2}$. The fail-soft capability allows the data comm to disk tanking to take place over an alternate path to the disk subsystem in the event of an exchange failure.

The Store-to-Store Controller 90 provides the data comm subsystem with a direct memory transfer capability between the autonomous Data Comm Memory $20_m$, and the Main Memory $100_m$. It can operate asynchronously from the main system, and the Store-to-Store Controller 90 is used in autonomous data comm subsystems in order to augment data block transfers to host system memory. Since data integrity has been established in the Data Comm Memory $20_m$, then initiation of subsequent block transfers to Main Memory $100_m$ allows the Data Comm Processor 20 to perform other operations. For example, the Data Comm Processor 20 may perform a block transfer retry, dependent on any Store-to-Store Controller 90 "exception-conditions" in the Data Comm Memory.

Figure 12B:
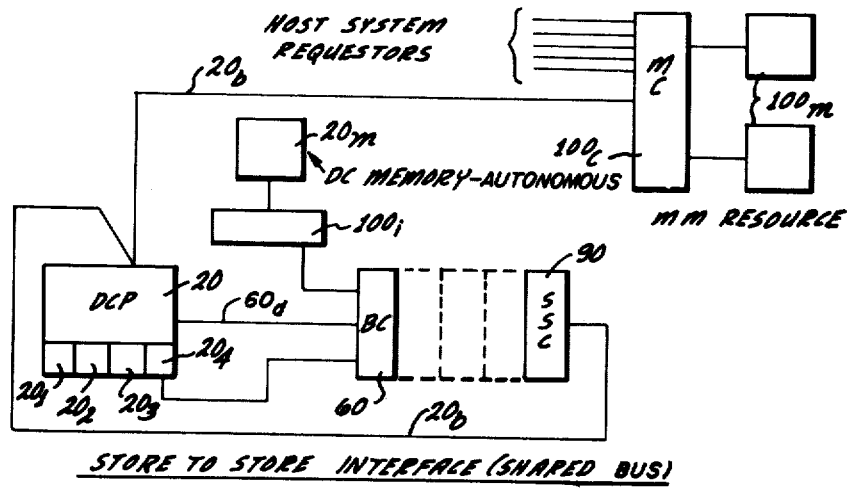
FIG. 12B is a configuration of the data communication subsystem wherein the store-to-store controller shares the Main Memory resource with the data-comm processor.

Memory control hub limitations may preclude separate main memory bus connections for both the Data Comm Processor and the Store-to-Store Controller in autonomous configurations. As seen in FIG. 12B, the Store-to-Store Controller 90 may share the Data Comm Processor memory bus $20_b$ in order to share transfers of data between the Data Comm Memory $20_m$ and the Main Memory $100_m$. FIG. 12A shows the configuration where the Store-to-Store Controller 90 has a separate channel to the Main Memory $100_m$ rather than sharing the data comm processor bus $20_b$ as was seen in FIG. 12B.

Figure 13:
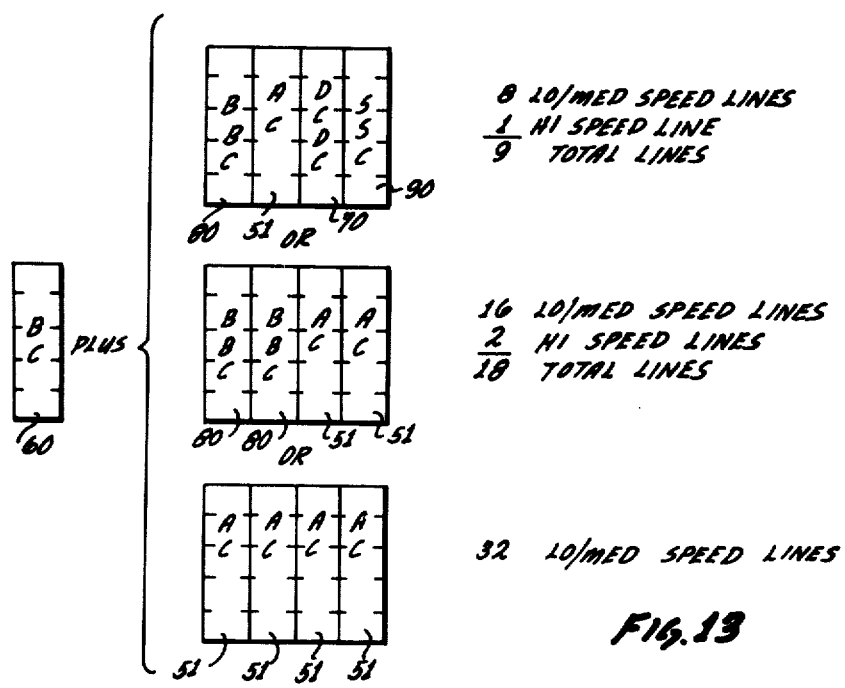
FIG. 13 is a schematic diagram of alternative methods of organization of the basic control interface unit which is used as an interface to various alternative arrangements of front-end controllers.

FIG. 13 shows a typical example of a modular configuration which can be used with the enhanced data comm subsystem. As seen in FIG. 13 a basic control interface unit 60 provides the interface to a first module containing a Broad Band Controller, an Adapter Cluster Controller, a Data Comm Disk Controller and a Store-to-Store Controller to provide, for example, nine lines.

Alternatively, the basic control interface unit may provide an interface for a second module of two Broad Band Controllers 80 and two Adapter Clusters 51 to provide a total of 18 lines. Or alternatively, the Basic Control 60 may provide an interface to a module composed of four Adapter Clusters 51 in order to provide 32 low/medium speed lines.

FIG. 14 indicates a portion of the "data comm memory" which is used as a command block.

This memory space is laid out such that the Data Comm Processor 20 can supply a 20-bit address pointer, such as pointer W, pointer X, pointer Y, and pointer Z, to access particularized command block areas respectively for the Broad Band Controller command block, for the Adapter Cluster command block, for the Data Comm Disk Controller command block, and for the Store-to-Store Controller command block.

FIG. 15A shows the structure of the Data Comm Command Word (DCCW); FIG. 15B shows the Data Comm Address Word (DCAW); while FIG. 15C shows the Data Comm Result Word (DCRW).

The Data Comm Processor 20 places command blocks in a "data comm memory" resource. These command blocks are accessed by either the Broad Band Controller 80, the Adapter Cluster 51, the Data Comm Disk Controller 70 or the Store-to-Store Controller 90. Through the interfaces which are provided by the basic control interface 60, the controllers are initialized by the Data Comm Processor 20 which supplies a 20-bit address pointer through the DCP/cluster interface. The Front-End Controllers retain this pointer during execution of the command block.

Command blocks can also be linked to each other by a link address feature. This permits the Front-End Controllers (FEC) to begin execution of a subsequent command block while a result CAN (Cluster Attention Needed) interrupt is being serviced by the Data Comm Processor for the command block just completed. Thus, in addition to allowing faster turn around for command block initiation, the linking feature permits DCP/FEC simultaneous processing and reduces the controller idle time. Since a 20-bit command block address pointer is used, no absolute areas of "data comm memory" need be specified, with the exception of the fault branch address reservations for the Data Comm Processor 20.

The command block consists of three control words and a variable number of data words. The data comm words, shown in FIGS. 15A, B and C involve:

(1) Data Comm Command Word (DCCW)
(1) Data Comm Address Word (DCAW)
(1) Data Comm Result Word (DCRW)
(n) Data Words (which have a reserved portion in each command block as shown in FIG. 14).

Once the front-end control (FEC) has received the 20-bit pointer (P) through the DCP/cluster interface, the front-end control (FEC) uses P to address the data comm memory. In FIG. 14 a typical sequence would summarize the usual control operation:
1. The DCCW is read from P.
2. The DCAW is read from P plus 1.
3. The Data Transmission/reception begins at P plus 3 and continues until P plus i, to fill or exhaust the Data Block, FIG. 14.
4. The DCRW is written into P plus 2 upon completion, and a CAN interrupt is then sent to the DCP.
5. The Front-End Controller can use the Link Address as a new P to begin the execution of the next command block or to terminate the operation.

Data Comm Command Word

The Data Comm Command Word provides each of the front-end controllers with the initial operation code and variants as can be seen in FIGS. 15A, B and C. The basic operations performed are READ (or RECEIVE), WRITE (or TRANSMIT) and TEST plus variant options for each. In addition to specifying a valid front-end controller type (BBC, AC, DCDC, or SSC) in the operations code, the Data Comm Command Word requires a TAG field equal to "3" to successfully initiate controller operation.

The address field of the Data Comm Command Word provides the controller with the following information:
1. Command Link Address (BBC or AC)
2. Disk File Address (DCDC)
3. System Memory Address (SSC).

Data Comm Address Word

The Data Comm Address Word is used to provide the front-end controller with data block length and location in the data comm memory as may be seen in FIG. 15B. The message length is described in terms of "words" for the Data Comm Disk Control and the Store to Store Controller. The Broad Band Controller and the Adapter Cluster message length is specified by "bytes". The data pointer portion of the Data Comm Address Word of FIG. 15B defines the beginning address of the data block and provides the option of specifying a non-contiguous data block. That is, the data block may be contiguous with the Data Comm Command Word, Data Comm Address Word and Data Comm Result Word (at P plus 3) or be located outside this memory vicinity (at the data pointer).

Data Comm Result Word

The Data Comm Result Word is used by the front-end controller to store operation result information in the "data comm memory." In addition to providing the Data Comm Processor with detailed result status, the Data Comm Result Word specifies the last address of the current operation or the byte count of the data transmitted/received.

Data Comm Processor

A diagram of one preferred embodiment of the Data Comm Processor 20 is shown in FIG. 21A. The Data Comm Processor is an auxiliary processor which performs the task of answering and terminating calls within the system, of observing formal line control procedures, of polling repetitiously and handling all the routine message formatting for the information received and for the information transmitted on the many data communication lines within the network.

The Data Comm Processor 20 has access to the system's Main Memory $100_m$ (FIG. 1A) along with the other main frame units such as the processors $100_{p1}$, $100_{p2}$ and units such as a peripheral control multiplexor (not shown). The memory allocation for a Data Comm Processor is controlled by the interaction of two programs which are used and called the Master Control Program and the DCP Programs. This interaction allows blocks of information to be exchanged. In operation, a data exchange occurs when the host Processor, as $100_{p1}$ or $100_{p2}$, initiates a DCP transaction, typically by setting an "attention needed" condition in the Data Comm Processor, and when the DCP finishes a transaction, which is typically indicted by an "interrupt" condition being set in a multiplexor.

The Data Comm Processor 20 obtains its program from the system's Main Memory $100_m$ or from an optional local memory ($20_i$, $20_e$) such as indicated in FIG. 3 or a specially dedicated local Data Comm Memory $20_m$ (FIG. 4). The use of a local memory reduces instruction fetch time and thus increases the through-put of the DCP. In another configuration, as FIG. 4, a local Data Comm Memory $20_m$ is provided to service the DCP 20 and the front-end controllers of the subsystem having a basic control interface 60. The DCM $20_m$ is called an "autonomous" memory since it can keep the subsystem operating even if the host computer is halted.

The Data Comm Processor 20 of FIG. 21A is an elementary store-to-program computer which contains a small array of inter-communicating registers (21, 22), a simple arithmetic-logical unit 26, an 8-word scratch pad memory $24_{sp}$ and an optional "local memory". This "local memory" could be the internal-external memory $20_i$-$20_e$ or the Data Comm Memory $20_m$ of FIG. 4. The instruction repertoire consists mainly of two and three address instructions which operate on 8-bit bytes in a single clock time. The byte organization fits into a basic half-word (three byte) structure which permits efficient half-word transfers. Registers: The bits of a 52-bit word (Table I) are numbered 0 through 51 from right to left with bit 0 being the least significant bit. Bit 47 is the most significant bit of the information part of the word while bits 48, 49, and 50 are "tag" bits. Bit 51 is word parity bit, generally using odd parity.

The fields are designated such that a particular field in a register "R" is identified by using the nomenclature R[m:n], where little m denotes the starting bit position of a field extending n bit to the right.

Thus, D[6:4] would identify a four bit field of register D which consists of bits 6, 5, 4 and 3.

The 48-bit information part of the 52-bit word is divided into six 8-bit bytes. The bytes are designated 0 through 5 from left to right (however they are addressed by octal digits 1 through 6) and the tag field would be designated as byte 6.

The full word is divided into two 24-bit half-words. The L (left) half-word is comprised of bytes 0, 1, and 2. The R (right) half-word is comprised of bytes 3, 4 and 5. The following Table I shows the bit numbering (1), the designation of fields (b), the bytes designation (c) and the half-word designation (d).

TABLE I (a) Bit Designation

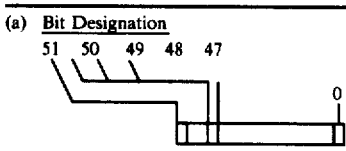

(b) Designation of Fields

TABLE I-continued

```
        7  6  5  4  3  2  1  0
Example: D register [ ][ ][ ][ ][ ][ ][ ][ ]

|←— D[6:4] —→|
```

D[6:4]identifies the four-bit field consisting of bits 6,5,4, and 3.

(c) Byte Designation

```
  47                          0
   \                          /
   [6][0][1][2][3][4][5]
```

(d) Half-Word Designation

```
  |   L       |   R       |
  | half-word | half-word |
  [ 0 ][ 1 ][ 2 ][ 3 ][ 4 ][ 5 ]
```

Referring to FIG. 21A there are three Adapter Interface Registers which are designated $21_A$, $21_C$ and $21_I$, each of which have a size of 8-bits. The Adapter address register, AA, contains an adapter designation. An Adapter is activately designated only during the execution of an Adapter Read, Adapter Write or Adapter Interrogate instruction. When the Adapter Cluster 51 (FIG. 1A) is used, then AA[7:4] contains the cluster number and AA[3:4] contains the adapter number within the cluster.

The AC register $21_C$, called the Adapter Control register, contains bits which typically describe the information on the Adapter Interface. For example, a particular code in the AC register may signify that the AI register contains a data byte whereas other codes may identify AI register contents as control information of various types.

The AI register, or Adapter Information register $21_I$, is the primary information register for the Adapter Interface; it can contain either data or control information.

There are three general purpose registers designated $22_X$, $22_Y$ and $22_D$ which are normally called the D, Y and X registers. Each register has a size of 8-bits. The D register is used as an address register when an indirect destination address is called for, otherwise its use is unrestricted. The Y register contains the indirect source address when one is called for, but the Y register is not used as an address register. When an indirect source address is used, the contents of Y register are copied in the instruction register, $IR_{23IR}$. The X register is referenced in a Branch Relative instruction, otherwise its use is unrestricted. Two Instruction Address Registers designated $22_{I1}$ and $22_{I2}$ are provided having a size of 8-bits each. These registers, labeled IA1, IAO, are concatenated to hold the instruction address. These registers either address DCP local memory $20_i$ directly or they provide the relative part of an address for the host system's main memory. The most significant bit in register IA1 determines which memory the address applies to. The least significant bit in register IAO selects one of the two half-word instructions in a full instruction word. The two instruction registers are counted up automatically as each instruction is loaded. They are loaded by Branch Instructions and they can also be addressed like any other register. If an IA register is addressed as a destination, then a new instruction fetch occurs after the current instruction is completed.

The host system address register, HB $22_H$, has a size of 20-bits and contains the actual instruction address for instruction words in the main system's main memory $100_m$. The actual instruction address is the sum of the relative address in the IA registers and the instruction base address.

In FIG. 21A there are two full-word registers, these being the Instruction Register, $23_{IR}$, and also the Word Register, $23_W$. Each of these registers has a size of 52-bits. The instruction register holds a full instruction word containing two 24-bit instructions. It is loaded from either the DCP local memory such as $20_i$ of FIG. 3 or from the system's Main Memory $100_m$. The Word Register $23_W$ is a memory buffer register for data words. It is used for transferring full words to or from the Scratchpad Memory $24_{sp}$, the DCP local memory $20_i$ and the host system's Main Memory $100_m$ through the Main Memory Interface of FIG. 21A designated as $100_i$. The parity bit in the Word Register [51:1] is automatically generated and checked by a parity checker $23_p$.

The Instruction Register $23_{IR}$ is built to contain a full instruction word of 52-bits which is loaded in the instruction register on a fetch cycle. The instruction word contains two 24-bit instructions. An instruction word must have odd parity and the tag field must have the bit configuration IR [50:3] equal 110. If these conditions are not fulfilled, the instruction word is detected as invalid and the instructions are not executed. In the Instruction Register $23_{IR}$, there are shown several different fields designated as OP, A, B, C. The OP field contains the basic operation code. The A field may be an extension of the OP field or it may contain a register address. The B field typically contains the address of a source or it may contain a literal. The C field typically contains the address of the destination, or it may also contain a literal.

There are three memory address registers each having a size of 8-bits each. These memory address registers are labeled $MA_0$, $MA_1$, and $MA_2$, with respective designations $22_0$, $22_1$ and $22_2$. These three registers are used for addressing the host system's Main Memory $100_m$ and the DCP Local Memory $20_i$. The three registers are always used in the half-word transfer operation and may also be used in the full-word transfer operation. The MA registers receive a half-word selected from a variety of sources, and simultaneously the Memory Address registers are the source of a half-word that is sent to one of several destinations. These MA registers can be concatenated in various ways by means of "shift right MA" instructions in which their contents are shifted right. The MA registers can be also used individually as general purpose registers.

Figure 20A:
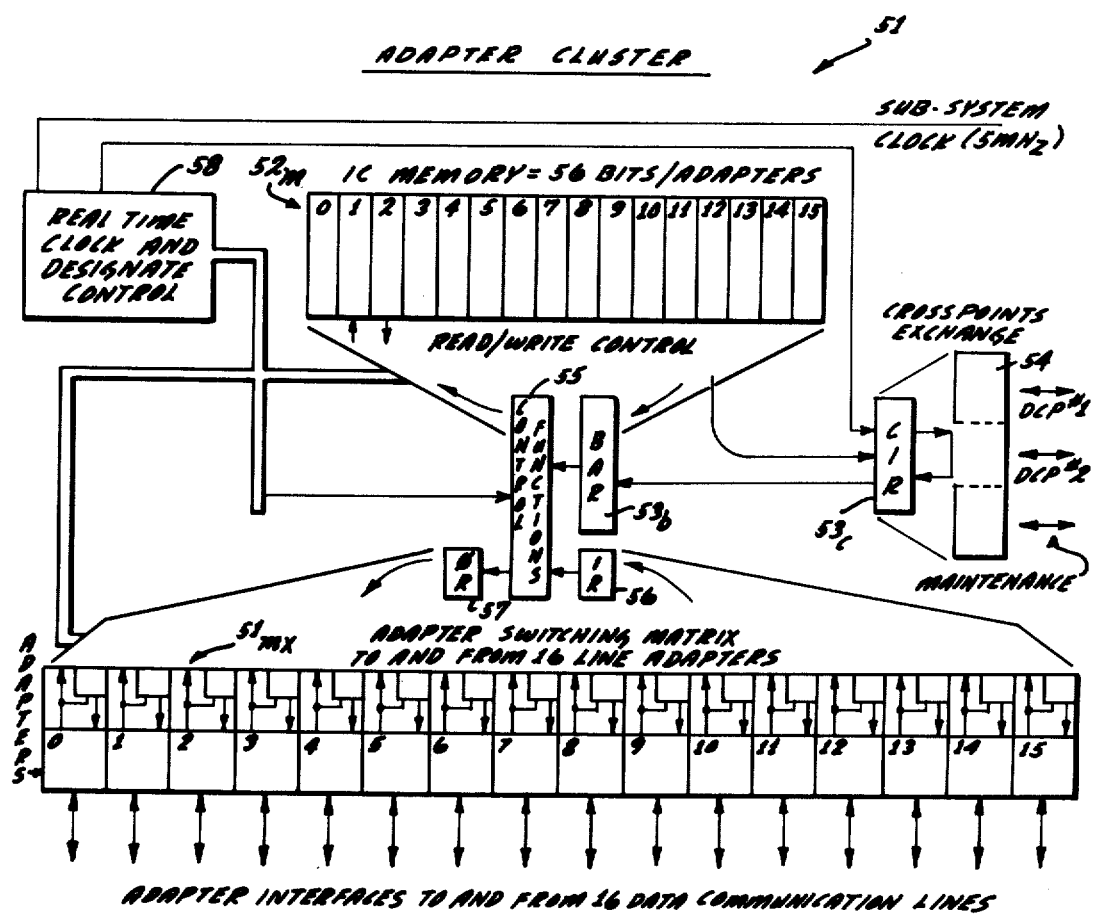
FIG. 20A is a block diagram of the front-end controller known as the adapter cluster.

The Cluster Mask Gate $25_c$ contains 16 independent flip-flops, or one for each of the 16 possible Adapter Cluster units of FIG. 20A. The "1" output of each Cluster Mask flip-flop gates the "Cluster Attention Needed" signal from the corresponding Adapter Cluster. If a Cluster Mask flip-flop is off, the Data Comm Processor 20 does not detect a "Cluster Attention Needed" signal from the Adapter Cluster. In systems in which an Adapter Cluster is connected to two Data Comm Processors, the corresponding Cluster Mask flip-flops in each Data Comm Processor can be loaded so that only one Data Comm Processor responds to a "Cluster Attention Needed" signal. One of the 16 possible Adapter Clusters or pack units is shown by the designation 54.

The Scratched Memory $24_{sp}$ is an integrated circuit memory which utilizes memory cells and it contains eight 52-bit words. The information can be read out or stored in full-words, 24-half-bit words, or individual 8-bit bytes. The read-out is non-destructive; Read and Write are independent and can occur simultaneously in different locations. The Scratched Memory $24_{sp}$ is intended to be used for fast-access temporary data storage. The Scratched Memory locations are like flip-flop registers except that the same location cannot be used both as a source and a destination when the result is a complementary function of the source operand. If the same byte is improperly addressed both as a source and as a destination, an invalid operator fault interrupt will occur.

In FIGS. 1B and 4 the local memory (LM) $20_i$ is an optional word organized memory. A basic unit of the local memory has a capacity of 4,096 52-bit words. In FIGS. 5 and 21A, a local DCP internal memory is shown as $20_i$ and $20_e$ as part of the Data Communications Processor 20. A single full-word is either read or stored on each separately ordered access cycle. The read-out is non-destructive. The words are stored with odd parity and the parity is automatically checked after read-out. A parity error will create a "fault interrupt." The local memory $20_i$ can hold both data and instruction words with a primary use generally for instruction storage. An Access Control unit $20_{ac}$ (FIG. 21A) is used in the Data Comm Processor for accessing the local memory resource. Any access request is interlocked until it is released by an access obtain signal from the addressed local memory module. If the access obtained signal is not received within 8 clock periods, an invalid address fault interrupt will occur. Because the access time to local memory $20_i$ is less than the access time to system Main Memory $100_m$, the use of a local memory increases the processing capacity of the Data Comm Processor. The local memory $20_i$, $20_e$, is also expandable for large memory storage.

A unique and singular aspect of the enhanced data communication subsystem in its relationship to the main host system is the provision whereby the data communication subsystem can continuously operate in an "autonomous" mode independently of the main host system should the main host system fail or be placed in a halted condition.

The relationship of the data communication subsystem may be illustrated with reference to a main host processor system such as the Burroughs B 6700 system which is described and delineated in a reference manual entitled "Burroughs B 6700 Information Processing Systems," Reference Manual 1058633 published by the Burroughs Corporation of Detroit, Mich. 48232, and Copyright 1969, 1970, 1972. This system provides for Input/Output Processors and Data Communications Processors to be interconnected to the main host system. The Input/Output Processor of the main host system provides a Scan Bus which is the communication link between the main host system and various subsystems, such as the data communication subsystem. The Scan Bus consists of 20 address lines, 48 data information lines, 1 parity line and 11 control lines. Input/output processing or data communication operations are initiated via the Scan Bus.

Another interface between the main host system and subsystems, such as the data communication subsystem is a Memory Bus. This bus contains 20 address lines, 51 data (information) lines, 1 parity line and 8 control lines. It transmits information bi-directionally between the main memory and the host processor's "hard registers" A, B, C, X, Y, and P which are described and discussed in the above referenced manual.

The Scan Bus provides an asynchronous communication path between Burroughs' B 6700 processors and data communication processors. Scan operators are used to communicate between the main processor and the I/O subsystem, the data communication subsystem or other subsystems, via the Scan Bus. The "Scan-In" functions to read information from the subsystems to the "top-of-stack" register and the processor. The "Scan-Out" functions perform the operation of writing information from the "top-of-stack" registers in the processor to a particular subsystem such as the data communication subsystem.

The "Scan-In" (SCNIN) uses the A register to specify the type of input required and the Input/Output Processor that is to respond or the particular Data Communications Processor that is to respond. The input data is placed in the B register. The A register is empty and the B register is full at the completion of the operation.

Scan-Out places bits 0 through 19 on the "top-of-stack" word on the Scan Bus Address Line and also places the second stack word on the Scan Bus Information Lines; an "invalid address" interrupt results if the address word is invalid. The A and B registers are empty upon successful completion of a Scan-Out.

The Data Communications Processor of the data communications subsystem is a special purpose processor. It controls a group of Front-End Controllers which handle the transmitting and receiving of messages over the various types of data communication lines connected to peripheral terminals. In the enhanced data communication subsystem the major part of data-transfer functions are unburdened from the Data Communications Processor by use of a group of Front-End Controllers which handle the detailed programs and routines necessary to handle data transfer operations between sending and receiving peripheral units.

The Data Communications Processor is a stored program computer which can obtain its program instructions or control data either from the B 6700 main memory or from an optional local internal memory or a local "autonomous" memory (FIG. 4) called a Data Communications Memory. Through the use of the local internal memory $20_i$ of the DCP and the autonomous memory $20_m$ for the front-end controllers, the competition for space in main memory is reduced and the throughput of the Data Communications Processor and Front-End Controllers is significantly increased due to the reduction in instruction fetch time.

In addition to the elements in structures herein before described for the Data Communications Processor, a specialized "Host System—Data Communications Processor" relationship is provided whereby failures or halts in the main host system will not stop the data communication subsystem from operating and the data communication subsystem may continue to operate independently of the main host system in an "autonomous" mode for the autonomous configuration. This operation may be referred to as "bridging a halt-load".

These provisions for autonomous operations are illustrated in FIGS. 4A and 4B. FIG. 4A shows the functional logic circuitry which is used to sense when the main host system is inoperative or failed so that the data communications subsystem in its autonomous configuration may then operate in its autonomous mode until such time as the main host system returns on-line and is available for interchange of data transfers with the main memory of the host system.

As an illustration, the Burroughs B 6700 as a main host computer puts a Scan-Out signal known as a scan request (SREQ) which provides a "True" pulse every two seconds. Any of a plurality of Data Communications Processors, each having its own data communication subsystem, will continuously sense this pulse as a signal of normal operation in the main host system. These signals are used in conjunction with the circuit of FIG. 4A.

In FIG. 4A an on-line switch 201 provides a signal that the particular Data Communications Processor is on-line with the main host system. This signal is fed into a flip-flop 202 having a Q output which feeds to AND gate 211, while the Q̄ output is connected to a 2 second multivibrator.

Three AND gates 211, 212 and 213 are provided wherein the first AND gate 211 has inputs LNON (Data Communications Processor is on-line) and a second input SREQ (Scan Request from host system on Scan Bus). The second ANd gate 212 has one input from LNON and also another input from the signal TO2S (Time-out 2 second signal). The third AND gate 213 also has inputs from LNON and TO2S in addition to having inputs RUN (signal that the DATA Communications Processor is running) and also HREG/ signal (which means that the holding register in the Data Communications Processor is not set). The HREG/signal comes from a switch having three positions: (a) Hold position—used for off-line operations; (b) Stop on Fault position—which will stop the Data Communications Processor during main system halts and (c) Normal Run position—to permit autonomous operation of the Data Communications Processor during main system halts.

The output of AND gates 211, 212 connect to the J input to JK flip-flop 203 (set time-out). The K input to flip-flop 203 comes through an inverter 205 from the Q̄ output TO2S of multivibrator 204.

A two-second multivibrator 204 (interval timer) is triggered on by a Q signal from the STTO flip-flop 203. This triggers the multivibrator on the positive going pulse (True). The other input to multivibrator 204 triggers the multivibrator on the negative going pulse (False). The Q output of multivibrator 204 provides a signal output both to the second AND gate 212 and third AND gate 213.

The output signal, when it occurs from AND gate 213, will set flip-flops 206 (122) and 207 (123). When both these flip-flops are set, this indicates that the main host system is "down" and the outputs of these flip-flops 206, 207 will be sensed by the software in the Data Communications Processor to cause a branch instruction to occur which will place the Data Communications Processor in an autonomous mode for continuous self operation independently of the main host system and which will also use the disk tanking facility of the disk files to temporarily store and hold all message data and control data which is intended for the main memory of the host system or for the main processor.

Under normal conditions, a signal SAN (System Attention Needed) is a signal that the main system sends to the Data Communications Processor to signify normal conditions of the main host processor and permits normal interchanges of data and information between the main host system and the data communication subsystem. Under these normal conditions the Data Communications Processor will only set the flip-flop 207 (123F). It is only when both flip-flops 206, 207 (122F, 123F) are "set", that this signifies that the main host system is "down".

The scratchpad memory of the Data Communications Processor has a portion designated as IBA or Instruction Base Address.

Certain commands and signals operate between the main host system and each Data Communications Processor. These are:

SAN is a specific command from the host system to the Data Communications Processor to ask if the host system can talk to the Data Communications Processor.

SREQ is "scan request" sent by the host system to the Data Communications Processor as a pulse which recurs every two seconds. It tells a Data Communications Processor that the host system is active.

SAOF is a signal of the Data Communications Processor telling the host system that the Data Communications Processor is ready to accept information or commands.

TO2S SAN is a signal internal to the Data Communications Processor generated by the interval timer 204 during times the host system is halted.

SET IBA is a command which sets a main memory address into a register of the Data Communications Processor prior to the re-establishment of communication by the Data Communications Processor to the main memory and occurs only when the Data Communications Processor is in autonomous mode.

If the main host system does not generate a scan request SREQ every 2 seconds, the interval timer 204 times out and generates a unique SAN called "TO2S" (Time Out 2 Second).

TO2S sets the I23F flip-flop 207 and also sets the 122F flip-flop 206. The I22 being set differentiates the TO2S SAN from the regular SAN where only 123F flip-flop 207 is set during normal operations of the main host system. TO2S SAN does not set the SAOF (Scan Address Obtained Flip-Flop) as is done by the regular SAN.

Interval Timer Logic: The Interval Timer Logic in FIG. 4A shows gates 211 and 212 providing the logic conditions for triggering the 2 second timer. Gate 213 is time-out logic for the "TO2S" SAN (2 second time out - system attention needed).

The two second interval timer 204 is triggered (when the TO2S output is false) with the Data Communications Processor on-line switch in the "on-line" position. Gate 211 monitors the SREQ signal. As long as the SREQ's are received within a 2 second time interval from the scan bus, the STTO flip-flop 203 sets and re-triggers the 2 second timer (TO2S goes low). However, if the SREQ is not received within a 2 second interval, the 2 second timer is not re-triggered, causing the timer to time out (TO2S goes into the True state). With the TO2S in the True state, then the gate 212 is enabled which re-triggers the 2 second timer for a new timing period. In conjunction with the new timing period, gate 213 sets 122F and 123F which reflects the TO2S SAN signal.

If the main host system has gone down and the flip-flops 206, 207 have been set within the Data Communications Processor, it is necessary that the Data Communications Processor receives the Scan Request in order to re-start the timer multivibrator 204 and that it also receives from the host system a new "Set IBA" command so that the Data Communications Processor can send its Scan Access Obtained Signal (SAOF) and can receive a new Instruction Base Address (IBA) into its SMO-L, scratchpad memory-left at the zero location. However, the Data Communications Processor does not yet use the new Instruction Base Address for accessing main memory at this time but continues tanking operations with disk files until it gets the SCAN command (System Attention Needed). Then the Data Communications Processor re-sets the flip-flop 206 (122F) and then can operate normally with the main system.

FIG. 4B shows the sequence of operation whereby a Data Communication Processor senses a failure or halt of the main host system and also how it regains communication with the main host system after recovery of the main host system.

Referring to FIG. 4B, there is seen a flow chart of Data Communications Processor autonomous operations during the occurrence of a halt-load or failure of the main host system. As seen in FIG. 4B, there are two flip-flops 122F and 123F (designated 206 and 207 in FIG 4A). Normally when the main host system is operating it sends a pulse every two seconds to the Data Communications Processor to see if there are any requests being made to the main system (SREQ). In the normal conditions of operation the flip-flop 123F (element 207) is "set" to show that standard SAN commands are coming from the main system (System Attention Needed).

Referring to FIG. 4B it will be seen that as long as the system request pulses (SREQ) continue, the "yes" branch will restart the timer and the timer will not time-out. Thus, the standard situation of normal intercommunication between the main host system and the Data Communications Processor will continue. All Data Communications Processors in the network are connected to the host system Scan bus to sense host system activity regardless of which particular Data Communications Processor is actually being addressed.

If there are no longer any more system request signals, the "no" branch of FIG. 4B shows that the interval timer in the Data Communications Processor will "time-out" and thus set both flip-flops I22F and I23F.

When a Data Communications Processor senses the "set" of both flip-flops I22 and I23 (206, 207 of FIG. 4A) due to no "scan-out" signals from the main system and consequent time-out of the interval timer, then sensing logic from the software operations of the Data Communications Processor will recognize the "setting" of these two flip-flops (122F and 123F) to cause a branch instruction to place the data communication subsystem into the "autonomous" mode.

At this point the Data Communications Processor begins "taking" mode of operation whereby the data communications disk control will act as a surrogate for the main memory and will temporarily store all control and message data during the down time of the main host system. After the main system is back "on line," this information which is tanked on disk can then be communicated to the main system as necessary or to other peripheral terminals in the system.

As long as there are no system request SREQ signals, the Data Communications Processor continues operating "autonomously" by initializing various of its Front-End Controllers so they will continue with data transfer operations between sending and receiving units and for storage of informational data on the disk file systems.

Once the SREQ signal returns to the Data Communications Processor, it restarts the timer 204, but this is yet not sufficient for re-initiating the main host system—data communication subsystem intercommunication, and the Data Communications Processor continues its autonomous operation including the "tanking" operation.

In order for the normal operating relationships to be re-established between the main host system and the data communication subsystem, the following actions must occur: the main host system, once it is operating again, will scan out a system request (SREQ) signal and also a "set IBA" command. The set IBA command (Instruction Base Address) provides an address of main memory for the Data Communications Processor to access, when normal relationships are re-established. This Instruction Base Address is placed into the zero position the left-hand side of the scratch memory $24_{sp}$ (SMO-L) of the Data Communications Processor, FIG. 21A.

Still however the Data Communications Processor does not use this new Instruction Base Address but continues its tanking operations until the Data Communications Processor can receive a system attention needed (SAN) signal from the main system. When the main host system scans out SAN command, then the Data Communications Processor will reset flip-flop 122 (element 206) and will then use the newly received Instruction Base Address (IBA) in order to access main memory of the main host system.

Thus, the system relationships are re-established in the "normal" fashion whereby the Data Communications Processor and its group of Front-End Controllers will have memory access to either data communications memory $20_m$ or to the main memory $100_m$.

Even however in the normal mode of operation, the Data Communications Processor 20 and the Front-End Controllers (such as 51, 70, 90) will still relieve the main host processor of data transfer functions and will relieve the main memory of memory storage functions since these functions will be handled by the Data Communications Processor and the data communications memory, DCM. Further, the Data Communications Processor 20 is relieved of the bulk of its data processing burdens by means of the specialized Front-End Controllers which handle the specific data transfer needs of a variety of peripheral terminal devices and line disciplines.

The Data Communications Processor has a Main Memory Interface $100_i$ which is basically a memory bus to the host system. The Data Communications Processor 20 can be connected to a host system's peripheral control multiplexor word-interface hub. Here the Data Communications Processor's requests to Main Memory are passed on to the host memory system through the multiplexor by sharing the multiplexor memory bus. If the Data Communications Processor and the multiplexor are not using the same 5 Megahertz master clock, the multiplexer word interface will then provide the synchronizing function.

Two Data Communications Processors, each acting as a requesting unit, can share one memory bus. If this is done, the Data Communications Processors must have intercommunications to prevent any conflicts in the use of the shared bus. This communication requires a separate interconnection of two signal lines.

Referring again to FIG. 21A, an arithmetic-logic unit 26 in the Data Communications Processor can perform operations on 8-bit bytes, providing such functions as add, subtract, logical AND, logical OR, logical exclusive OR. The logic unit 26 has two input buses A and B in addition to an output bus C.

A hardware translation unit $26_t$ is made part of the arithmetic logic unit in order to translate, on a byte-to-byte translation, as follows:
EBCDIC to USASI—(8-bits to 7-bits)
EBCDIC to BCL—(8-bits to 6-bits)
USASI to EBCDIC—(7-bits to 8-bits)
BCL to EBCDIC—(6-bits to 8-bits)

Fetch Cycle: The fetch cycle loads a full instruction word into the instruction register $23_{IR}$. The instruction word can be read from the Data Comm Processor Local Memory $20_i$ or from the host system's Main Memory $100_m$ via the Main Memory Interface $100_1$.

The host ($100_{p1}$, $100_{p2}$) or Master Processor (FIG. 1A) has ultimate control over the Data Comm Processor 20 by means of a scan bus 27 (FIG. 21A). This corresponds to $20_S$ of FIGS. 1B, 2, 3, 4, 5. The Data Comm Processor accepts three different "scan-out" orders. These are: Initialize, Set Attention Needed, and Halt. The Data Comm Processor 20 does not accept a "scan-in" order. A designation or address is a sign to each Data Comm Processor by means of pluggable jumpers. A Data Comm Processor recognizes only the scan orders that contain the specified Data Comm Processor address. Normally the Data Comm Processor will return a ready signal on the scan bus 27 when the Data Comm Processor 20 is addressed by any scan order. The ready signal allows the main system processor to maintain the scan order in anticipation of a scan access obtained signal. The scan access obtain signal is sent by the Data Comm Processor when it performs the scan-out operation as directed or when it detects an invalid scan order. The absence of a ready signal on the scan bus is detected by a time-out in the main system processor, which will then end the scan order. The Data COMM Processor is then identified as being not-present in the system or at least not available.

Initialize: When recognized by a Data Comm Processor, an Initialize scan-out turns on the run flip-flop and creates a fault interrupt. This fault interrupt takes precedence over any other fault interrupt. The 20-bit instruction base address (in the scan-out information word) is stored in the L half-word of the scratchpad memory word "O". The interrupt branch address is an "all-O" address for Main Memory; the special stop conditions that might otherwise prevent the fault actions are inhibited. The first instruction word is fetched from the Main Memory location that is addressed by the instruction base address.

System Operation: The Data Comm Processor 20 places command blocks in the Data Comm Memory which the Front End Controllers can access through the basic control memory interface 60. The Data Comm Processor 20 initializes the Front-end Controllers by supplying a 20-bit address through the cluster interface of the basic control interface 60. This 20-bit address constitutes a Pointer (P) (FIG. 14) and the Front-End Controller retains this Pointer during execution of the command block.

The command blocks can be linked to each other by the Link Address (FIG. 14) such that a Front-End Controller can begin execution of the next block while a result CAN (Interrupt) is being serviced for the previous command block. Thus, linking permits faster turn-around for the Front-End Controllers so they are not dependent on DCP servicing time. The DCP will have time to process the previous command block while the Front-End Controller is executing the next. Since a 20-bit pointer address is used, there are no absolute areas of Data Comm Memory which are required.

Use of Control Words: The command block constitutes three control words plus a data block. These words are designated:
One word—Data Comm Command Wod (DCCW)
One word—Data Comm Address Word (DCAW)
One word—Data Comm Result Word (DCRW)
n words—Data Words Once a Front-End Controller has received the 20-bit pointer (P) through the cluster interface from the Data Comm Processor 20 (FIG. 16B), the Front-End Controller places the address in the address register of the memory interface 61 and reads the first Command Word. This word contains information about operation and variants of it to be performed. These operators are transferred to the command register of the Front-End Controller while the address register in incremented by "1".

Using P plus 1 as an address, another memory read is performed; this "P plus 1" address will thus access a control word which will contain address information such as the length of the data block (FIG. 14) plus a data pointer which indicates the data block.

The address register (or data pointer) is incremented by "plus 2," thus directing the Data Comm Processor past the result word area and over to the first data word. Now transmission can begin according to the required characteristics of the Front-End Controller.

When this operation is completed, a CAN (Interrupt) will be given to the Data Comm Processor 20 through the cluster interface $20_4$ (FIGS. 8, 16B), and the results of this operation will be stored in the Result Word of the Command Block. If an error was detected, a special control CAN interrupt will be given to inform the Data Comm Processor 20 of any special action needed.

Operation of Front-End Controllers: The following brief sequence will serve to indicate a typical operational sequence in the subsystem using the Front-End Controllers (BBC 80, AC 51, DCDC 70, SSC 90 of FIG. 1B):

1. The Data Comm Processor 20 finds the appropriate command block in data comm memory, such as the BBC command block of FIG. 14.
2. The Data Comm Processor 20 executes a cluster write command to the designated unit, such as the BBC 80. These "Writes" will contain the address pointer or command information.
3. The "AC" field of the cluster write information (CWI) points to certain registers in that Front-End Controller. The Data Comm Processor 20 can control the Front-End Controller, as BBC 80, through the cluster interface, as $20_4$ to initialize procedures or to initialize data transfers.
4. The Front-End Controller, BBC 80, now uses the Pointer to request a memory read through the Basic Control 60 memory interface unit 61 for command words.
5. The Front-End Controller, BBC 80, now completes its operation and notifies the Data Comm Processor 20 by a CAN signal that it is finished.
6. The Data Comm Processor 20 interrogates the Front-End Controller during operation to test the state of a modem or a peripheral interface. It can also read or write buffer areas and registers for testing purposes. The Data Comm Processor can also halt a Front-End Controller or clear it during an operation.

The Basic Control Module: In the preferred embodiment the basic control module is a cabinet housing a basic control interface unit and four front-end controllers (FIG. 16A).

The basic control interface unit 60 is the central element for connection of the data communications processor, the front-end controllers and the data communications memory (which may be main host memory, autonomous memory, or other memory resource). The basic control interface unit provides access to the data communications memory for the data communications processor and for the front-end controllers. Data words are used to address the "data communications memory" such that any area of storage or memory resource of the system can be accessed by the data communications processor or any of the front-end controllers.

Communication lines from the four front-end controllers are multiplexed by the basic control 60 into one standard memory interface of eighty coaxial wires. The basic control interface unit 60 also allows the data communications processor to communicate to any selected one of four front-end controllers (FEC) which are connected to the basic control interface unit in the basic control module. A command block address is written into the front-end controller by the data communications processor causing the FEC to retrieve a command word from a data communications memory resource. This command word, which was previously built by the data communications processor, contains the command information for the selected one of the front-end controllers. The front-end controller then executes the command and reports its results back to the data communications processor 20 by an "interrupt" (CAN).

The basic control interface unit 60 requests access to data communications memory (whether main memory or autonomous memory, or other memory resource) through the memory control of the data communications memory. Once memory access is granted, the word is read from or written into the memory. Also, the basic control interface unit transfers memory words to and from the front-end controllers, or to/from the data communications processor.

The basic control interface unit also allows data communications processor control information to pass from the data communications processor to the front-end controller. Thus, in this manner the DCP 20 starts, stops and interrogates each front-end controller (FEC). Each front-end controller stores up to one word of data before it requests a transfer of the word. Thus, in an adapter cluster module controller which has 16 transmission lines, there can be up to 16 words waiting for memory access. As the central connective element, the basic control interface unit 60 also resolves priorities as between the front-end controllers, the data communications processor and the data communications memory resources.

Figure 16B:
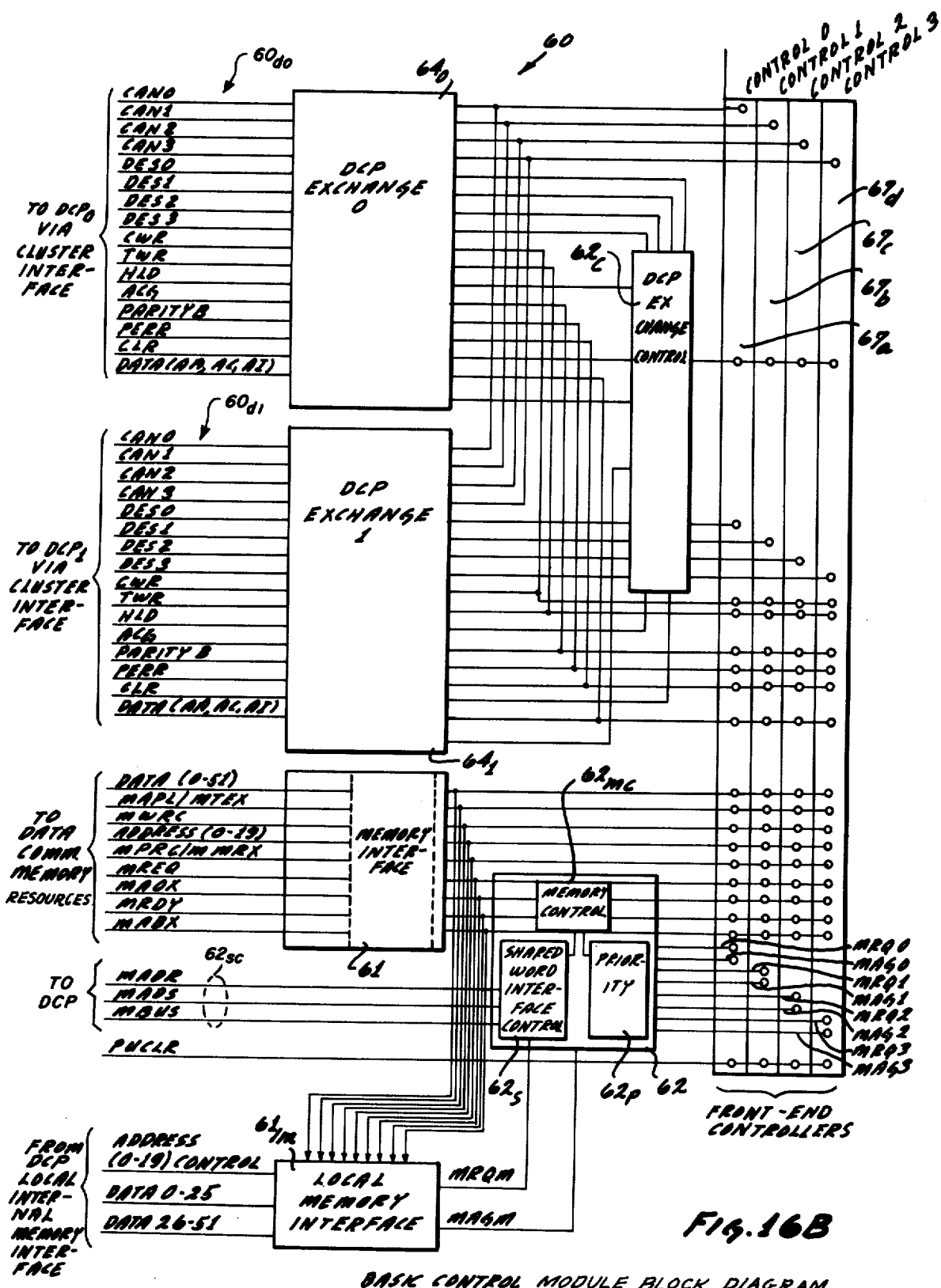
FIG. 16B is a more detailed block and line diagram of the basic control interface unit.

As seen in FIG. 16B, the basic control interface unit 60 of the basic control module provides interfaces $67_a$, $67_b$, $67_c$, $67_d$ (FIG. 16B) for up to four front-end controllers. These interfaces to the front-end controllers are connected to a data communications memory interface 61 to provide communication to the available memory resources; in addition the basic control interface unit 65 provides connection lines $60_{do}$, $60_{di}$ for up to two data communications processors. In addition the basic control interface unit provides an interface, known as the local memory interface, $61_{lm}$, which permits one data communications processor to access the data communications memory resources through the basic control memory interface 61.

As seen in FIG. 16A, the basic control 60 provides an interconnection to each front-end controller through two 80-pin interframe jumpers (IFJ1, IFJ2). IFJ1 ($68_1$) contains all the signals for the DCP cluster/control interface and also the address and control lines for data communications memory resources. IFJ2 ($68_2$) contains all the data communications memory information lines, the control request lines ($MRQ_n$) and the memory access granted ($ACG_n$) signals (FIG. 16B).

The control signals are thus passed to each front-end controller through the interframe jumpers connected to each of the front-end controllers located at $67_a$, $67_b$, $67_c$ and $67_d$, FIG. 16A.

The basic control interface unit 60 is arranged to allow up to four front-end controllers (FECs) to be controlled by at least two data communications processors, $DCP_0$ and $DCP_1$ of FIGS. 16A, 16B). The basic control interface unit also is provided with capability to permit at least one data communications processor, through a local memory interface $61_{lm}$ of FIG. 16B, to share the data communications memory resources with the four front-end controllers.

As seen in FIG. 16B the basic control interface unit 60 provides for four types of interfaces:

(a) DCP cluster interface $60_{do}$ and $60_{di}$: here the exchange 0 and the exchange 1 connect to a $DCP_0$ cluster exchange $64_0$ and to a $DCP_1$ cluster exchange $64_1$.

(b) A data communications memory interface 61: here, at the memory hub, address lines and information lines can be connected to the autonomous memory in the autonomous mode or to the host system main memory in the non-autonomous mode.

(c) Local memory interface $61_{lm}$ to a single data communications processor: this interface connects lines to one of the local data communications processors in order to provide the data communications processor with the capability of accessing a data communications memory resource through the basic control interface unit.

(d) Interface to the front-end controllers: as seen in FIG. 16A this interface is formed of two interframe jumpers IFJ1 and IFJ2 which provide lines to each of the four front-end controllers $67_a$, $67_b$, $67_c$, $67_d$, in the basic control module.

The basic control interface unit also transfers the interrupt signal CANs (control/cluster attention needed signal) to the data communications processor. When a front-end controller is designated for selection by a data communications processor, the signals are synchronized and transmitted to the designated front-end controller. The basic control interface unit 60 provides the synchronization and the priority resolution on the DCP/cluster interface. Otherwise this interface will only operate asynchronously with the data communications processor.

The basic control interface unit's memory interface 61 is shared by the local memory interface $61_{lm}$ and also by the four front-end controllers. The basic control interface unit resolves requests for priority via priority selection unit $62_p$ and also initiates a data communications memory cycle. The data communications memory requests are given priority as follows:

(a) DCP local memory interface (MRQM);
(b) Positional priority according to location of each of the front-end controllers. Thus, location 0 has the highest priority and location 3 has the lowest priority. This, however, can be altered by the arrangement of jumper strips.

The basic control memory interface 61 is connected to "autonomous" memory $20_m$ when in the autonomous configuration, and it is connected to the host system main memory when it is in the non-autonomous configuration. The basic control interface unit 60 shares a common word interface $62_s$ with a data communications processor coordinated via control lines $62_{sc}$. Further, the basic control interface unit will detect the "memory not ready" condition and will transfer the signal to the particular front-end controller involved. The front-end controller involved will process these error signals by using the Result Word format used by that particular front-end controller.

As seen in FIG. 1B, the basic control interface unit 60 provides the interface between the data communications processor 20, the autonomous data communications memory $20_m$, and the four front-end controllers 51, 70, 80 and 90. The basic control unit 60 provides interfaces to the host system memory $100_m$ in the "non-autonomous" configuration, and to both the DCP 20 and the autonomous data communications memory $20_m$ in the "autonomous" configuration.

FIG. 16A is a block diagram which illustrates the major elements of the basic control 60. FIG. 16B is a more detailed schematic drawing showing the elements and interconnections which comprise the basic control unit.

One preferred configuration of the basic control unit 60 is to interface at least two data communications processors to the four "front-end controllers" (Data Comm Disk Control; Broad Band Control; Adapter Cluster Control; Store-to-Store Control). In addition the basic control 60 permits the front-end controllers to share a memory interface 61 with the autonomous data communications memory $20_m$, main memory $100_m$ (FIG. 1B) or internal memory $20_i$ (FIG. 3). The basic control does not modify any data which passes through it but is basically "transparent" to such data passing through. A signal designated as the CAN (Cluster/Control Attention Needed) is used in the system and this signal is passed by the basic control 60 to the data communications processor 20.

Further, the basic control 60 also provides the necessary synchronization and the priority resolution of the interface between the data communications processor and the adapter cluster or other front-end controllers. One of the functions of the basic control 60 is to establish the request priority and to forward this request to the data communications memory accessed. The "priority" on the memory request is handled by means of a jumper. These jumpers can be set in a certain position to determine priority. For example, in FIG. 16A the control section "0" will have the highest priority and the control section "3" will have the lowest priority. This, however, can be changed or rearranged according to the physical location of jumpers attached to the basic control module.

As seen in FIG. 16A, the bus 61 to the memory interface enters the basic control interface unit 60 where it connects to a memory priority and exchange control unit 62 having a data storage area 63. Buses 65 and 66 connect first and second data communications processors into the data communications processor exchange section 64. The basic control 60 has four control sections designated $67_a$, $67_b$, $67_c$, $67_d$, each housing a front-end controller.

The memory interface 61 can be connected directly to the memory control $100_c$ of the autonomous memory $20_m$ of FIG. 4. This memory interface 61 has the capability of being connected directly to memory control $100_c$ or to a multiplexor word interface. Logic is made available to allow the basic control to share a common work interface ($62_s$, FIG. 16B) with a data communications processor (or any unit designated in the same manner) which thus allows sharing of a memory word interface hub, as previously described.

The basic control interface unit 60 can detect the "memory-not ready" error and then pass the error signal to the front-end controller. However, all other errors are transparent to the basic control 60; thus, it is the individual responsibility of each controller to process the error signals according to the result word format of the particular front-end controller.

In FIG. 16A the elements $68_1$ and $68_2$ are Interframe Jumper number 1 (IFJ-1) and Interframe Jumper number 2 (IFJ-2). The number 1 Interframe Jumper has all the signals for a data communications processor interface and also the address and the control signals for the data communications memory resource. The number 2 Interframe Jumper has all the memory data lines, the control request lines and the memory access granted ($MAG_n$) signals.

Referring to FIG. 16B, there is seen a more detailed schematic diagram illustrating the various elements and connecting lines of the basic control module 60.

Referring to FIG. 16B the four control sections of the basic control module are shown as $67_d$, $67_c$, $67_b$ and $67_a$. Communications to two data communications processors are provided through the Exchanges $64_0$ and $64_1$ which are designated as DCP Exchange 0 and DCP Exchange 1. The activity of the DCP Exchanges $64_0$ and $64_1$ are handled by a control unit designated as the DCP Exchange Control $62_c$. (The general configuration using two DCP's is shown in FIG. 7).

The DCP Exchanges $64_0$ and $64_1$ (FIG. 16B) are provided with control logic which:
(a) resolves priority as between the DCP Exchanges 0 and 1. That is to say, when two data communications processors are connected to a basic control interface unit 60, only one data communications processor (DCP), at any given time, can access and operate the front-end controllers attached to the basic control interface unit 60.
(b) generates a hold (HLD) signal to inform the other non-using DCP that the first DCP is using the system at that moment.
(c) encodes the four "designate" signals from each DCP exchange into four individual signals ($DES_0$, $DES_1$, $DES_2$, $DES_3$) which are then sent to the selected front-end controller, FEC.
(d) encodes the clear (CLR) signal from each DCP Exchange $64_0$ and $64_1$ to one signal line common to all four of the front-end controllers.

One function of the DCP Exchange Control $62_c$ is to provide logic to ensure that a DCP read/write, or interrogate operation, does not interrupt a current operation controlled through the other DCP Exchange. This is accomplished through the use of flip-flops in $62_c$ (not shown) which may be designated as the $SYNC_n$, HLDF$_n$, and XPTF$_n$ flip-flops, where n can be 0 or 1 to refer to the DCP Exchange 64$_0$ or 64$_1$.

The four designate (DES$_n$) signals are wired-ORed to the input of the SYNC$_n$ and the HLDF$_n$ flip-flops. A TRUE on any of these lines sets SYNC and HLDF flip-flops on the next clock. This gives the signals for DCP Exchange O to have priority over the signals from DCP Exchange 1. With the HLDF flip-flop set, a hold signal (HLDX$_n$) is sent back to the respective DCP causing that DCP to retain the AA, AC, and AI lines until the front-end controller returns the access granted ACG signal. The access granted ACG signal overrides the HLD signal in the DCP, thus releasing the DCP to the front-end controller.

Communications to the data communications memory resource are handled by the memory interface unit 61. The memory interface 61 provides its output to a unit 62 having a memory control 62$_{mc}$, a shared word interface control 62$_s$ and priority logic 62$_p$. The designations and functions of the communication and control lines illustrated in FIG. 16B are discussed hereinbelow under a series of tables.

The attached Table II indicates the interframe jumper signal lines which are designated in FIG. 16B.

TABLE II

INTERFRAME JUMPER SIGNAL DESCRIPTION

Signals From the Basic Control to a Front-End Controller

| SIGNAL | DESCRIPTION |
|---|---|
| DES$_n$ <br> n=0-3 | DESignate front-end controller n. <br> The designate signal is an individual line to each front-end controller. When high the designate signal indicates that a DCP is executing a command to the designated front-end controller. |
| CWR | Control WRite <br><br> This line is a common signal to all front-end controllers indicating a control write. When high, this line in conjunction with the designate signal, indicates that either a write command or the write portion of an interrogate command is in progress. |
| IWR | Interrogate Write Read <br><br> This line is a common signal to all front-end controllers. When high this line in conjunction with the DES signal indicates that an interrogate command is being executed by the DCP. During the write portion of the interrogate command DES, CWR, and IWR will all be true. |
| CLR | CLeaR <br><br> This line is a common signal to all front-end controllers. The signal is the Programmatic clear from the DCP, which is activated by ACS signal during a DCP AWI command. <br><br> This signal should not be acted upon by the front-end controller unless the designate signal is high also. This line is intended to clear all necessary control and interface flip-flops unconditionally. |
| CAN$_n$ <br> n=0-3 | Control Access Needed unit n <br> The CAN signal is a single line unique to each front-end controller. When high this signal indicates to the DCP that the controller has information for the DCP. The signal will be held true until a read is performed by the DCP. |
| ACG | ACcess Granted <br><br> The ACG line is a common signal to the DCP. The ACG signal is to be held true for two (2) clock periods during a write and three (3) clock periods during a read. The clock periods are the same as described above for the write and read portions of the |

TABLE II-continued

INTERFRAME JUMPER SIGNAL DESCRIPTION

Signals From the Basic Control to a Front-End Controller

| SIGNAL | DESCRIPTION |
|---|---|
|  | Interrogate Command. <br><br> There must be at least a one clock separation between the write ACG and read ACG of the interrogate command. |
| PARITY B | The PARITY Bit line is a bidirectional line. This line is the add parity bit on the following eighteen (18) interface signals. (Note: See Table I for explanation of the bracketed notation). <br> AA[3:4] <br> AC[4:5] <br> AI[8:8] |
| PERR | The Parity ERRor line is a common signal to the DCP. It is used to notify the DCP that a Parity error was detected on a Write (CWP). |
| PUCLR | The Power Up CleaR line is true during the power on cycle and is an unconditional clear to all controls. |

The information lines of the basic control unit 60 and bi-directional (half duplex) lines which are common to all front-end controllers. When the (CWR) Write line of FIG. 16B is "high," then the information lines are driven by the data communications processors. On the other hand, when the (CWR) Write line is "low," the information lines are driven by the Data Comm Control (Front-End Controllers) on lines designated (DES$_n$). A "high" level on any of these lines would indicate a "1" bit. The term "Data Comm Control" is equivalent to "Front-End Controller."

The following Table III lists the signal names of the information lines (FIG. 16B) and a brief description of their functions.

TABLE III

| Signal Name | Description/Function |
|---|---|
| AA0 <br> AA1 <br> AA2 <br> AA3 | The AA$_n$ lines are equivalent to the low order 4 bits of the DCP 'AA' register. These lines are used to identify an adapter or subunit within a front-end controller. |
| AC0 <br> AC1 <br> AC2 <br> AC3 <br> AC4 | The AC$_n$ lines are equivalent to the low order 5 bits of AC register of the DCP. These lines are used in a coded manner to give meaning to the AI lines described below. |
| AI0 <br> AI1 <br> AI2 <br> AI3 <br> AI4 <br> AI5 <br> AI6 <br> AI7 <br> AI8 | The AI(0–7) lines are equivalent to the AI register in the DCP. The AI8 line can be used as a parity bit on the AI (0–7) lines and is equivalent to I21F in the DCP. <br><br> The AI lines are used to transfer data to and from the DCP. <br><br> The parity bit is not to be checked on each transfer. It is intended to be the parity for the data transferred to the line, which can be even or odd depending on the type of control. |

As seen in FIG. 16B there are a number of memory lines which go to the basic control unit 60. All signals in the memory portion of the interface (except for MRDY, MRU, MAG) are logically equivalent at the front-end controller to those as generated at the memory control 62$_{mc}$ or word interface 62$_s$. All lines except MRQ and MAG$_n$ are common signals to or from all front-end controllers. The MRQ$_n$ and the MAG$_n$ lines are unique to the individual front-end controller. The following Table IV will identify and briefly describe the memory lines to the basic control interface unit 60.

TABLE IV
MEMORY LINES TO BASIC CONTROL

| Signal Name | Description |
| --- | --- |
| MRQO | Memory ReQest n |
| MRQ1<br>MRQ2<br>MRQ3 | $MRQ_n$ is the individual request signal for memory access for each front-end controller.<br><br>This signal is used for the priority resolution in the basic control. $MRQ_n$ is equivalent to the MREQ signal on the memory interface. The MRQ signal must be removed from the interface by the control at least by the first clock after the recognition of MABX which follows $MAG_n$. |
| MAPL | Memory Address Parity Level<br><br>This level is generated by the front-end controller and is the odd parity bit on the address lines MA00-19, $MRQ_n$, MWRC, and MPRC.<br><br>This line is time shared with MTEX (Memory Transmission Error). MAPL should be active form the receipt of $MAG_n$ to MABX which is the write portion of the request. |
| MPRC | Memory PRotect Control<br><br>This signal is generated by the front-end controller if it intends to use the memory protect function.<br><br>The MPRC line can only be active during the write portion of the cycle, which is the period from $MAG_n$ to MABX time. This line is time shared with the MMRX signal from memory. |
| MWRC | Memory WRite Control<br><br>This signal is generated by the front-end controller and is used to indicate to memory that the associated request is for a write cycle. MWRC is required to be active during the write portion of the request. |

As seen in FIG. 16B there are a number of lines which proceed away from the basic control unit 60. The following Table V shows the designation of the signals and a brief description of their functions.

TABLE V
LINES FROM THE BASIC CONTROL UNIT

| Signal Name | Description |
| --- | --- |
| MAGO<br>MAG1 | Memory Access Granted Control n |
| MAG2<br>MAG3 | This signal is returned to the control when its request has been given priority and the cycle is to start. |
| MABX | Memory Access Begun<br>This is a one clock signal from memory control or a two clock signal from the multiplexor word interface.<br><br>The signal indicates that the memory has started its cycle. It is required that at the first clock with MABX the following lines are no longer driven by the front-end controller.<br>$MRQ_n$<br>MWRC<br>MPRC<br>MAPL<br>MI00-51<br>MA00-19 |
| MRDY | Memory ReaDY<br><br>This signal is a common line to all front-end controllers. The signal will be held high at all times except for a one clock period when the basic control has not received a ready signal from memory for at least 8 clocks after a request has been started. |

TABLE V-continued
LINES FROM THE BASIC CONTROL UNIT

| Signal Name | Description |
| --- | --- |
| MAOX | Memory Access Obtained<br><br>This signal is one clock period from memory control or two clock periods from the multiplexor word interface.<br><br>The signal indicates that at the next clock the read data and control signals are available for strobing. |
| MTEX | Memory Detected Transmission Error<br><br>When this signal is high it indicates that the memory has detected a transmission error. For a Read request this is an address parity error or an internal memory control error; or an information parity error. For a Read or Write request to a Mass Memory this will be a Multiple Read-Error if MMRX is also high.<br><br>The MTEX signal time shares the line with MAPL. |
| MMRX | Memory Module Read Error<br><br>When this signal is high with MAOX it indicates that the Mass Memory has detected a single or multiple Read Error. When MMRX and MTEX has detected a multiple bit error and the data is not corrected, the MMRX signal time shares the line with MPRC. |
| $MI_{mm}$ | Memory Information $Bit_{mm}$<br><br>These lines are bidirectional and are the data lines. Line 00-47 are the information lines, bits 48-50 are the word tag bits and bit 51 is the odd parity bit on bits 00-50. When the request is a write the front-end controller should drive these lines at their proper state for the same period as the $MA_{nn}$ lines. When the request is a Read the control should sample these lines one clock after detecting the MAOX signal. |

Referring to FIG. 16A, the memory interface 61 permits operation with the memory controls 62. The basic control unit 60 can operate in the "synchronous" mode via the memory control 62 or to a multiplexor word interface. The basic control unit also has the capability to operate in the "asynchronous" mode to a multiplexor word interface. The basic control unit 60 is also provided with the capability of sharing a common word interface $62_s$ with a given data communications processor.

Referring to FIG. 16A the data communications processor Exchange 64 is seen connected through buses 65 and 66 to two separate data communications processors. This interface from the data communications processor to the basic control unit 60 is always operated in the "asynchronous" mode. Thus, any data communications processor hub going to a basic control unit must be configured for asynchronous operation.

The setting or the changing of priority from basic control unit 60 for access to main memory is done by a jumper. This requires two jumpers per control unit (FIG. 16A). These jumpers are placed on the MRQ and MAG lines of each control (FIG. 16B). These lines must always be changed as pairs.

In summary, the basic control interface unit 60 is the central element for connection of the front-end controllers (51, 70, 80, 90) and the data communications memory resources. The basic control unit functions to provide access to any available data communications memory resource for the front-end controllers. The basic control unit converts the standard memory interface to a backplane interface for the front-end controllers. Data words consist of 48 data bits, three tag bits, one parity bit and 20 bits of address plus parity address. The "data communications memory resource" is organized such that any area of storage can be accessed by the data communications subsystem.

The basic control unit 60 multiplexes four of these interfaces to one standard memory interface of approximately 80 coaxial wires.

In addition, the basic control unit 60 will provide an interface for a data communications processor to communicate to any selected one of four front-end controllers connected to the basic control unit. A command block address will be written into the front-end controller by the data communications processor 20 causing it (front-end controller) to retrieve a command word from a "data communications memory resource". This command word (previously built by the DCP) will contain command information for one of the adapters assigned to the front-end controllers. The front-end controllers will then execute the data transfer command and report results back to the data communications processor 20 by an interrupt signal (CAN).

The basic control unit 60 requests access to a "data communications memory resource" through the memory control of a global, a local autonomous or the main memory. Once memory access is granted, the word (Command Word) will be read from or written into the memory. The basic control unit transfers memory words to and from the front-end controllers to the data communications memory interface 61.

The basic control unit also allows DCP control information to pass from the data communications processor 20 to designated front-end controllers. In this way the data communications processor can start-stop, or interrogate, each front-end controller and associated line adapters. Since each front-end controller will store up to one word of data before requesting a transfer, then up to 16 words can be waiting for memory access in each front-end controller (in the case of the Adapter Cluster Module Controller 51). It will be up to the basic control unit 60 to resolve priorities for memory access between the data communications processor, and the front-end controllers such that any conflicts or overflow situations are handled.

The Broad Band Control

As seen in FIG. 1B, the Broad Band Control 80 consistutes one of the front end controllers which interface with the Basic Control 60. The Broad Band Control provides a wideband or "broad band" interface to the host computer data comm subsystem. The Broad Band Control is used to provide a means of high speed transmission, without unduly overloading the data comm processor and other system components. Generally the Broad Band Control will be used in network communications between host computers for large bulk message transfers at high transmission rates.

The Broad Band Control can be made in several models to provide the wideband interface. In the preferred embodiment the Broad Band Control will have two major transmission protocols, specifically "Binary Synchronous" and "Data Link." In the preferred embodiment specified herein below, the Broad Band Control will be described in terms of the Binary Synchronous Protocol. This version of the Broad Band Control will be referred to as "BBSC" to designate its use of Binary Synchronous Protocol.

Each front end controller, such as the Broad Band Control is connected to the Basic Control 60. The Basic Control connects to the front end controllers by means of interframe jumpers (two) which jumpers supply the memory and cluster interface signals to the front end controller involved. When using Broad Band Controls which operate at 1.344 megabits per second, the highest priority is assigned to the Broad Band Control in relation to the Basic Control unit 60.

While the Basic Control 60 will have two interframe jumper positions, there are four interframe jumper positions required on each of the front end controller units, such as the Broad Band Control 80.

As seen in FIG. 17, the particular embodiment of the Broad Band Control, known as the Broad Band Binary Synchronous Control (BBSC), is shown. The Broad Band Synchronous Control 80 is made of a Basic Control interface 81 (which interface connects the Data Comm Processor 20 and the memory) and a central control (ROM control 82 and a common carrier interface 83). The bus structures $84_A$ and $84_B$ are a unidirectional 24-bit current-type-logic bus between the logically connected elements of the unit.

The Central ROM Memory Control 82 controls data transfers to and from the logical elements of the control. The Central Control ROM 82 and its related logic operates to store aand to retrieve bytes and words from a 24-bit by 8-word scratch memory 85. Thus, the ROM Control 82 moves the bytes and words to or from the common carrier and the Basic Control interfaces. The scratch memory 85 stores control and data information for full duplex control. Data pointers, link addresses and status information are stored in the scratch memory 85 during operation.

The ROM Control 82 can initiate memory cycles, can communicate with the data comm processor interface through the Basic Control 60 and thus control and communicate to the common carrier interface 83.

In FIG. 17 a cyclic redundance checking circuit $83_c$ is provided to develop a 16 bit redundant character. This redundant character is added to the end of a transmission block for the purpose of error detection and control.

FIG. 9 shows various configurations which can be used for the Broad Band Control 80 in relation to the Basic Control 60. One, two or four high speed line capabilities may be provided by multiple Broad Band Controls such as $80_1$, $80_2$, $80_3$, $80_4$.

Referring to FIG. 17, a memory address register $88_m$ is used for the storage of Main Memory addresses and for autonomous memory addresses. Transmissions to and from the Basic Control 60 and the Broad Band Binary Synchronous Control 80 are handled by a Data Comm Processor control unit $81_d$ and a Memory Control unit $81_m$.

A transmitter line buffer TLB $83_t$ and a Receiver Line Buffer $83_r$ provide parallel-serial or serial-parallel conversion in conjunction with a first-in-first-out register $83_f$. A bus logic isolator $85_i$ provides logical gates for the switching of data bytes between the modem interface 83 and the registers $88_m$, $88_R$ and $88_L$.

Referring to FIG. 17, a translator 86 is used to provide ASCII to EBCDIC code translation. Certain special characters are detected during operation to change the message states in the control.

Address incrementation and byte count decrementation are provided by a incrementer/decrementer card under control of the ROM Control 82.

The memory interface via 81 allows the memory protect write feature as a variant feature of the command control words. This prevents the control from over-writing important information in the data comm memory when storing data in the system's main memory. The results of memory operations are recorded in the ROM Control 82 and reported in the "result word" at the end of a command block operation. Unusual memory errors are reported directly to the Data Comm Processor 20 via the Basic Control/DCP Interface 87.

Data Comm Processor Interface: The Broad Band Synchronous Controller 80 (BBSC) is capable of giving a CAN (Cluster Attention Needed) signal interrupt for an intended data comm processor Read operation. On detecting the CAN signal, the data comm processor will read information from the ROM Control 82.

The BBSC 80 responds to data comm processor Write signals and stores the information into the data comm processor interface register 87 and optionally checks odd parity on the 18 bi-directional signal lines. If an error occurs, the ROM Control 82 will indicate the error condition.

The BBSC 80 will respond to "interrogate" commands from the Data Comm Processor 20. Certain control registers can be interrogated and written into by the Data Comm Processor 20 for testing in control operations. Parity is tested during the "Write" portion of the interrogate.

The ROM Control 82 will not respond to the Read portion of the interrogate operation if a parity error occurs.

Common Carrier Interfaces: The BBSC 80 has interfaces, 83, to most common carrier wideband interfaces, which usually range in the band from 19.2K to 1.344 megabits per second speed range. Interface "adapters" are provided which match these differences to the BBSC 80. The interfaces may include such items as a Western Electric 303 Data Set, Western Electric 306 Data Set, Datel 8A Data Set, etc.

BBSC Control 80 will now allow automatic dialing, or answering or disconnect. However, "Data Set Not Ready" and "Carrier Quality Detection" will be reported to the BBSC 80 and to the Data Comm Processor 20.

Operation: The BBSC Control 80 is initiated from the Data Comm Processor 20 by the writing of a command block pointer into the control's pointer register. The BBSC control then reads two words of the 3-word command block from the "data comm memory." The control words had been previously stored in data comm memory by the Data Comm Processor 20. Upon readout of the words, the BBSC 80 Control will begin operation as specified by the OP fields and variant fields of the command word (DCCW). This mode is called the "message mode."

The BBSC provides a means of linking from command blocks in addition to the above so that combinations of command blocks can be utilized to implement the Binary Synchronous Procedures at a very high data rate (1.344 megabits per second).

The data pointer variant bit can be used when a text portion of a message is separated from the contiguous memory area of the command block. When this option is used, the words of memory following the command block can then be used to store Binary Synchronous Header information—up to 256 bytes of Header can be transmitted and received from this data area following the command block.

As discussed, the preferred embodiment of the Broad Band Control described herein may be designated as the BBSC or Broad Band Synchronous Control, since this embodiment is directed to the use of Binary Synchronous Protocol. The line speed of BBSC 80 (of FIG. 17) is determined by the clock rate of the common carrier interface. By using the interface adapters described in this embodiment, the serial bit line speeds may be available from 19.2K to 1.344 megabits per second. The BBSC is made capable of full duplex simultaneous operation. Under software control, the BBSC can operate in the following modes:

1. USASCII Basic
2. USASCII Transparent

Character Format: The BBSC provides ASCII to EBCDIC code translation by means of the translator 86 of FIG. 17. Depending on mode selected by a mode register, the BBSC communicates with the Broad Band interfaces in a serial bit mode using seven or eight bits per character. The data set supplies the bit timing information. The BBSC establishes the character synchronization with the line when the synchronization codes are received at the beginning of the message.

In the "Write" operation, the BBSC 80 operates in a message mode when the "Write" operation is initiated from the Data Comm Processor 20. The BBSC 80 will read and then set up the scratch memory 85 for its parameters and initiate the line and transmit data. The results of initiation are reported by the BBSC (including data comm processor interrupt and result words) into memory.

In the "Read" operation, the BBSC operates in a message mode when the "Read" operation is initiated from the Data Comm Processor 20. The BBSC will read the necessary control words from the memory store parameters in the scratch memory 85 and then initiate the line for receiving data and then wait for it to be stored. After receipt of an ending condition or data or error condition, the BBSC 80 will report to the Data Comm Processor 20 via the data comm processor interrupt and via the result word.

Whenever synchronization is to be established by the BBSC with a remote site, the transmitting station sends a unique synchronization character, designated SYN. The synchronization character is transmitted three times contiguously. The receiving station searches the received data stream for these synchronization characters, and synchronization is established upon the receiving station having received two contiguous synchronization characters.

Once character synchronization has been achieved, the receiver verifies establishment of synchronization by examining two of the characters to insure that all are synchronization characters. If the characters are determined to be "synchronization characters" then character synchronization has been achieved. The synchronization character bit pattern for ASCII is:

```
ASCII    P  7  6  5  4  3  2  1
         0  0  0  1  0  1  1  0
                              ↑
                              └─ These bits are
                                 transmitted first.
```

As shown in FIG. 14, the data comm memory provides storage for a command block of which one portion provides the storage space for the Broad Band Control command block. This block is prepared by the Data Comm Processor 20 before initialization.

The Data Comm Processor 20 places command blocks in the "data comm memory" after which the BBSC 80 can access these from data comm memory through the memory interface of the Basic Control 60. The Data Comm Processor 20 initializes the BBSC 80 by supplying a 20-bit address through the cluster interface of the Basic Control. The BBSC 80 stores the pointer (during execution of a command block) in its scratch memory 85 of FIG. 17A.

Command blocks can be linked to each other by the link address, FIG. 14, such that the BBSC 80 can begin execution of the next block during the time that a result CAN (Cluster Attention Needed) is being serviced for the previous command block by the Data Comm Processor 20. Linking allows faster turnaround for the BBSC 80 so that it is not dependent on the Data Comm Processor 20 service time. Since a 20-bit pointer address is used, no absolute areas of "data comm memory" are required except for the fault branch addresses of the Data Comm Processor 20.

The command block (FIG. 14) for the Broad Band Binary Synchronous Control consists of three control words plus a data area (and/or a Header data area), as follows:

1. Data Comm Command Word—DCCW
2. Data Comm Address Word—DCAW
3. Data Comm Result Word—DCRW
4. 0-255 Header Bytes—Header Area
5. nData Words—DATA AREA The DCCW and the DCAW are prepared by the Data Comm Processor 20 prior to initialization of the Broad Band Control 80. The DCRW will contain the results of the operation of the BBSC. The data area or data block will usually contain text information but can contain other than text. The Header Area is usually allocated to header or control information.

The BBSC 80 is initialized by a three data comm processor Writes of a command block pointer through the Data Comm Processor 20 to the Basic Control 60 interface. The BBSC having received the pointer will begin operation by reading the DCCW and DCAW from the data comm memory. The BBSC 80 manipulates and stores the two control words and initializes the operation according to the OP code and the variants in the DCCW.

As seen in FIG. 17, the BBSC 80 uses two logic blocks designated as Word Right $88_R$ and Word Left $88_L$.

The Data Comm Command "Word Left" (DCCW-L) contains the operational variants and the header byte count when it is used. Also certain "protect" bits are associated with the DCCW-L which indentifies the DCCW to be valid for this specific control. The following Table VI indicates the layout of the DCCW-L plus a description of the bits from 51 to 24:

TABLE VI

| DCCW-L | | | | | | |
|---|---|---|---|---|---|---|
| 51 50 | 48 47 44 43 | 40 39 | 36 35 | 32 31 | | 24 |
| P | TAG 0100 | OP | VAR | OPTIONS | HEADER COUNT | |

Description of DCCW bits 51 to 24

| BITS | |
|---|---|
| 51 | Memory Parity bit tested on all memory Reads. Generated on Writes and stored. (Odd) |
| (50:3) | Tag bits tested by control to always be equal binary 3. If DCCW tag not 3 error CAN generated to DCP. |
| (47:4) | Code used by program to specifically identify this DCCW as Broadband Command (47:4) = 0100 |
| (43:4) | Broadband Control Operater Code. Write = 0100 Read = 0010 |
| (39:4) | OPERATION VARIANT FIELD Variant Field of Read and Write Operators. These bits augment the operators and specify message framing options and turnaround time-outs. |

The second work of the BBC command block of FIG. 14 is the Data Comm Address Word (DCAW). It is used for a byte limit and the data pointer fields.

Table VII shows the Data Comm Address Word (DCAW-L) showing bits 47 through 24 and the DCAW-R with bits 23 through 0.

TABLE VII

| DCAW-L | | |
|---|---|---|
| 47 | 40 39 | 24 |
| ENDING CHARACTER | BYTE LENGTH WRITE (LIMIT ON READ)* | |

Bits (39:16) of the Data Comm Address Word (DCAW) are used for the Byte length of the Data area on Write. The Control decrements this count until zero.
On a Read operation, the Data Area Limit in Bytes is contained here. The Control decrements when receiving each byte and, if zero, an overflow condition exists.
Bits (47:8) of DCAW contain the ending character on Write operators when variant bit DCCW (36:1) equals zero (0).

| DCAW-R | | |
|---|---|---|
| 23 | 20 19 | 0 |
| RESERVED | DATA POINTER ADDRESS | |

Bits (19:20) of the DCAW is used to address the beginning of the Data Area when DCCW bit 33 = 1. If DCCW bit 33 = 0, Data will be transmitted or stored starting at address DCRW + 1.

*MAX NUMBER BYTES $2^{16} = 65,536$

The DCRW of the BBSC 80 is written by the BBSC at the end of each operator. The bits which are set describe the results of the operation. A data comm processor cluster attention needed (CAN) interrupt is optionally given on linked messages to indicate if significant information has been written.

The Data Comm Result Word (DCRW-L) contains three major fields:

1. Header bytes received during reception of non-data.
2. Common carrier interface Result bits
3. Memory operation Result bits.

The "right" result word (DCRW-R) contains two major fields:

Table VIII shows the format of the left and right Data Comm Result Words, as follows:

TABLE VIII
BBC DATA COMM RESULT WORD

| | Bit | Description |
|---|---|---|
| DCRW-L | 47 | |
| | 46 | |
| | 45 | HEADER BYTES REC'D |
| | 44 | |
| | 43 | |
| | 42 | Number of Characters in Received Header |
| | 41 | |
| | 40 | |
| | 39 | — TIME-OUT (T or R) |
| | 38 | — DATA LOSS (FIFO OVERFLOW) |
| | 37 | — PARITY ERROR VRC/CRC/LRC |
| | 36 | — PAD CHECK ERROR |
| | 35 | — SYNC FILL |
| | 34 | — LOSS OF CARRIER |
| | 33 | — LOSS OF CLEAR TO SEND (During Transmit) |
| | 32 | — DATA SET NOT READY |
| | 31 | — BUFFER OVERFLOW (MEMORY)(T or R) |
| | 30 | — SPARE |
| | 29 | — DC MEMORY PROTECT ERROR (REC) |
| | 28 | — DC MEMORY CORRECTED ERROR (MMRX*$\overline{\text{MTEX}}$) (REC) |
| | 27 | — MEMORY NOT READY |
| | 26 | — UNCORRECTABLE (REC) |
| | 25 | — TRANSMISSION ERROR (MTEX*$\overline{\text{MMRX}}$) |
| | 24 | — DATA COMM MEMORY PARITY (REC) |
| DCRW-R | 23 | |
| | | ENDING CHARACTER* |
| | | *Ending Character on READ when DCCW [36:1] = 0 |
| | 16 | |
| | 15 | |
| | | RESULTANT BYTE COUNT |
| | | NOTE: Maximum bytes = $2^{16}$ = 65,536 bytes |
| | 0 | |

1. The Resultant byte count of data received.
2. The ending character on a Read Operator when the DCCW (36:1) equals "O."

The Broad Band Control will always attempt to "right" the result word even if no significant error information is to be written. This clears the result word to the most recent condition of the BBSC.

The BBSC 80 communicates from the Data Comm Precessor 20 through the Basic Control 60. The Basic Control 60 interfaces through the data comm processor cluster interface and the Basic Control uses a 24-bit word (0-23) which conforms to the format shown hereinbelow in Table IX.

TABLE IX
DCP TO BBSC INTERFACE

| 23 22 21 20 19 18 17 | 16 15 14 | 13 | 12 11 10 9 8 | 7 6 5 4 3 2 1 0 |
|---|---|---|---|---|
| BC | BBSC | N.U. | T R | NU | C L R | OP | DATA |

| ←—— AA ——→ | ←—— AC ——→ | ←— AI —→ |

The A register is broken into 3 fields:
AA = A[23:8]
AC = A[15:8]

TABLE IX-continued

AI = A[7:8] Plus DCP I21 = AI8

Note:
The interface between the Data Comm Processor 20 to the Basic Control 60 for the BBSC 80 has the "A" register of the data comm processor being used to communicate commands to BBSC 80. The "AA" field contains addressing information, the "AC" field contains an operation code and "AI" field contains data pertaining to the OP code given. The Data Comm Processor 20 is able to issue commands to the BBSC 80 in order to initialize a command block, to interrogate a specific register, or to receive CAN interrupts over the clusterinterface through the Basic Control 60.

Address Field AA

The bits of the A register AA [7:8] specify the BC, BBSC address.

A [23:2] = BC address
A [21:2] = BBSC address.
A [16:1] Transmit = 1
Receive = 0
A [19:3] are not used in the BBSC except for parity generation and checking.

When the Data Comm Processor 20 communicates "Write" commands to the BBSC 80 it does so via the cluster/DCP interface and through the Basic Control 60. The second words which are written into the BBSC 80 use the format shown below here in Table X:

TABLE X

| BBSC DCP WRITE COMMAND | | |
|---|---|---|
| AC | AI | |
| 4 3 2 1 0 | 8 7 6 5 4 3 2 1 0 | DESCRIPTION |
| 1 0 0 0 1 | *P 7 6 5 4 3 2 1 0 | Command Pointer (7:8) and Start |
| 1 0 0 1 0 | P 15 14 13 12 11 10 9 8 | Command Pointer (15:8) |
| 1 0 0 1 1 | P 0 0 0 0 19 18 17 16 | Command Pointer (20:4) |

*NOTE:
"Pit" bit no specified to be used presently, is designated as a "DON'T CARE" signal.

Commands are used by the DCP command pointer. The BBSC is initialized in "word mode" by the transfer of a 20-bit command block address from the Data Comm Processor 20. Three data comm processor "Write" commands are required to initialize the BBSC 80. These commands are shown in the AC and AI fields in the following Table XI:

TABLE XI

| DCP COMMAND POINTER COMMANDS | | |
|---|---|---|
| AC | AI | |
| 1 0 0 0 1 | Command Pointer Bits (7:8) | The Control will initialize following this Write |
| 1 0 0 1 0 | Command Pointer Bits (15:8) | |
| 1 0 0 1 1 | Command Pointer Bits (19:4) | |

When the CAN signal occurs which signifies that "Cluster Attention is Needed," the BBSC 80 can cause an "Interrupt" of the Data Comm Processor 20 by using its individual CAN signal line. The BBSC 80 will wait for the data comm processor Read signal and then load the AC-AI register (Table IX) with the appropriate information. After the "Read," the CAN signal is cleared and the BBSC register is also cleared. The Data Comm Processor 20 can be made to check parity on the 18 signal lines when parity option is installed. The following Table XII shows the data comm processor "Interrupts" which are implemented by the BBSC 80:

TABLE XII

| AC Field | | Description |
|---|---|---|
| 4 3 2 1 0 | 8 7 6 5 4 3 2 1 0 | |
| 0 0 0 1 0 | X 0 0 0 0 0 0 0 0 | Op OK No Result. |
| 0 0 0 1 0 | X 0 0 0 1 0 0 0 0 | Invalid Command Word (DCCW) or (DCRW) |
| 0 0 0 1 0 | X 0 0 0 1 R R R R | Control Fault OP Discontinued |
| | | Mem. Parity on Control Word |
| | | Mem. Transmission Error (Address) |
| | | Mem. Uncorrectable on Control Word |
| | | Mem. Not Ready |
| 0 0 0 1 0 | X 0 0 1 0 0 0 0 0 | Operation Complete But Result Word Contains Error Condition |

The Data Comm Processor 20 is functionable to interrogate certain control registers of the BBSC 80 in order to obtain the present state and status of the BBSC. A lead called the "interrogate control lead" (IWR) indicates that an interrogate command is taking place. The following Table VIII shows the interrogate formats:

TABLE XIII

| INTERROGATE FORMATS | | |
|---|---|---|
| AC | AI (READ DATA) | |
| 4 3 2 1 0 | 8 7 6 5 4 3 2 1 0 | |
| 0 0 1 0 1 | Mem Status | |
| 0 0 1 1 0 | Modem/Line Status | IR REG (Input Register) |

The Modem/Line Status can be tested during operation. The following Table XIV shows the AI bits which represent the interface state (Input Register IR).

TABLE XIV

| MODEM/LINE STATUS AC = 6 | |
|---|---|
| AI | DATA SET SIGNAL |
| 0 | BB Received Data |
| 1 | CB Clear to Send |
| 2 | CC Data Set Ready |
| 3 | CE Ring Indicator |
| 4 | CF Carrier Detect |
| 5 | CA Request to Send |
| 6 | CD Data Terminal Ready |
| 7 | Reserved |

In summary, the data comm subsystem may be provided with a single or a multiple number of Broad Band Controls which interface to the Basic Control 60 in order to provide the host computer and the data comm subsystem with a wide band or "broad band" interface to high capacity wide band modems and data-sets for the handling of high speed communications between remote terminals and the data comm subsystem.

The Broad Band Control 80 is capable of interrupting the Data Comm Processor 20 to request a read operation whereby the data comm processor will read informational data from the ROM Control 82 of the Broad Band Control 80.

The Broad Band Control 80 responds to Write signals from the Data Comm Processor 20 and can store the information into a data comm processor interface register 87 (FIG. 17). The Broad Band Control 80 can respond to "interrogate" commands from the Data Comm Processor 20 for testing, parity and control operations.

The Broad Band Control 80 operates within the data comm subsystem by using control words from a command block in the data comm memory of the data comm subsystem.

Since the command blocks can be linked to each other by link addresses, the Broad Band Control 80 can begin execution of the next block during the same time that an "interrupt" (Result CAN) is being serviced for the previous command block by the Data Comm Processor 20, this linking allowing faster turnaround for the Broad Band Control 80 which makes it independent of the Data Comm Processor 20 for service.

Thus, the Broad Band Control provides a completely controlled and unique service to the data comm processor subsystem in providing command, control, and servicing of wide band, high speed transmission to remote terminals via data sets using common carrier lines.

Data Comm Disk Controller (DCDC)

The Data Comm Disk Controller 70 of FIG. 1B is used to provide control for the storing and retrieval of data communication information placed on a disk. The Data Comm Disk Controller is initiated by the Data Comm Processor 20 via the Basic Control Module, particularly by the basic control interface which sends a 20-bit memory address of the data comm command word. Upon arrival of the 20-bit address at the Data Comm Disk Controller 70, the Data Comm Disk Controller begins a semi-autonomous operating condition. Once initiated, the Data Comm Disk Controller will read the data comm command word from the memory address given. As seen in FIG. 14, the data comm command word is composed of an operations code "OP," a variant field, and a file address of the disk to be accessed. The next word in memory is the data comm address word which contains the length of the "operation cycle"—that is to say, the number of words to be transferred—and optionally, a 20-bit address pointing to the beginning of the data area. After the input/output operation is initiated, the Data Comm Disk Controller 70 begins to transfer information either from the addressed memory to the disk or from the disk to memory. As before mentioned, the addressed memory may be Data Comm Memory $20_m$, Main Memory $100_m$ or local internal memory $20_i$.

After completion of the data transfer, a "Result Word" is formed by the Data Comm Disk Controller 70 and is written into memory. The cluster attention needed signal (CAN) is thereafter passed on to the Data Comm Processor 20 and the operation is terminated.

FIG. 11 shows a schematic of the disk subsystem. The basic control interface 60 provides an inerface from the Data Comm Processor and the data comm memory to the disk subsystem control DCDC 70. The Data Comm Disk Controller 70 handles two Disk File Exchanges (DFX) shown as $70_{x1}$ and $70_{x2}$. A Disk File Control $70_c$ works with the Data Comm Disk Controller to select and use Disk Files $70_{d1}$ and $70_{d2}$. Failsoft connections are provided to use another disk should one disk system fall.

The Data Comm Disk Controller 70 has three interfaces. These include: the Data Comm Processor Cluster Interface via the Basic Control 60, the memory interface and the interface to the disk subsystem.

The Data Comm Processor Interface is via the basic control interface 60 over to the cluster interface of the Data Comm Processor 20. Data is transferred to the Data Comm Processor in a "CAN" format that is similar to the cluster in operation. Address information for initialization is transferred to the Data Comm Disk Controller 70. Since 20-bits of address are required, then three "writes" to the Data Comm Disk Controller 70 must be furnished by the Data Comm Processor 20 for initialization.

The Memory Interface: the interface from Data Comm Disk Controller 70 to the memory is via the basic control interface 60. The Data Comm Disk Controller 70 communicates with the memory, similar to normal memory operation by means of the memory bus.

Disk Interface: the Data Comm Disk Controller 70 is provided with the necessary logic to interface with the disk subsystem, as seen in FIG. 11. This interface is organized to handle an information transfer rate of 400,000 8-bit bytes per second.

The Data Comm Disk Controller 70 is initialized from the data comm processor cluster interface via the basic control interface 60. The Data Comm Processor 20 will normally perform three adapter writes which will cause 20 bits of address to be passed to the Data Comm Disk Controller 70. The cluster interface information passed to the Data Comm Disk Controller is formatted as shown in Table XV below.

TABLE XV

| CLUSTER INTERFACE INFORMATION PASSED TO DCDC | | |
|---|---|---|
| ADDRESS OF DCDC | COMMAND CODE | MEMORY ADDRESS |
| AA | AC | AI |

The AC (Compound Code) and AI (Memory Address) fields are as follows:

| AC | AI | MEANING |
|---|---|---|
| 4 3 2 1 0 | 7 6 5 4 3 2 1 0 | |
| 1 0 0 0 1 | 7 6 5 4 3 2 1 0 | Memory Address bits 7 through 0 are passed to DCDC. DCDC is to start initialization process. |
| 1 0 0 1 0 | 15 14 13 12 11 10 9 8 | Memory Address bits 15 through 8 are passed to DCDC with no action on the part of |

TABLE XV-continued
CLUSTER INTERFACE INFORMATION PASSED TO DCDC

| | |
|---|---|
| 1 0 0 1 1 X X X X 19 18 17 16 | the DCDC.<br>Memory Address bits 19 through 16 are passed to DCDC with no action on the part of the DCDC. |

The Data Comm Command Word (DCCW) contains the following elements of disk control information: operator, variant, unit number, and file address.

The Data Comm Address Word (DCAW) contains the following disk control information: word length and an optional data pointer.

The Data Comm Result Word (DCRW) is located in address DCAW plus one.

Data Block: The start of the data block area will be optionally addressed by the data pointer or start immediately after te DCRW and it is of the length defined in the DCAW.

The Data Comm Command Word (excluding the tag field) consists of 48 bits as shown in the following Table XVI.

TABLE XVI
DATA COMM COMMAND WORD (DCCW)

```
51  50 48   47                              0
    | P | TAG | I/O CONTROL INFORMATION |
   47 40 39  32 31    24 23               0
    | OP | VAR | UNIT NO. | FILE ADDRESS |
```

Operation Code Field (47:8)

| OP CODE (43:4) | FUNCTION |
|---|---|
| 0001 | WRITE |
| 0010 | READ |
| 0011 | CHECK |
| 0000 | TEST |

Variant Field (39:8)
This field is a variant of the OP functions. The Variants are specified as follows:

| BIT | FUNCTION |
|---|---|
| 39 | Reserved |
| 38 | Tag Transfer |
| 37 | Maint. Seg. |
| 36 | Reserved |
| 35 | Causes Loading and unloading of internal segment buffer when used with Write and Read OPs respectively. Causes no action on disk. |
| 34 | Protected Write |
| 33 | Causes Address in Data Pointer Section of the DCAW to be used. |
| 32 | Reserved. |

Write Operator

Data is transferred from the addressed memory to the Data Comm Disk Controller 70 as six eight-bit bytes at a time (one memory word). The Data Comm Disk Controller will terminate the Write operation when all data has been transferred to disk and a segment boundary has been noted. If the data is exhausted before the end of a segment, the remaining portion of the segment will be filled with zeroes.

Read Operator

Data is transferred from disk to the Data Comm Disk Controller 70 in eight-bit bytes. The DCDC 70 will accumulate six bytes (one memory word) and then write them into the addressed memory. The Controller will stop data transfer to memory when all data has been transferred and will terminate operation at the end of the segment being read.

The Data Comm Address Word, excluding the tag field, consists of 48 bits as shown in Table XVII.

TABLE XVII
DCAW FORMAT

```
47        44 43              24 23    20 19              0
| RESERVED | WORD LENGTH | RES. | DATA POINTER |
```

| | |
|---|---|
| BITS (47:4) | Reserved |
| BITS (43:20) | Word Length - The binary number of words to be transferred. |
| BITS (23:4) | Reserved |
| BITS (19:20) | Data Pointer - Optionally points to the first word of the Data Block (used in conjunction with bit 33 of DCCW). |

```
                        47                              0
Data Comm
Address Word:   | I/O CONTROL INFORMATION |
```

Data Comm Result Word Format

A result word is generated by the control 70 and is written into memory after each operation. The Data Comm Result Word contains a 24-bit "conditions" field and a 20-bit memory address.

The Data Comm Result Word format is shown in Table XVIII together with various conditions signals.

TABLE XVIII
DATA COMM RESULT WORD (DCRW)

```
47            24 23 20   19                  0
| CONDITIONS | RES | LAST MEMORY ADDRESS + 1 |
```

Conditions Field (47:24)
Conditions reported in the DCRW are as follows:

| BIT POSITION | FUNCTION |
|---|---|
| 24 | Memory Parity Error |
| 25 | Memory Transmission Error |
| 26 | Uncorrected Read Error |
| 27 | Memory Not Ready |
| 28 | Corrected Read Error |
| 29 | Memory Protect Error |
| 30 | Disk Not Ready |
| 31 | Segment Buffer Parity Error |
| 32 | LPC Error |
| 33 | EU Busy |
| 34 | Write Lockout |
| 35 | Timeout |

The Store To Store Controller

As seen in FIG. 1B, the Store to Store Controller 90 constitutes one of the front end controllers which is interfaced to the Data Comm Processor 20 and the Data Comm Memory $20_m$ by means of the Basic Control 60. The Store to Store Controller 90 also has a memory bus which connects to the host system and may thus use the main memory of the host system for transfer and/or relocation of data, as in FIG. 12A.

Since the preferred embodiment of the subject data comm subsystem is made to provide great flexibility in accessibility (by the data comm subsystem) to all the forms of memory available within the overall system, then the memory concept herein can be called a "Data Comm Memory" which is defined to be any memory facility within the system which is utilized by the data comm subsystem primarily for data storage. It is in this regard that the Store to Store Controller is used to enhance the flexibility for use of any and all memory facilities within the entire system.

The Store to Store Controller 90 is used by the Data Comm Processor to transfer blocks of data, one word at a time, as follows:

(a) Transfers to and from the Data Comm Memory $20_m$.

(b) Transfers to and from the system's Main Memory $100_m$.

Once the Store to Store Controller is started or initiated by the Data Comm Processor, the Store to Store Controller performs the required data transfer and thus leaves the Data Comm Processor free to perform other operations. When the Store to Store Controller completes its operation, the Store to Store Controller will then store a Result Word in the data comm memory and it will notify the Data Comm Processor that the operation has been completed. After this the Store to Store Controller will be available to execute another operation.

The Store to Store Controller 90 (FIG. 1B) communicates with the Data Comm Processor 20 and the data comm memory through the basic control interface unit 60.

Figure 19:
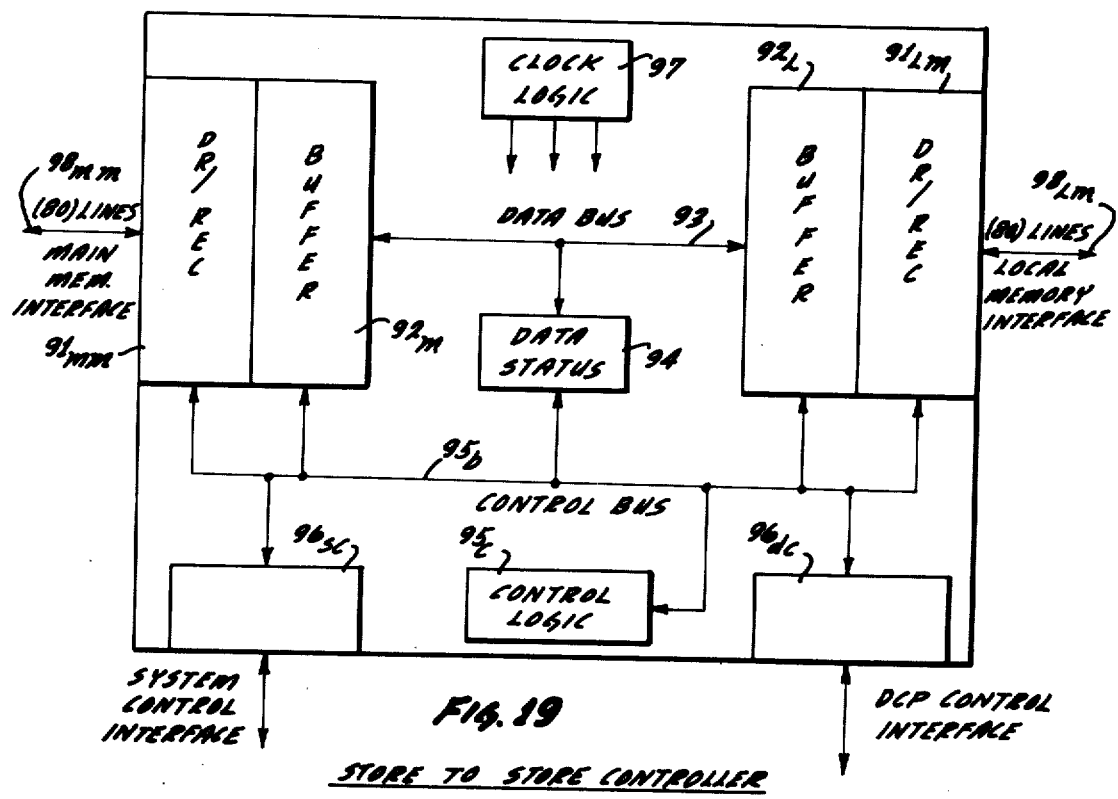
FIG. 19 is a block diagram of the front-end control known as the store-to-store controller.

FIG. 19 indicates a block diagram of major elements of the Store to Store Controller 90. The communication between the Data Comm Processor 20 and the Store to Store Controller 90 is accomplished through the Control Interface $96_{dc}$ of the basic control interface 60.

As seen in FIG. 19, the Store to Store Controller 90 has a main memory interface $98_{mm}$ and a local memory interface $98_{lm}$. Further, there is a main system control interface $96_{sc}$ and a Data Comm Processor control interface $96_{dc}$. The main memory and the local memory interfaces connect to driver-receivers $91_{mm}$ and $91_{lm}$, these driver-receivers having buffers $92_m$ and $92_l$. A data bus 93 connects these buffers to a data status register 94. Likewise, a control bus $95_b$ connects the system control interface $96_{sc}$ and the Data Comm Processor control interface $96_{dc}$ to the driver-receivers, the buffers and to a control logic section $95_c$. A clock logic unit 97 provides clocking for the entire Store to Store Controller 90.

The control interface operates basically as follows:

(a) The Data Comm Processor 20 sends a 20-bit address (3-bytes) over to the Store to Store Controller 90. This address then points to a data comm control block (in data comm memory) which block contains the parameters to perform a data transfer operation.

(b) When the data transfer operation is completed, the Store to Store Controller 90 then notifies the Data Comm Processor 20 that the operation is complete. The Data Comm Processor then reads control information from the Store to Store Controller to determine the "result" of that operation.

Referring to FIG. 6 the memory interface $60_{mi}$ (of the basic control interface unit) is used to establish data paths between the Store to Store Controller 90 and the data comm memory, which may include the Main Memory $100_m$ and Local Memory $20_i$.

As shown in FIG. 5 the data comm memory may consist of a memory $20_i$ directly within the Data Comm Processor 20 and in addition may also be enhanced by a group of memories $20_e$ which are external to but connected to the internal memory of the Data Comm Processor.

Once the Basic Control 60, FIG. 5, has resolved the "requestor" priority and then granted memory access to the Store to Store Controller 90, the memory cycle is then executed by the Store to Store Controller according to the timing and gating rules used on the Main Memory bus $20_b$ (FIG. 5) of the host system.

The main memory interface $98_{mm}$, shown in FIG. 19, provides a data path between the Store to Store Controller 90 and the host system's main memory. This main memory interface $98_{mm}$ operates in conjunction with the host system's memory bus and a multiplexor word interface.

Upon command of the Data Comm Processor 20, the Store to Store Controller 90 initializes the operation by fetching a Data Comm Command Word (DCCW) and a Data Comm Address Word (DCAW). The contents of these words are distributed into hardware registers for execution. The Store to Store Controller then holds the address of the Data Comm Result Word (DCRW) to store "Result" information at the end of the operation.

The Data Comm Processor 20 starts initialization by sending, via the cluster interface, a 20-bit address (3 bytes). Table XIX hereinbelow shows the format for the 3 bytes and also shows a 20-bit pointer (P) which is the data comm memory address of the data comm control block.

TABLE XIX

|  | AC | AI |  |
|---|---|---|---|
|  | 4 3 2 1 0 | 8 7 6 5 4 3 2 1 0 |  |
| (lst CWR) | 1 0 0 1 1 | 0 0 0 0 0 [19:4] | ⎫ |
| (2nd CWR) | 1 0 0 1 0 | 0 — [15:8]   ——— | ⎬ Address bits |
| (3rd CWR) | 1 0 0 0 1 | 0 — [ 7:8]   ——— | ⎭ |

(P) ——→ Pointer

| DCCW |
|---|
| DCAW |
| DCRW |
| DATA |

Tables XXA, XXB and XXC respectively show the formats for the Data Comm Control Word, the Data Comm Address Word and the Data Comm Result Word used by the Store to Store Controller.

TABLE XXA

DCCW

| 50 48 | 47 40 | 39 32 | 31 20 | 19 0 |
|---|---|---|---|---|
| TAG | OP | VB | R | MMA |

TAG must = 011
OP must = 001000xx (xx = 1,2,3)
VB = Variant Bits
R = Reserved
MMA = Main Memory Address

TABLE XXB

DCAW

| 50 48 | 47 44 | 43 24 | 23 20 | 19 0 |
|---|---|---|---|---|
| TAG | R | L | R | DCMA |

TAG = not used
R = Reserved
L = Length of op in words
DCMA = Data Comm Memory Address

TABLE XXB-continued

DCAW

| 50 | 48 | 47 | 44 | 43 | 24 | 23 | 20 | 19 | 0 |
|----|----|----|----|----|----|----|----|----|---|
| TAG | | R | | L | | R | | DCMA | |

(if V33 = 1 of DCCW)

TABLE XXC

DCRW

| 50 | 48 | 47 | 24 | 23 | 20 | 19 | 0 |
|----|----|----|----|----|----|----|---|
| TAG | | Results | | R | | LDCMA | |

TAG = not used
R = Reserved
LDCMA = Last DC Memory Address
Results = 24-DC Memory Parity Error
25-DC Memory Transmission Error
26-DC Memory Uncorrectable Read Error
27-DC Memory Not Ready
28-DC Memory Corrected Read Error
29-DC Memory Protected Write Error
30-31-Reserved
32-MM Parity Error
33-MM Transmission Error
34-MM Uncorrectable Read Error
35-MM Not Ready
36-MM Corrected Read Error
37-MM Protected Write Error The Store to Store Controller contains logic to execute the following operators:

RDMM—Read from main memory
WRMM—Write to main memory
WRDM—Write data comm memory
RDDM—Read data comm memory When the Store to Store Controller 90 has completed an operation or decides to terminate because of an error, a CAN signal (cluster attention needed) is sent to the Data Comm Processor 20. This CAN signal instructs the Data Comm Processor to read status information from the Store to Store Controller. At the completion of the cluster read, the Store to Store Controller returns to its idle state. The format and bit assignment for this particular status information is shown below in Table XXI.

TABLE XXI

| AC | AI | |
|----|----|----|
| 4 3 2 1 0 | 8 7 6 5 4 3 2 1 0 | |
| 0 0 0 1 0 | 0 0 0 0 1 0 0 0 0 | - Invalid DCCW |
| 0 0 0 1 0 | 0 0 0 0 1 0 0 0 1 | - DC Memory Parity Error on CW |
| 0 0 0 1 0 | 0 0 0 0 1 0 0 1 0 | - DC Memory Transmission Error on CW |
| 0 0 0 1 0 | 0 0 0 0 1 0 1 0 0 | - DC Memory Read Error on CW - uncorrect |
| 0 0 0 1 0 | 0 0 0 0 1 1 0 0 0 | - DC Memory Not Ready on CW |
| 0 0 0 1 0 | 0 0 0 1 0 0 0 0 0 | - Exception in DCRW |
| 0 0 0 1 0 | 0 0 0 0 0 0 0 0 0 | - No Exception in DCRW |

In summary, the Store to Store Controller provides the data comm subsystem with a direct memory transfer capability between the data comm memory, the host system and the main memory. Operating independently and asynchronously from the system, the Store to Store Controller 90 is used in "autonomous" (self running) data comm subsystems to augment data block transfers to the host systems. Since data integrity has been established in the data comm processor memory, the initiation of subsequent block transfers to main memory allows the Data Comm Processor 20 to perform other operations without continual interruption.

Adapter Cluster Module

The Adapter Cluster Module 51 (FIG. 1B) is one vehicle (Front-End Controller) which the Data Comm Processor interfaces with data communication lines to remote terminals. Each Adapter Cluster services a maximum of 16 data lines operating simultaneously in the speed ranges of 45.5 to 9,600 bits per second.

The basic functions of the Adapter Cluster are:
(a) Line termination which includes scanning, clocking and temporary storage.
(b) Character assembly and disassembly. p1 (c) Synchronization, that is to provide attainment of synchronization and maintenance of synchronization between the adapter cluster module and the peripheral.
(d) Time operation to maintain line discipline.
(e) Sync character recognition logic.
(f) Provide ability to exchange information with one or more DCP's.

A block diagram of the Adapter Cluster 51 is shown in FIG. 20A.

The Adapter Cluster functions in a manner that makes itself transparent to most character codes and all message formats. As an example, of the 10 USASI-Basic Mode-Data Communications control characters, the Adapter Cluster 51 recognizes only the SYN character in order to obtain and retain synchronization when operating in the synchronous mode.

The Adapter Cluster 51 is dependent upon the Data Comm Processor 20 to provide control signals for each and every adapter operating within a cluster. Once an adapter operation is initiated by a Data Comm Processor program, the adapter will begin and continue to operate under the control of the Adapter Cluster 51 until additional control is required from the Data Comm Processor 20, in which case an "interrupt" is sent to the Data Comm Processor 20.

Each adapter or data line serviced by the Adapter Cluster will have a minimum of two characters of temporary data storage. The Adapter Cluster 51 also contains temporary storage of control status information for each adapter. Total data and control status temporary storage provided in the Adapter Cluster is 16 words of 56 bits each, or one word per adapter.

The Adapter Cluster is broken down into control sections. These sections can either be associated with individual data lines (adapters) or all data lines (adapters). The sections which are associated with "individual" data lines, that is to say, unique to one line are:

1. Integrated circuit memory words (Buffer Memory $52_m$ of FIG. 20A).
2. Adapters (0-15 of FIG. 20A).

The control sections of Adapter Cluster 51 associated with all data lines, that is, they are time-shared by all the lines, are:

1. Cluster interface exchange 54 (FIG. 20B).
2. Registers AD, CC, DC, AC, CS (FIG. 20B).
3. Clock and adapter designate control 58 (FIG. 20A).
4. BAR $53_b$-Field sensing and control logic (FIG. 20A).
5. Read/Write Control 55 (FIG. 20A).
6. Adapter switching matrix $51_{mx}$ (FIG. 20A).

As was previously described in the aforementioned U.S. Pat. No. 3,618,037, the acronym BAR represents a "Buffers Associative Register" while CIR represents a "Cluster Interface Register".

Figure 20B:
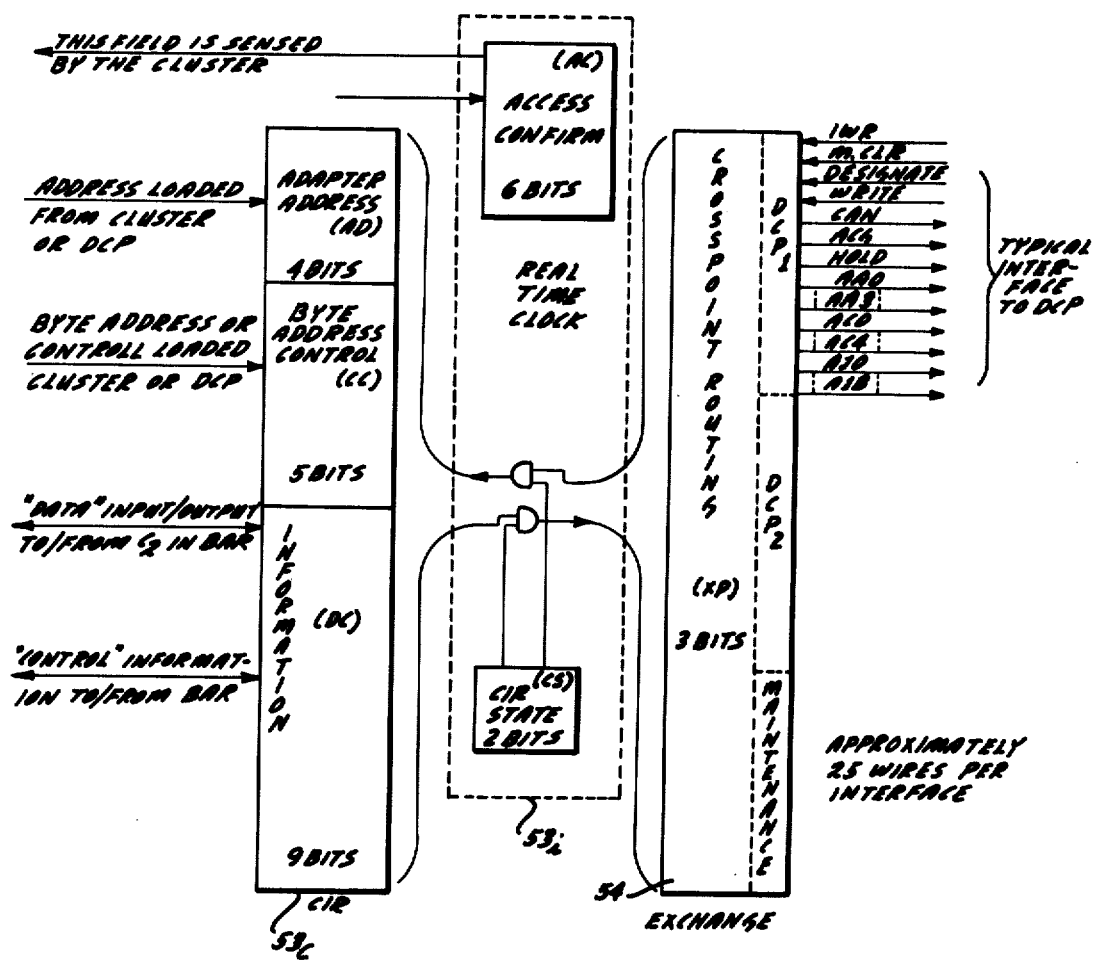
FIG. 20B shows the cluster interface for the adapter cluster controller.

In FIG. 20B, the cluster interface between the Data Comm Processors and the Cluster Interface Register $53_c$ is shown. This cluster interface is time-shared by all adapters of the Adapter Cluster. Control or data information can be sent or received on this interface. This interface is serviced at the Data Comm Processor and the combination of its AA, AC, and AI registers, previously described. At the cluster end, the Cluster Interface Register $53_c$ services the interface via an exchange 54. Maintenance of the cluster can be performed through this interface by means of the Cluster Display Unit $23_d$ shown in FIG. 21B as part of the Data Comm Processor.

The cluster interface of FIG. 20B can be separated into two sections, one section being the Cluster Interface Register $53_c$ and the other being the Cluster Interface Control $53_i$. The size of the Cluster Interface Register is 18 bits and it is the vehicle by which information (control or data) is transferred between the Cluster Buffer IC memory $52_m$ of FIG. 20A and the Data Comm Processor 20 or its Display Unit $23_d$ of FIG. 21B.

In FIG. 20B, the register AD is the Adapter Address of 4 bits wherein the Data Comm Processor, by way of the Exchange 54, can shift paths into this field. In FIG. 20B, the block designated CC is the byte address and control register which holds 5 bits. The Data Comm Processor, via the Exchange 54, can shift paths into this field. This field is primarily used for byte field addressing and control information. A shift path into this field may also be accomplished by the "Interrupt" part of Control Section 55 (FIG. 20A) of the Adapter Cluster 51.

The register DC is the cluster "data" unit which holds 9 bits (FIG. 20B). The Data Comm Processor 20, via the Exchange 54, can shift paths into this field. The Cluster Buffer IC Memory $52_m$ of the cluster can also shift paths into this field. Both data and control information are transferred through this field.

The Cluster Interface Control $53_i$ is a section holding 11 bits and having the following fields:
 CS: holds 2 bits; this field is controlled and sensed by the cluster or the Data Comm Processor. Control states of the Cluster Interface are derived from this field.
 AC (Access Confirm): This field of 6 bits is controlled and sensed by the Cluster. When a cluster access to the Data Comm Processor is completed, this register is set equal to AD and marked occupied. The sixth bit is used to differentiate a program time-out interrupt from others.
 XP (Cross Point): This field of 3 bits is controlled and sensed by the Cluster. When a cluster is designated and conditions are right to transfer information to or from the cluster, one of the flip-flops will be set thereby allowing information to pass between the Cluster and one of the Data Comm Processors or the Cluster Display Unit $23_d$, FIG. 21B.

In FIG. 20A in the schematic drawing of the Adapter Cluster Module, a cross point exchange 54 connects a plurality of Data Comm Processors to the Cluster Interface Register $53_c$. An integrated circuit memory $52_m$ operates with a control function unit 55 which receives input from a Buffers Associative Register, BAR $53_b$, and from an Input Register, IR 56. The Output Register 57 transmits to an Adapter Switching Matrix $51_{mx}$ while the Input Register 56 receives from switching Matrix $51_{mx}$. A real-time clock 58 is used to coordinate the various cyclic activities.

FIG. 20B is a schematic of the Cluster Interface Register, CIR $53_c$, showing the cross point exchange 54 providing an interface to two Data Comm Processors. As previously discussed, the Cluster Interface Register $53_c$ has a size of 18 bits and is the vehicle by which control or data information is transferred between the buffer (IC Memory $52_m$) and the Data Comm Processor. The CIR $53_c$ is made up of three fields: AD—adapter address field, CC-byte address and control field, and DC—cluster data field. The cluster interface control, CIC $53_i$, carries eleven bits and has a CS field of two bits (for CIR state) and AC (access confirm) field of six bits.

The schematic FIG. 20C shows the Buffers Associative Register BAR $53_b$. The Buffers Associative Register (BAR $53_b$) is the heart of the Adapter Cluster since all transfer of control information and data between the adapters and the cluster buffer memory $52_m$ is through the BAR $53_b$. The Register $53_b$ is time shared by all the adapters continuously. The contents register is changing with every clock time as a result of sensing changes on paths to the Cluster Interface Register $53_c$, Adapter Switching Matrix $51_{mx}$ and the Read/Write Control. All fields of the Buffers Associative Register $53_b$ can be written in from the CIR $53_c$ (FIG. 20A) and most can be interrogated or read (indirectly from the Cluster Buffer Memory $52_m$) into the CIR $53_c$. The Buffers Associative Register has a size of 56 bits and is made up of eight fields (FIG. 20C) as follows:

1. C-1 field (Character one)—11 bits: This field can accept or send a bit or character from or to the Adapter Switching Matrix $51_{mx}$. Various paths into the Cluster Buffer Memory $52_m$ are necessary to implement the basic control of this field. There is a path that shifts the entire field one bit position. There are paths which shift C-1 field content to or from the "character two" field positions within the buffer.

2. C-2 (Character two)—10 bits: This field provides a normal path for a data character to be sent to or received from the Data Comm Processor. This field has room for an eight bit character plus parity. The additional bit position is to mark this field when occupied. Various paths into the cluster buffer memory $52_m$ are necessary to implement the basic control of this field. There are paths which shift the C-2 field content to or from the Character One field position within the buffer.

3. BT field (Bit Timer)—7 bits: This field is used for information strobing purposes within the cluster; it is used for both synchronous and asynchronous adapter operation. During asynchronous operation, this field is basically an extension of the clock counter of the clock generation section of the cluster. During synchronous adapter operation, this field senses the clock lines of the data sets through the adapter and the Adapter Switching Matrix $51_{mx}$ of the cluster. In either case, this BT field provides control signals for the adapter and the C-1 field.

4. TY field (Type)—6 bits: This field is used for basic control purposes within the Adapter Cluster 51. This field accepts or provides "Type Information" either from or to the Data Comm Processor. The information within this field defines a "type" of adapter being serviced with each buffer memory access. This field has room to define a maximum of 31 adapter types or line disciplines. The zero state of this field is reserved for control purposes. The TY field also contains a control bit that can be used for maintenance purposes.

5. SC and SA field (State Counter and State Counter Auxiliary)—5 bits: This field is used for sequence control purposes within the Adapter Cluster 51. The SC field (2 bits) along with the command field of the Buffers Associative Register $53_b$ is used to define the existing state of an adapter as it is serviced with each buffer memory access. The SA field (3 bits) is used to buffer interrupt conditions before they are encoded into the interrupt field of the Buffers Associative Register $53_b$.

6. BC (Command) and BI (Interrupt) fields—7 bits: This field contains commands sent by the Data Comm Processor which instructs the Adapter Cluster 51 as to what type of operation is to be done. It also contains the interrupt field which will indicate to the Data Comm Processor what type of adapter cluster attention is needed.

7. The CT (Control Timer) field—2 bits: This field is used internally within the Adapter Cluster 51 and provides either 3 second or 30 second timer control. This field is disabled whenever the program timer field is not idle.

8. PT (Program Timer) field—8 bits: This field provides an area for timing functions for programs in the Data Comm Processor. The Data Comm Processor can enter data into this field (by way of the Exchange 54) and allow timing functions to occur. At the completion of timing in this field, an interrupt is sent to the Data Comm Processor. This field is one that cannot be interrogated.

There are five registers in the Adapter Cluster 51. The register just described was the Buffers Associative Register $53_b$. There are also a Scan Counter Register and a Real Time Counter Register (which are not shown) in addition to an Input Register 56, Output Register 57 and a Buffer Memory (cluster buffer) Register $52_m$ (FIG. 20A).

The Scan Counter Register is one which is constantly counting at a typically 5 megahertz clock rate. This register acts as source for designate control to the Adapter Switching Matrix $51_{mx}$ and the Read/Write control 55 of the Adapter Cluster 51. The content of this SCR register is shifted to the CIR register AD field (FIG. 20B) when control or data information is passed to the Data Comm Processor from the Adapter Cluster 51. The AD field of the CIR $53_c$ is compared with the scan counter when information (data or control) is passed to the Adapter Cluster's BAR $53_b$ from the Data Comm Processor. The Real Time Counter Register is one which is constantly counting in synchronization with a 5 megahertz clock train. The Real Time Counter Register is an extension of the scan counter and is used to generate timing singals for the asynchronous (start/stop) transmission and reception of data bits. This register is also used as a source of timing for the control timers and the program timer.

The Input Register 56 of FIG. 20A is a 10 bit register which reflects the state of a line adapter whose buffer contents are in the Buffers Associative Register $53_b$. The output of this register goes to the Control Logic 55 (FIG. 20A). The Output Register 57 is a 6 bit register which sends output data and control to the line adapters. The input to this register is from the Control Logic 55. The memory register (cluster buffer) $52_m$ is an integrated circuit memory which consists of 16 words of 56 bits each. One word is assigned to each of the 16 adapters. The configuration of the bits within each word is identical to that which is specified for the Buffers Associative Register $53_b$. The BAR register is the source of information stored in the cluster buffer memory $52_m$ and is the destination of information read out of the cluster buffer memory $52_m$. The Buffer Memory $52_m$ has a reading cycle which is non-destructive. Simultaneous Read/Write cycles may be performed in the memory but the read and write cycles must not occur on the same memory word location.

In FIG. 20A the Clock and Designate Control 58 is the source of clocking control signals used throughout the Adapter Cluster 51. The basic or fundamental clock train input to this section can be provided by the host computer. Designate control signals are made available to the Read/Write Control 55, the Buffers Associative Register $53_b$, the Adapter Switching Matrix $51_{mx}$ and the cluster interface sections of the Adapter Cluster 51.

The Read/Write Control 55 of FIG. 20A is a section that contains control logic for simultaneous Read and Write cycles of cluster memory words. The operation provided for allows an adapter word to be written into Cluster Memory $52_m$ as another adapter word is read from the Cluster Memory $52_m$. The BAR $53_b$ services the Cluster Memory $52_m$ during the Read and Write cycles. The Read path to the Buffers Associative Register $53_b$ always reflects the image of what is in a cluster memory word position and it is referred to as the "image" path. The Write paths from BAR $53_b$ into the Cluster Memory $52_m$ includes an "image" path along with other paths which provide for data manipulation.

The Adapter Switching Matrix $51_{mx}$ contains designate control logic for the individual adapters. The designate gating generated within this section allows the adapters to time-share common input and output buses that attach to the BAR register $53_b$.

The Adapter Cluster 51 provides for both asynchronous and synchronous transmission of characters over the communication lines. Asynchronous transmission makes use of start-stop synchronization to identify the bits on the line. Synchronous transmission makes use of a bit or character patterns to attain or retain synchronization on the line. The specified pattern (sync pattern) is dependent upon the line discipline being used on a line. A sync pattern proceeds the transmission of a message and may be interspersed with the transmission of a message.

The Adapter Cluster 51 provides for sending and receiving characters over communication lines serial-by-bit or parallel-by-bit. Within the Adapter Cluster 51, the characters are transferred parallel by bit adding or deleting bits as required for the various line disciplines.

Figure 18:
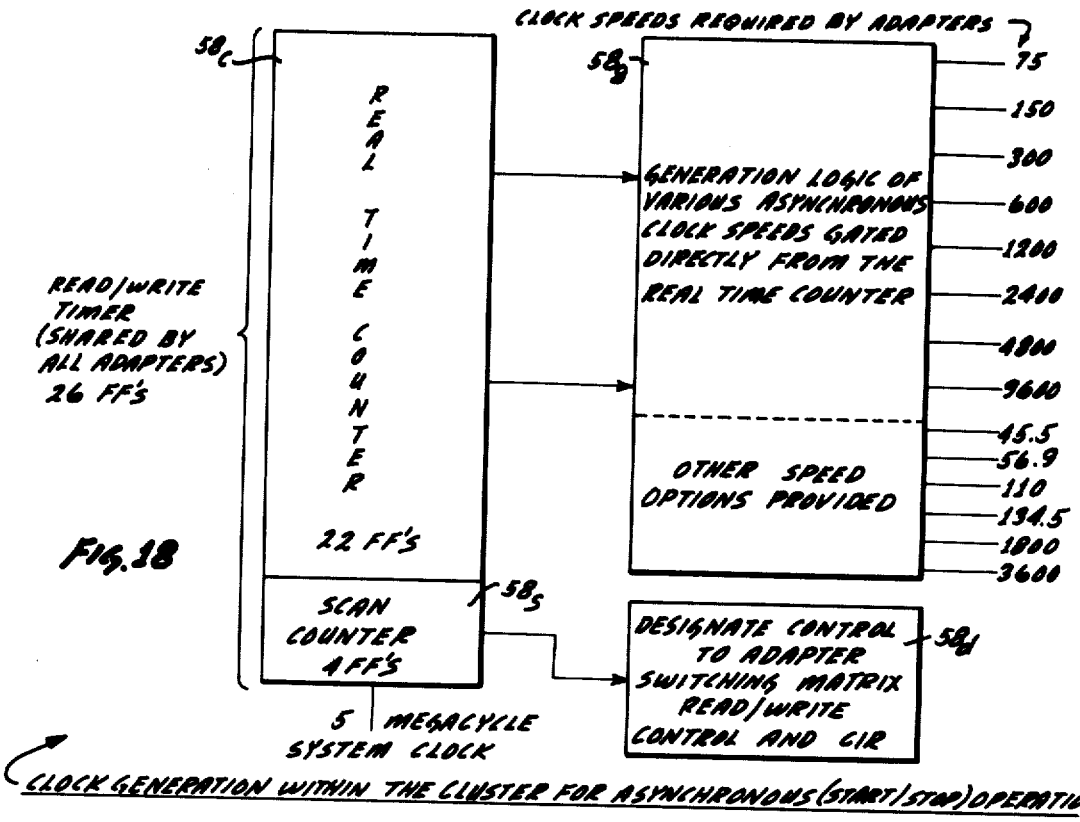
FIG. 18 is a block diagram of clock and designate control for the adapter cluster controller of FIG. 20A.

In FIG. 20A there is seen a real time clock and designate control 58 used in the Adapter Cluster 51. FIG. 18 shows a block diagram of the real time clock and designate control 58 for asynchronous operation.

A real time counter $58_c$ provides signals to a generation logic unit $58_g$ to provide the necessary clock speeds required by the adapters of the Adapter Cluster module. A scan counter $58_s$ provides signals to the designate control $58_d$ in order to provide clocking signals to the Adapter Switching Matrix $51_{mx}$, the Read/Write control 55, and the Cluster Interface register $53_c$ of FIG. 20A.

A data communications subsystem has been described for operation within a data communication network having a single or plurality of host computers and Main Memory.

The data communications subsystem is built around a basic control interface unit which links a data communications processor, a "data communications memory" (which may consist of a dedicated autonomous data communications memory, or the Main Memory of the main host system) and where said basic control interface unit also links a mix of one or more types of Front-End Controllers which, when initialized, provide for execution of data transfer instructions. Each data communications processor can sense a halt in the main host system and shift to independent data transfer operations using the autonomous memory and its independent local power supply.

The data communications processor relieves the loading on the main system by monitoring and controlling the operations of data transfers in the network subsystem. Any halts in the main host system permit the subsystem to go into autonomous operation and continuously handle data transfer operations. By enhancing the data communications processor with a special group of front-end controllers, the overall system efficiency and rate of message transmission can be increased by a number of magnitudes. Thus, by the use of the basic control interface between a data communications processor and a series of front-end controllers, the capacity for handling data transmission lines and terminals can be greatly increased and great flexibility of configurations can be made possible while at the same time relieving the individual data communications processors of being overloaded.

While the principles of the invention have been illustrated in a preferred embodiment, there will obviously be various modifications in structure, arrangement and components used in the practice of the invention which are particularly adapted for specific environments and operating requirements without departing from the principles of the invention. The appended claims are thus intended to define the scope of the invention and cover any equivalent embodiments.

The following claims are made:

What is claimed is:

1. A data communications subsystem including a data communications processor, a data communications memory resource using an autonomous memory for autonomous configurations and main host system memory for non-autonomous configurations, and a basic control module which connects to remote peripheral units, said data communications subsystem operating in connection with a main host system having a main central processor and main memory, said data communications subsystem comprising:

(a) said data communications processor being initiated by said main host system and including:
 (a1) a local internal memory for storage of data transfer routines;
 (a2) a plurality of cluster-interface hubs, each of which hubs is connected to either:
  (i) a plurality of adapter-cluster module controllers, or
  (ii) said basic control module having a basic control interface unit and a plurality of front-end controllers;
 (a3) means to initiate, stop or interrogate each of said plurality of front-end controllers in the subsystem;
 (a4) means to assemble and convey, to a selected front-end controller, an address of specific instruction-commands regarding data-transfer operations;
 (a5) means to sense any halt in the main host system and thereupon to operate the data communications subsystem in an autonomous self-running mode during such halt period wherein input messages from peripherals and output messages from the main system are stored on disk files, and wherein said output messages are transferred to their destinations even when the main system is off-line, and said input messages are transformed to the main system from disk files when the main system is on-line again;

(b) said autonomous memory having direct access said basic control interface unit, said autonomous memory storing control data and information data dedicated to data transfer operations for use of said front-end controllers;

(c) said basic control module including:
 (c1) a basic control interface unit, under control of said data communications processor, providing means to connecting said main host memory in non-autonomous subsystem configurations or means connecting said autonomous memory in autonomous subsystem configurations;
 (c2) a plurality of front-end controllers each of which connects, via transmission lines, to one or more peripheral units, each of said front-end controllers being linked to said basic control interface unit for access to main host memory or autonomous memory, each of said front-end controllers including:
  (c2a) means to receive data communication transfer instructions, after initiation by and receipt of instruction address-data from said data communications processor, said data transfer instructions being accessed from said main host memory, or said autonomous data communications memory;
  (c2b) means to execute data transfer instructions for data transfers from/to peripheral units connected to each of said front-end controllers;
  (c2c) program routine means for providing the specific line control disciplines and protocol required by the peripheral units connected to each of said front-end controllers;
  (c2d) connection means to one or more peripheral units.

2. The data communications subsystem of claim 1 wherein said basic control interface unit includes:
 (c1a) an interface path means to said data communications processor;
 (c1b) an interface path means connected to main host memory in a non-autonomous configuration and connected to a local autonomous memory in an autonomous configuration;
 (c1c) an interface path means to each of said plurality of front-end controllers;
 (c1d) priority resolution means for selecting priority of access to memory among competing front-end controllers.

3. The data communications subsystem of claim 2 wherein said basic control interface unit includes:

(c1e) interface path means to said data communications processor to provide access to said autonomous memory by said data communications processor via said basic control interface unit.

4. The data communications subsystem of claim 1 wherein said plurality of front-end controllers connected to said basic control interface unit may, in the autonomous configuration, include any mix of:
- (i) broadband controllers providing data transfers on high-speed transmission lines;
- (ii) adapter cluster module controllers providing data transfers on low/medium speed transmission lines;
- (iii) a data communications disk controller for data transfers to/from disk files;
- (iv) a store-to-store controller to transfer data, between main host memory and autonomous memory, independently of said data communications processor after initialization of said store-to-store controller by said data communications processor.

5. A network of a first data communications subsystem, as in claim 1, and a second data communications subsystem as in claim 1, both subsystems connected to a main host system having a central processing unit and main memory, said first and second subsystem having first and second data communications processors and first and second basic control interface units, said network including:
- (a) first connection means from said first data communications processor to said second basic control interface unit;
- (b) second connection means from said second data communications processor to said first basic control interface unit;

whereby any failure in said first or second data communications processor will result in the surviving data communications processor assuming control of data transfer operations for both of said first and second subsystems via said first and second basic control interface units.

6. The network of claim 5 wherein each of said basic control interface unit includes:
- (c1a) exchange means connected to a first and second data communications processor;
- (c1b) exchange control means for selecting one of said data communications processors for communication with a selected front-end controller;
- (c1c) priority logic unit means connected to said front-end controllers, for selecting priority of access to memory by a requesting front-end controller;
- (c1d) interface path means connecting said priority logic means to each of said plurality of front-end controllers in a predetermined sequence;
- (c1e) a local memory interface connected to a data communications processor to permit said data communications processor to access said autonomous memory via the basic control interface unit;
- (c1f) logic means within said exchange means for providing an interrupt signal to a selected data communications processor from each front-end controller which has completed a data transfer operation or when it needs re-initialization because of an error signal.

7. A data communication subsystem for use with a main host system which has a central processor and a main memory, wherein said data communication subsystem connects a plurality of peripheral terminals and provides the capability of operating continuously and autonomously during any periods when the main host system is halted, the data communication subsystem comprising:
- (a) a data communications processor connected to said main host system and capable of receiving commands for initiation of data transfer operations, said data communications processor including:
  - (a1) local internal memory means for storing program routines;
  - (a2) means to convey an address of instruction commands to each of a plurality of front-end controllers;
  - (a3) means to initiate, stop or interrogate each front-end controller regarding data transfer operations;
  - (a4) means to detect any halt in the main host system and thereupon to operate the data communications subsystem in an autonomously independent self-running mode during such halt period wherein a local autonomous data communications memory is used as a source of instruction data and control data during said autonomous mode;
- (b) an autonomous data communications memory for storage of programs, control data and information data dedicated to the operation of data transfers in the data communications memory storing command blocks for execution of data transfers within the subsystem:
- (c) a plurality of command blocks stored in autonomous memory, said command blocks including:
  - (c1) execution instructions for a data transfer operation to a specified front-end controller;
  - (c2) an address of message data;
  - (c3) length of the message data;
  - (c4) memory space for a result word to indicate completion or incompletion of the data transfer operation;
- (d) a basic control module connecting a plurality of front-end controllers, said basic control module including:
  - (d1) a basic control interface unit providing direct connecting to said local autonomous data communications memory and to said data communications processor;
  - (d2) a plurality of front-end controllers each of which is connected to said basic control interface unit, each of said front-end controllers including:
    - (d2a) means to receive data communication transfer instructions, after initiation by and receipt of instruction address-data from said data communications processor, said data transfer instructions being accessed from said autonomous data communications memory;
    - (d2b) means to execute data transfer instructions for data transfers from/to peripheral terminal units connected to said front-end controller;
    - (d2c) program routine logic means for providing the specific line control disciplines and protocol required by the peripheral terminal units connected to said front-end controller;
    - (d2d) connection means to one or more peripheral terminal devices;
- (e) said data communications processor providing addresses, via the basic control unit, to each of its associated front-end controllers to permit each of said front-end controllers to access instruction data and control data for the execution of data transfer operations, said instruction and control data being available in said command blocks in said autonomous memory.

8. The data communications subsystem of claim 7 in which said plurality of front-end controllers may include any mix of:
  (i) a broad band controller for peripherals connected via high speed transmission lines;
  (ii) an adapter cluster module controller for connecting a plurality of peripherals via low/medium speed data transmission lines;
  (iii) a data communications disk controller for routing data into disk file storage or out of disk file storage;

9. The data communications subsystem of claim 7 wherein said plurality of front-end controllers comprise broad band controllers for data transfer to peripheral terminals on high speed transmission lines.

10. The data communications subsystem of claim 7 wherein said plurality of front-end controllers comprise adapter cluster module controllers for data transfer to peripheral terminals on low/medium speed transmission lines.

11. A data communication subsystem for use with a main host system which has a central processor and a main memory, wherein said data communication subsystem connects a plurality of peripheral terminals and provides the capability of operating continuously and autonomously during any periods when the main host system is halted, the data communication subsystem comprising:
  (a) a data communications processor connected to said main host system and initiated by said main system for data transfer operations, said data communications processor including:
    (a1) local memory means for storing instruction routines for data communications processor operations;
    (a2) means to convey an address of an instruction-command-block to each of a plurality of front-end controllers;
    (a3) means to initiate, stop or interrogate each front-end controller regarding data transfer operations;
    (a4) means to detect any halt in the main host system and thereupon to operate the data communications subsystem into an autonomously independent self-running mode during such halt period;
  (b) an autonomous data communications memory for storage of programs, instruction-command blocks, control data and messages dedicated to the operation of data transfers in the data communications subsystem;
  (c) a basic control module connected to said data communications processor and said autonomous memory, said basic control module comprising:
    (c1) a basic control interface unit connecting to a plurality of front-end controllers and including:
      (c1a) a control interface to a first data communications processor;
      (c1b) a data interface connected to said autonomous memory;
      (c1c) an interface to said plurality of front-end controllers;
      (c1d) priority resolution means for selecting priority of access to memory among competing front-end controllers;
    (c2) a plurality of front-end controllers where each of said front-end controllers includes:
      (c2a) means for accessing an instruction-block from said autonomous memory according to addresses provided by the data communications processor via the basic control interface unit;
      (c2b) connection means to one or more peripheral terminals;
      (c2c) execution means for executing data transfers between a selected front-end controller and its associated peripheral terminals, and/or between said front-end controller and the said autonomous memory;
      (c2d) means to provide a predetermined line control discipline and protocol for data transfers between a selected front-end controller and its associated peripheral terminals;

12. The data communications subsystem of claim 11 wherein said front-end controllers include:
    (c2e) means to handle data transfers on high speed transmission lines;
    (c2f) means to handle data transfers on medium/low speed transmission lines.

13. The data communications subsystem of claim 11 which includes:
  (d) disk file storage means, and wherein one of said plurality of front-end controllers includes:
    (c2g) means to execute data transfers to disk files during the said autonomous mode of operation when said main system may be halted.

14. The data communications subsystem of claim 11 wherein one of said plurality of front-end controllers includes:
    (c2h) means to transfer data between main host memory and local autonomous memory.

15. The data communications subsystem of claim 14 wherein one of said plurality of front-end controllers includes:
    (c2i) means to transfer data from one area of autonomous memory to another area of autonomous memory.

* * * * *

UNITED STATES PATENT AND TRADEMARK OFFICE
CERTIFICATE OF CORRECTION

PATENT NO. : 4,156,907  
DATED : May 29, 1979  
INVENTOR(S) : R.L. Rawlings and M.G. Watson Page 1 of 2

It is certified that error appears in the above-identified patent and that said Letters Patent are hereby corrected as shown below:

Col. 2, line 35, change "mode" to --modes--.  
Col. 8, line 63, change "interace" to --interface--.  
Col. 10, line 29, after "basic" insert --control--.  
Col. 11, line 6, change "(DMS)" to --(DMA)--;  
         line 59, change "unit." to --units.--.  
Col. 13, line 21, after "have" insert --a--.  
Col. 15, line 32, change "of" to --to--.  
Col. 20, line 67, change "Scratched" to --Scratchpad--.  
Col. 21, line 5, change "Scratched" to --Scratchpad--;  
         line 7, change "Scratched" to --Scratchpad--.  
Col. 23, line 22, change "ANd" to --AND--;  
         line 46, change "Q" to --$\bar{Q}$--.  
Col. 25, line 53, change ""taking"" to --"tanking"--.  
Col. 26, line 57, change "multiplexer" to --multiplexor--.  
Col. 27, line 14, change "$100_1$" to --$100_i$--.  
Col. 28, line 7, change "Wod" to --Word--.  
Col. 32, line 11, change "work" to --word--.  
Col. 35, line 5, change "ReQest" to --ReQuest--;  
         line 7, change "for" to --from--;  
         line 21, change "form" to --from--.  
Col. 39, line 40, change "now" to --not--.  
Col. 42, line 30, change "work" to --word--.  
Col. 44, line 52, change "Precessor" to --Processor--.  
Col. 45, line 35, change "second" to --control--;  
         line 46, change ""Pit"" to --"P"--;  
         line 46, change "no" to --not--.  
Col. 46, line 39, change "V111" to --X111--.  
Col. 48, line 12, change "inerface" to --interface--;  
         line 20, change "fall." to --fail.--;  
         line 59, change "(Compound" to --(Command--.

UNITED STATES PATENT AND TRADEMARK OFFICE
CERTIFICATE OF CORRECTION

PATENT NO. : 4,156,907

DATED : May 29, 1979

INVENTOR(S) : R.L. Rawlings and M.G. Watson

It is certified that error appears in the above-identified patent and that said Letters Patent are hereby corrected as shown below:

```
Col. 49, line 15, change "in" to --at--;
         line 19, change "te" to --the--.
Col. 50, line 15, at end of line insert --O--.
Col. 54, line 12, delete "pl";
                  "(c) Syn-" should be on next line.
Col. 57, line 58, change "singals" to --signals--.
```

Signed and Sealed this

Twenty-fifth Day of September 1979

[SEAL]

Attest:

Attesting Officer

LUTRELLE F. PARKER

Acting Commissioner of Patents and Trademarks